United States Patent
Aoyama et al.

(10) Patent No.: US 9,443,423 B2
(45) Date of Patent: Sep. 13, 2016

(54) INFORMATION COMMUNICATION METHOD

(71) Applicant: Panasonic Intellectual Property Corporation of America, Torrance, CA (US)

(72) Inventors: Hideki Aoyama, Osaka (JP); Mitsuaki Oshima, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/583,356

(22) Filed: Dec. 26, 2014

(65) Prior Publication Data

US 2016/0005309 A1    Jan. 7, 2016

(30) Foreign Application Priority Data

Jul. 1, 2014    (JP) .................................. 2014-136306

(51) Int. Cl.
  *G08C 23/04* (2006.01)
  *H04B 10/116* (2013.01)
  *H04B 10/60* (2013.01)

(52) U.S. Cl.
  CPC ............. *G08C 23/04* (2013.01); *H04B 10/116* (2013.01); *H04B 10/60* (2013.01)

(58) Field of Classification Search
  USPC .................................................. 398/172, 128
  See application file for complete search history.

(56) References Cited

U.S. PATENT DOCUMENTS

| 3,757,511 | A | * | 9/1973 | Burgess | ................. | G04C 10/02 257/E27.128 |
| 5,142,399 | A | * | 8/1992 | Bertrand | ............ | H04B 10/1143 398/118 |
| 5,193,201 | A | * | 3/1993 | Tymes | ................. | H04B 10/807 398/171 |
| 5,714,012 | A | * | 2/1998 | Murata | .................. | G04B 19/12 136/247 |

(Continued)

FOREIGN PATENT DOCUMENTS

JP    2002-290335    10/2002

*Primary Examiner* — Agustin Bello
(74) *Attorney, Agent, or Firm* — Greenblum & Bernstein, P.L.C.

(57) ABSTRACT

An information communication method for use in a portable terminal, e.g., a wristwatch, to obtain information includes a light receiving step of, by at least one of plural solar cells incorporated in the portable terminal and having respective directivities, receiving visible light that is emitted in a direction corresponding to the directivity of the relevant solar cell, and an information acquisition step of obtaining information by demodulating a signal that is specified by the received visible light.

2 Claims, 58 Drawing Sheets

(56) References Cited

U.S. PATENT DOCUMENTS

| | | | | |
|---|---|---|---|---|
| 5,748,895 A * | 5/1998 | Shiff | G06F 15/0225 | 398/106 |
| 5,838,116 A * | 11/1998 | Katyl | H04B 10/1149 | 315/291 |
| 6,008,923 A * | 12/1999 | Samdahl | H04B 10/40 | 398/122 |
| 6,094,404 A * | 7/2000 | Hidai | G04B 19/12 | 136/257 |
| 6,372,977 B1 * | 4/2002 | Miyoshi | G04C 10/02 | 136/246 |
| 6,791,905 B1 * | 9/2004 | Sekiguchi | G04B 19/12 | 368/205 |
| 6,865,347 B2 * | 3/2005 | Perkins | G01S 1/70 | 398/130 |
| 6,954,591 B2 * | 10/2005 | Lupton | H04B 10/116 | 398/106 |
| 7,062,280 B2 * | 6/2006 | Kangas | G08B 21/24 | 340/572.1 |
| 7,308,194 B2 * | 12/2007 | Iizuka | H04B 10/1125 | 348/211.2 |
| 7,352,972 B2 * | 4/2008 | Franklin | H04B 10/1141 | 398/127 |
| 7,415,212 B2 * | 8/2008 | Matsushita | G06F 3/002 | 250/206.1 |
| 7,715,723 B2 * | 5/2010 | Kagawa | H04B 10/1141 | 398/127 |
| 7,778,548 B2 * | 8/2010 | Yamamoto | H04B 10/1149 | 372/26 |
| 7,970,537 B2 * | 6/2011 | Ann | G01C 21/20 | 398/172 |
| 7,983,568 B2 * | 7/2011 | Won | H04B 10/1141 | 398/172 |
| 8,072,844 B2 * | 12/2011 | Miyahara | G04G 21/04 | 343/788 |
| 8,233,806 B2 * | 7/2012 | Kitaji | H04B 10/1149 | 398/118 |
| 8,243,556 B2 * | 8/2012 | Yamaguchi | G04C 10/02 | 368/205 |
| 8,433,203 B2 * | 4/2013 | Yokoi | H04B 10/116 | 398/118 |
| 8,482,470 B2 * | 7/2013 | Abe | H01Q 1/00 | 343/700 MS |
| 8,493,817 B2 * | 7/2013 | Baba | G01S 19/14 | 368/205 |
| 8,554,084 B2 * | 10/2013 | Song | H04B 10/1149 | 398/118 |
| 8,570,838 B2 * | 10/2013 | Fujisawa | G04C 10/02 | 343/718 |
| 8,593,299 B2 * | 11/2013 | Pederson | H04B 10/1143 | 340/815.45 |
| 8,699,887 B1 * | 4/2014 | Rothenberg | H04B 10/116 | 315/158 |
| 8,750,721 B2 * | 6/2014 | Irie | H04B 10/1143 | 398/172 |
| 8,818,202 B2 * | 8/2014 | Maxik | H05B 33/0818 | 315/152 |
| 8,861,976 B2 * | 10/2014 | Roberts | H04L 1/0625 | 398/172 |
| 8,886,045 B2 * | 11/2014 | Pederson | H04B 10/1143 | 315/312 |
| 8,902,076 B2 * | 12/2014 | Pederson | G07C 9/00158 | 340/815.45 |
| 8,934,784 B2 * | 1/2015 | Guo | H04B 10/116 | 398/172 |
| 8,942,572 B2 * | 1/2015 | Rothenberg | H04B 10/116 | 315/158 |
| 8,948,601 B2 * | 2/2015 | Shar | H04B 10/1149 | 398/129 |
| 8,965,218 B2 * | 2/2015 | Son | H04B 10/116 | 398/118 |
| 8,982,037 B2 * | 3/2015 | Lee | G02F 1/133605 | 345/102 |
| 9,014,564 B2 * | 4/2015 | Roberts | H04B 10/116 | 382/280 |
| 9,020,338 B2 * | 4/2015 | Walewski | H04B 10/114 | 398/158 |
| 9,088,360 B2 * | 7/2015 | Oshima | H04B 10/1143 | |
| 9,088,363 B2 * | 7/2015 | Oshima | H04B 10/1143 | |
| 9,203,515 B2 * | 12/2015 | Oshima | H04B 10/1143 | |
| 9,258,058 B2 * | 2/2016 | Oshima | H04B 10/1143 | |
| 2002/0167701 A1 | 11/2002 | Hirata | | |
| 2004/0117378 A1 * | 6/2004 | Manandhar | G09F 27/00 | |
| 2004/0161246 A1 * | 8/2004 | Matsushita | G06F 3/002 | 398/187 |
| 2005/0254226 A1 * | 11/2005 | Sawada | G01D 11/28 | 362/23.01 |
| 2006/0056855 A1 * | 3/2006 | Nakagawa | G09F 9/33 | 398/183 |
| 2009/0129210 A1 * | 5/2009 | Yamaguchi | G04C 10/02 | 368/205 |
| 2010/0067919 A1 * | 3/2010 | Ono | H05B 37/029 | 398/172 |
| 2010/0254712 A1 * | 10/2010 | Linnartz | H04B 10/116 | 398/172 |
| 2011/0135317 A1 * | 6/2011 | Chaplin | H04B 10/1149 | 398/172 |
| 2012/0076509 A1 * | 3/2012 | Gurovich | H04B 10/60 | 398/212 |
| 2012/0106977 A1 * | 5/2012 | Ma | H04B 10/116 | 398/172 |
| 2012/0134243 A1 * | 5/2012 | Sonoda | G04C 10/02 | 368/205 |
| 2012/0328302 A1 * | 12/2012 | Iizuka | H04B 10/1129 | 398/130 |
| 2014/0055619 A1 * | 2/2014 | Holland | G08B 5/36 | 348/159 |
| 2014/0110561 A1 * | 4/2014 | Kim | H04B 10/116 | 250/205 |
| 2014/0199082 A1 * | 7/2014 | Iizuka | H04B 10/116 | 398/172 |
| 2014/0270794 A1 * | 9/2014 | Rothenberg | H04B 10/116 | 398/118 |
| 2014/0307156 A1 * | 10/2014 | Oshima | H04N 5/3532 | 348/362 |
| 2015/0116094 A1 * | 4/2015 | Fujioka | G06K 7/10009 | 340/10.5 |
| 2015/0223277 A1 * | 8/2015 | Jovicic | H04B 10/116 | 455/41.2 |
| 2015/0372753 A1 * | 12/2015 | Jovicic | H04B 10/116 | 398/172 |
| 2016/0005309 A1 * | 1/2016 | Aoyama | G08C 23/04 | 398/106 |
| 2016/0028477 A1 * | 1/2016 | Jovicic | H04B 10/116 | 398/118 |

* cited by examiner

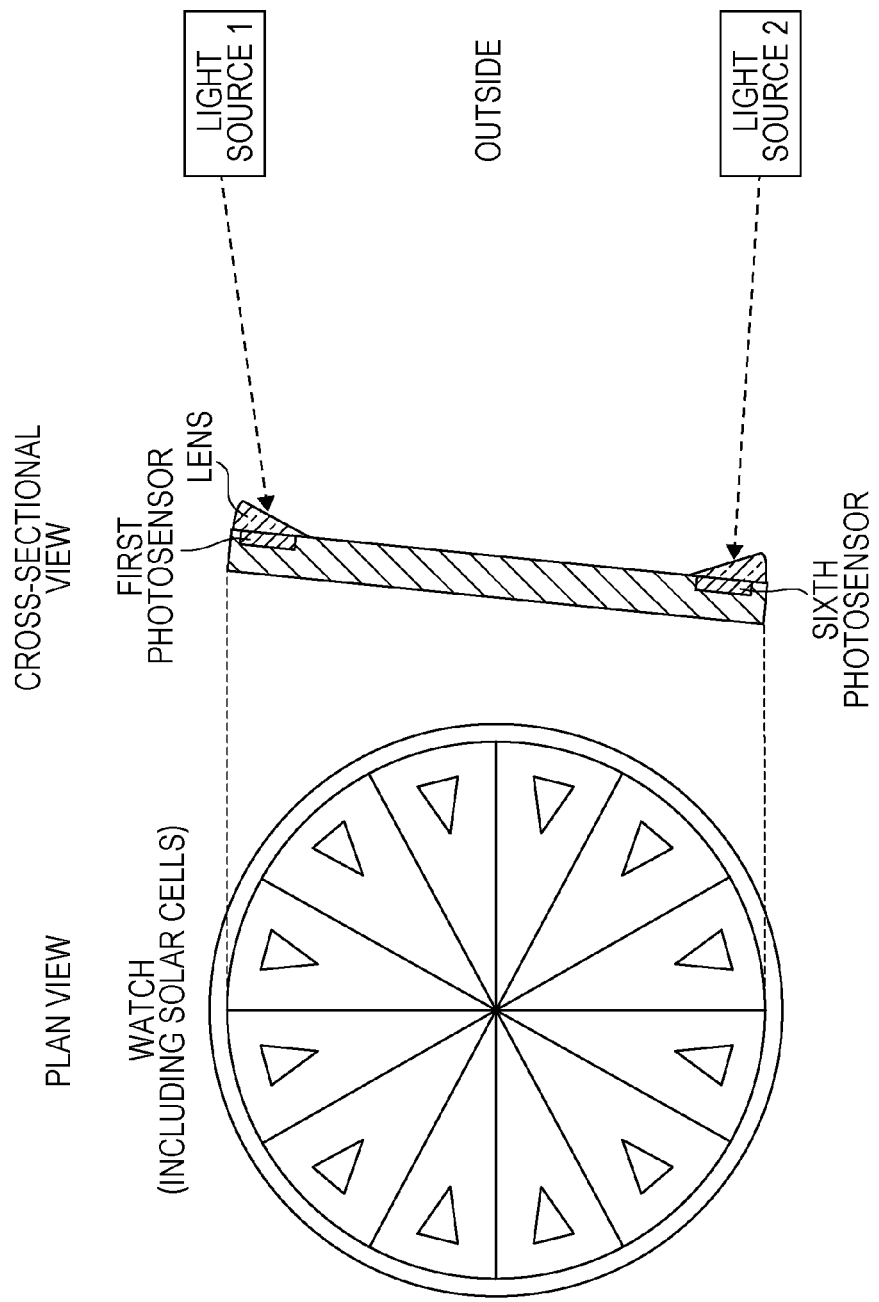

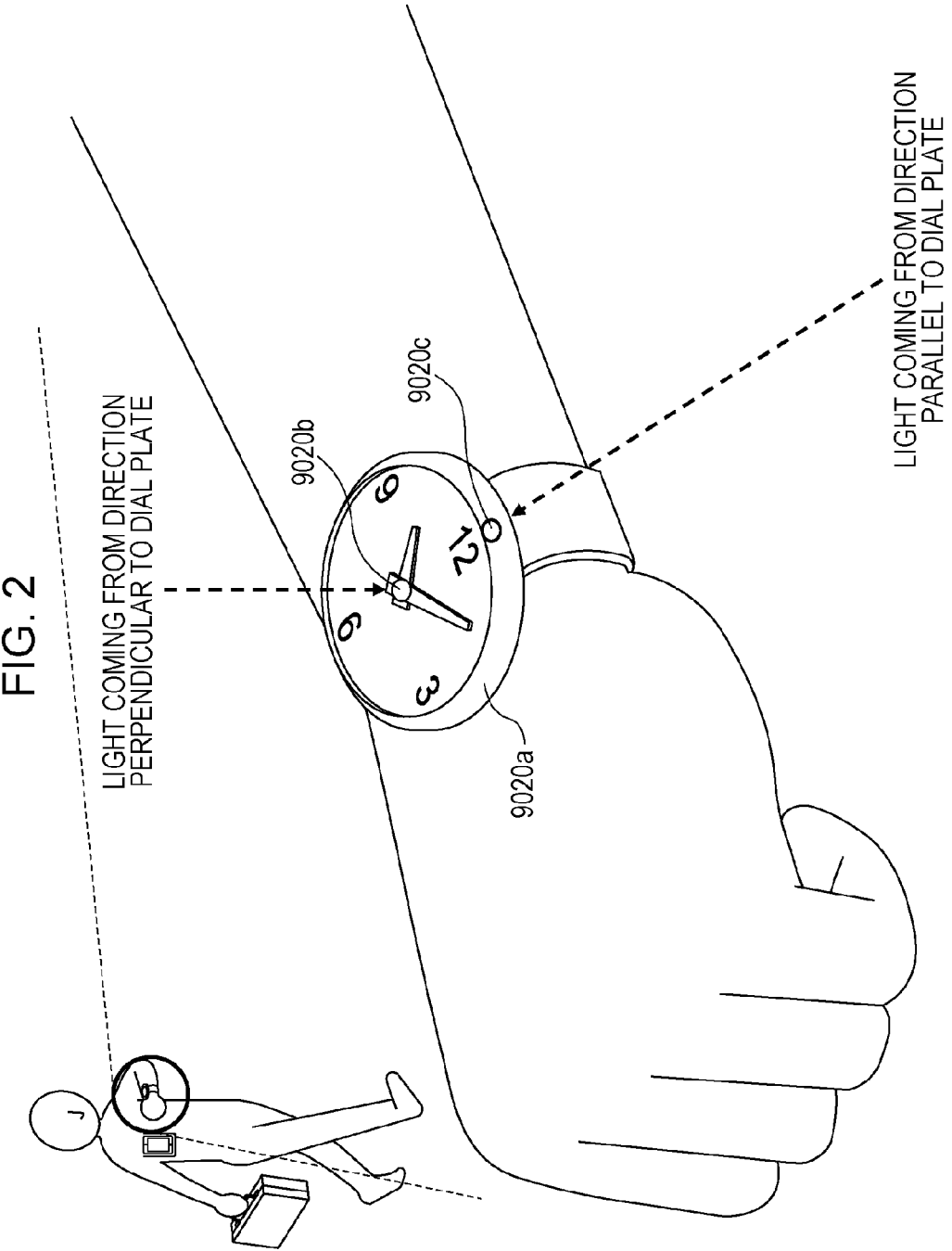

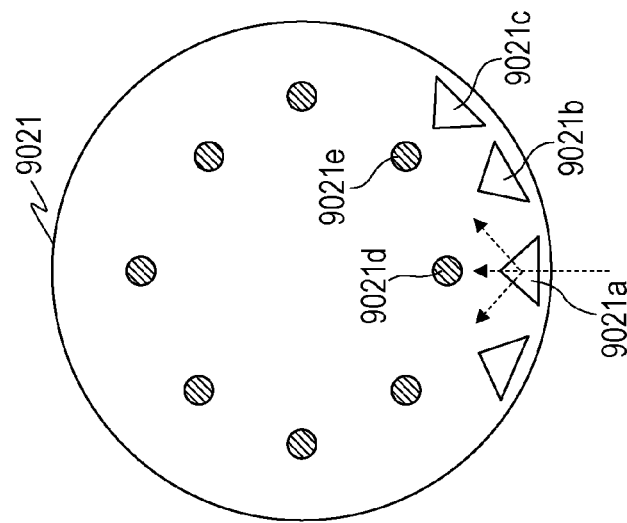
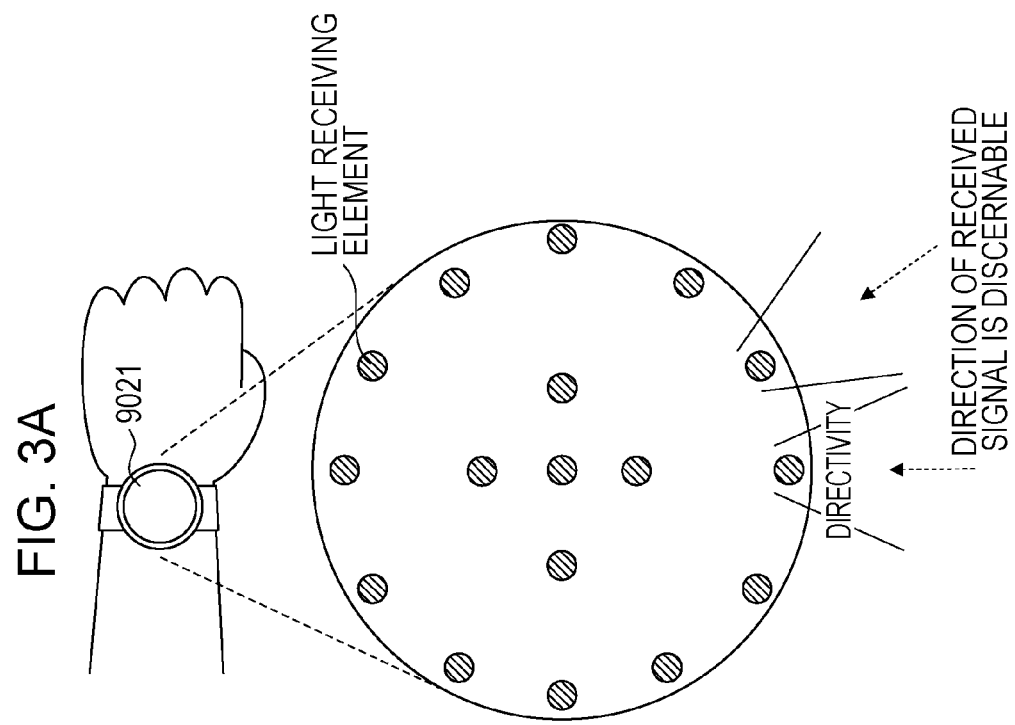

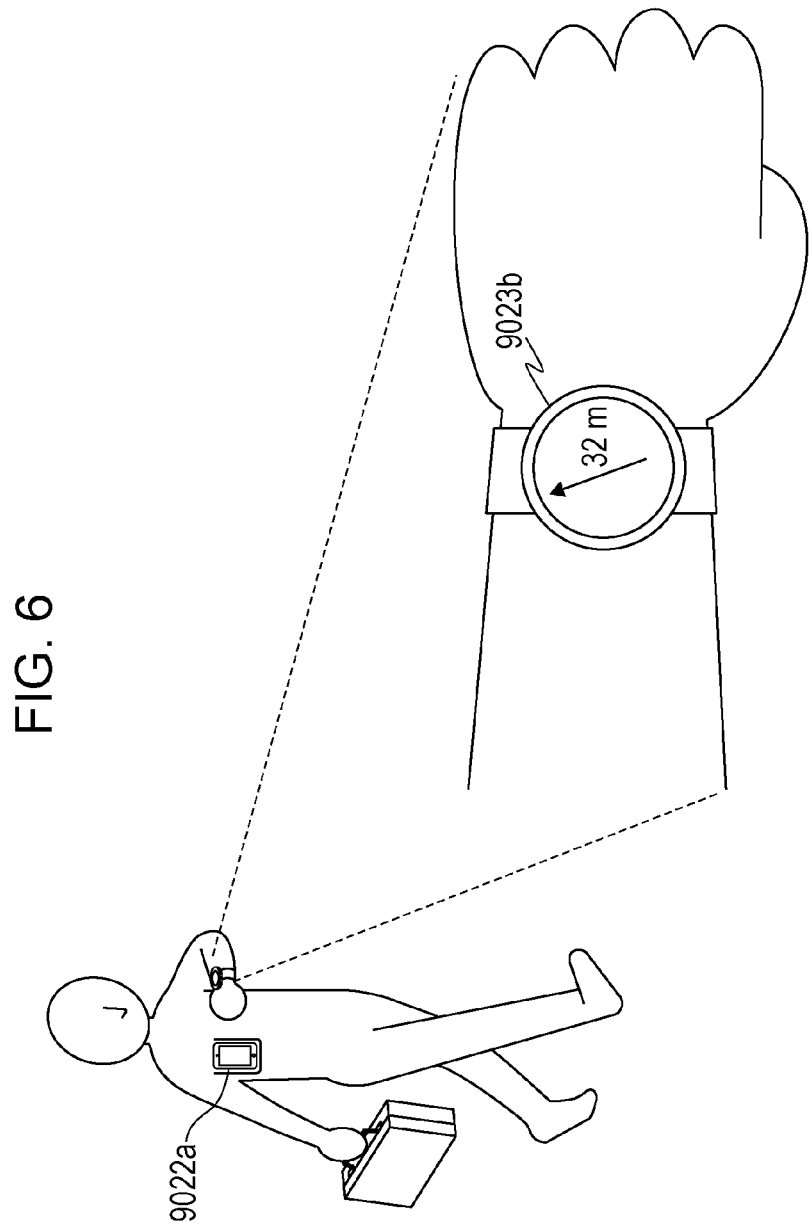

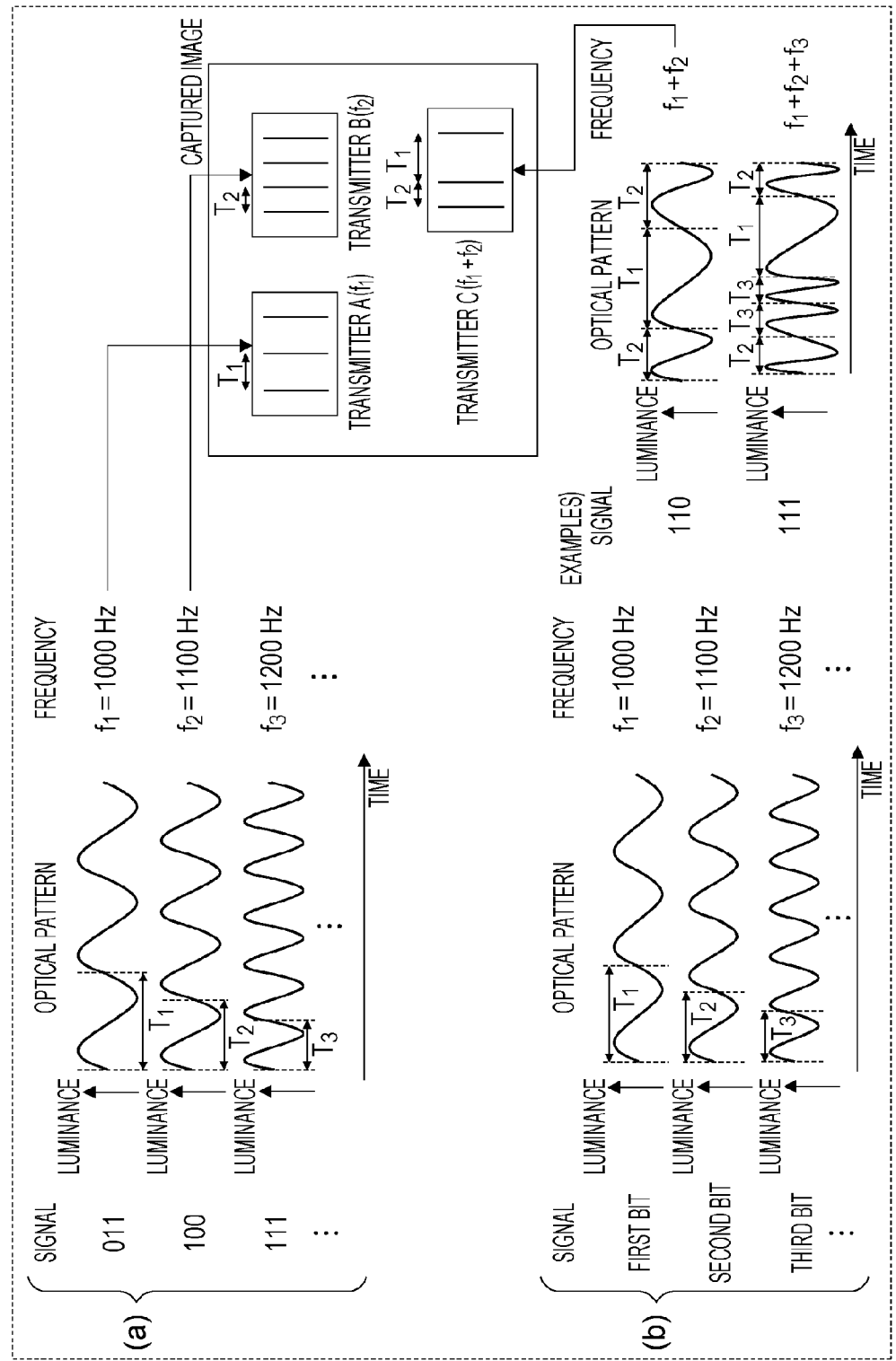

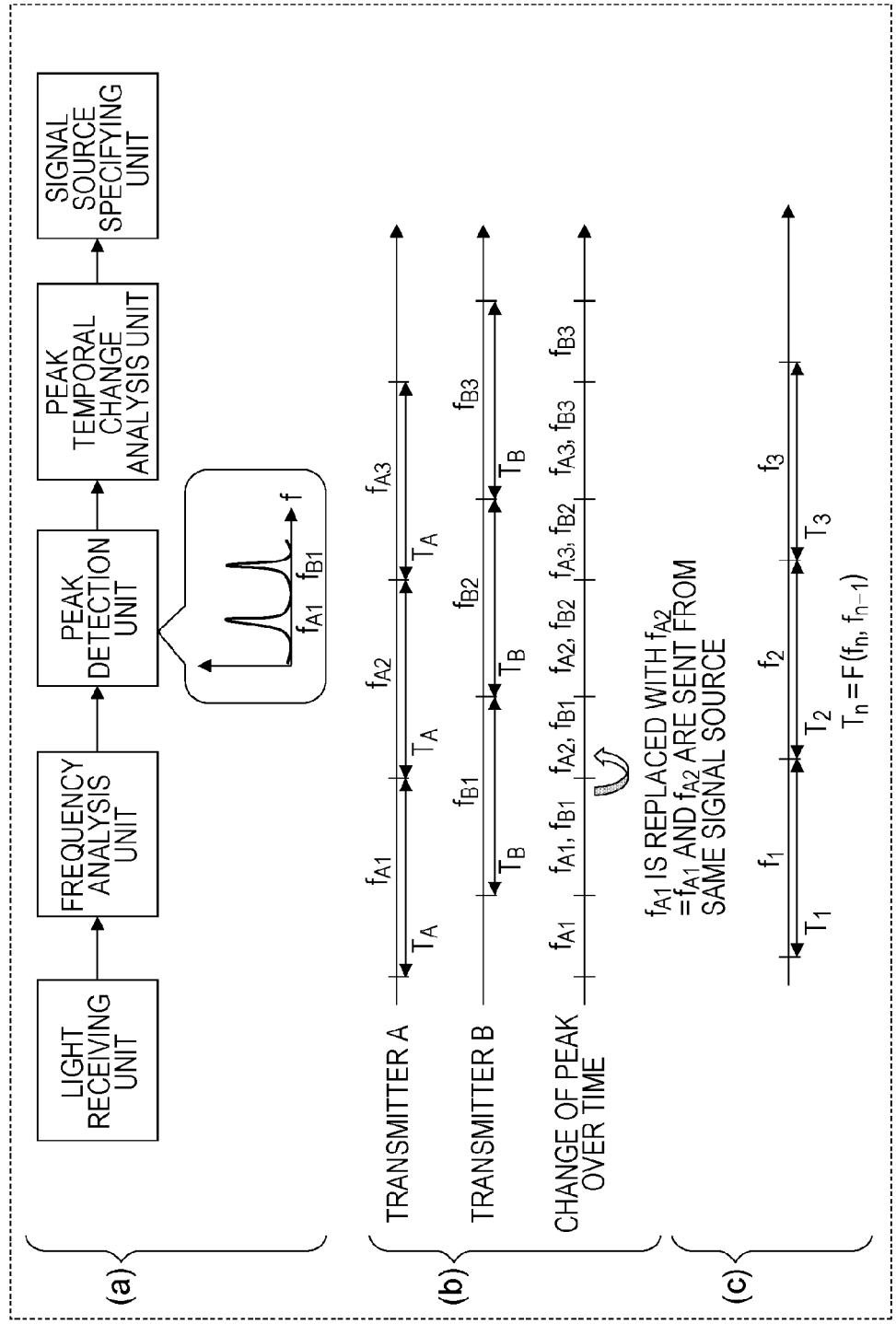

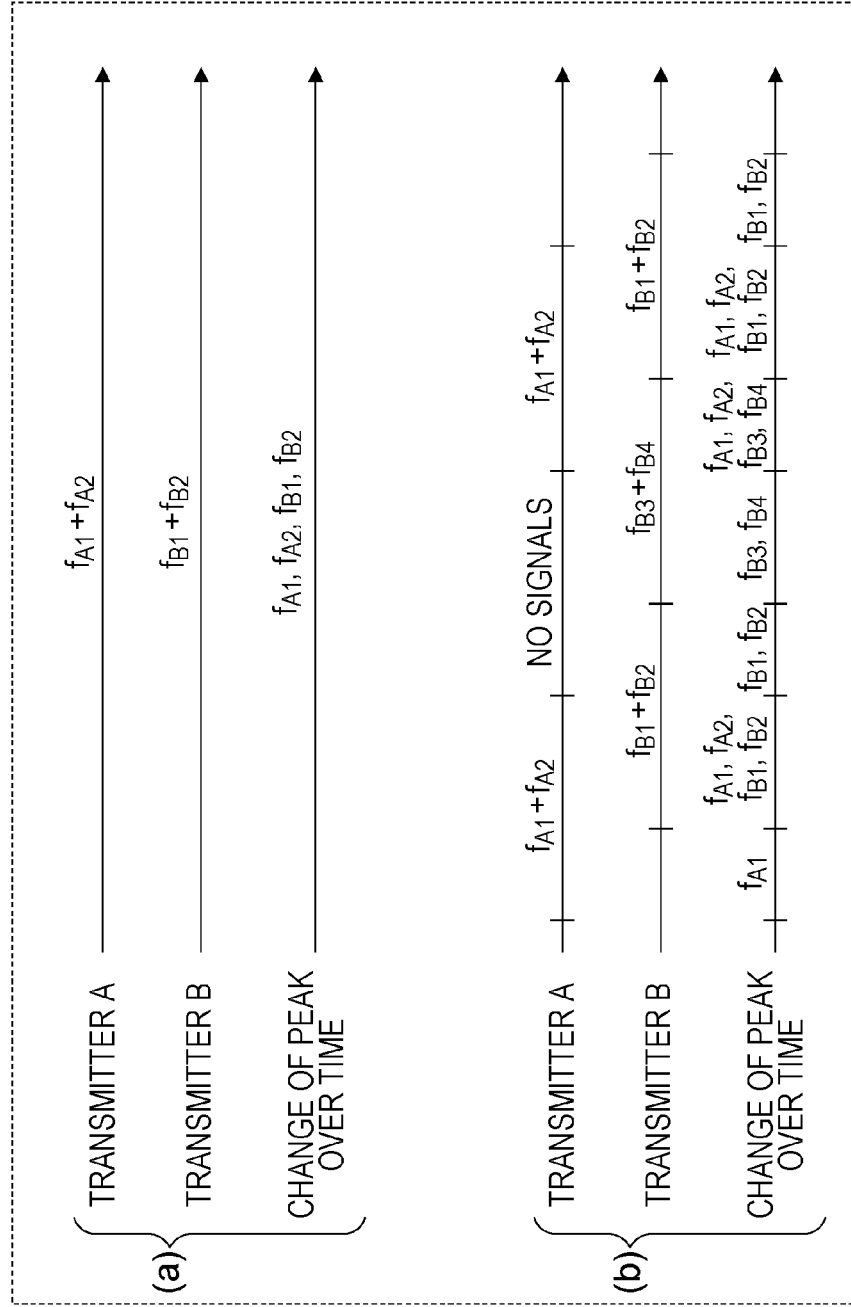

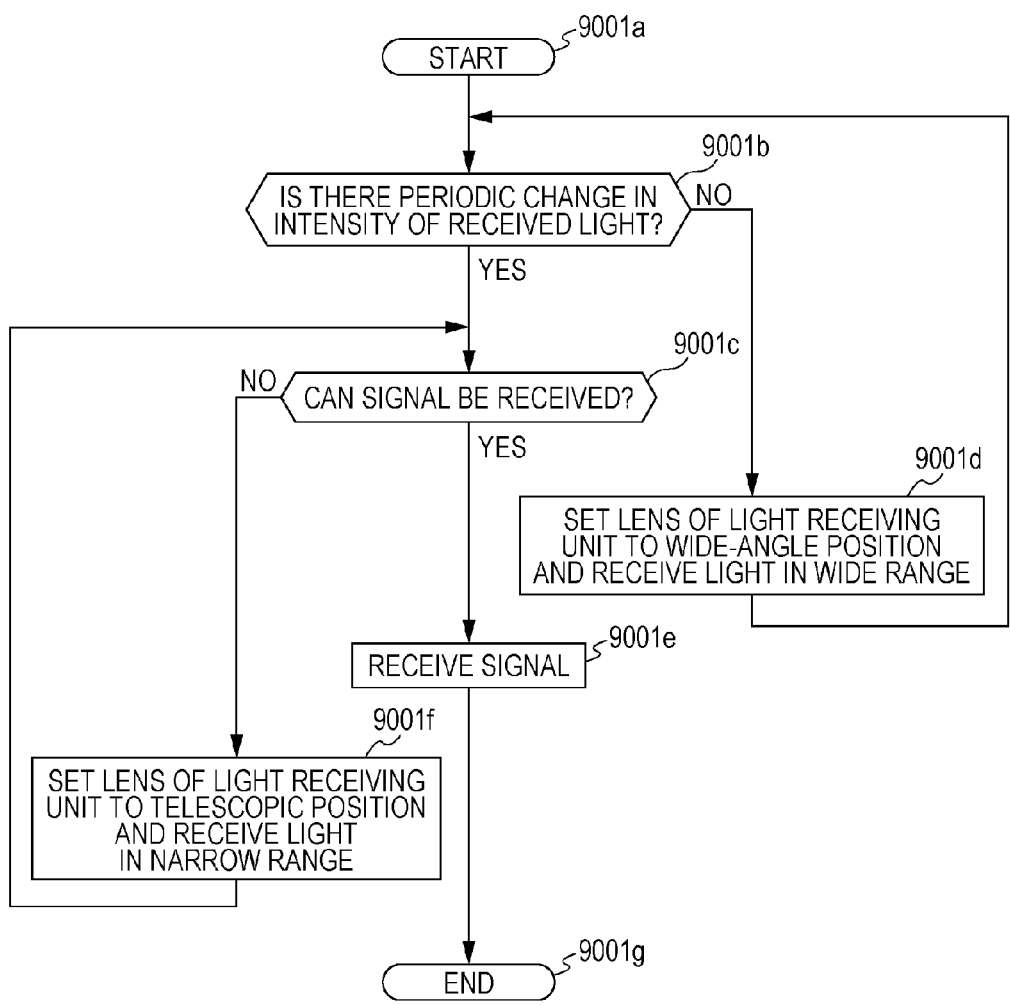

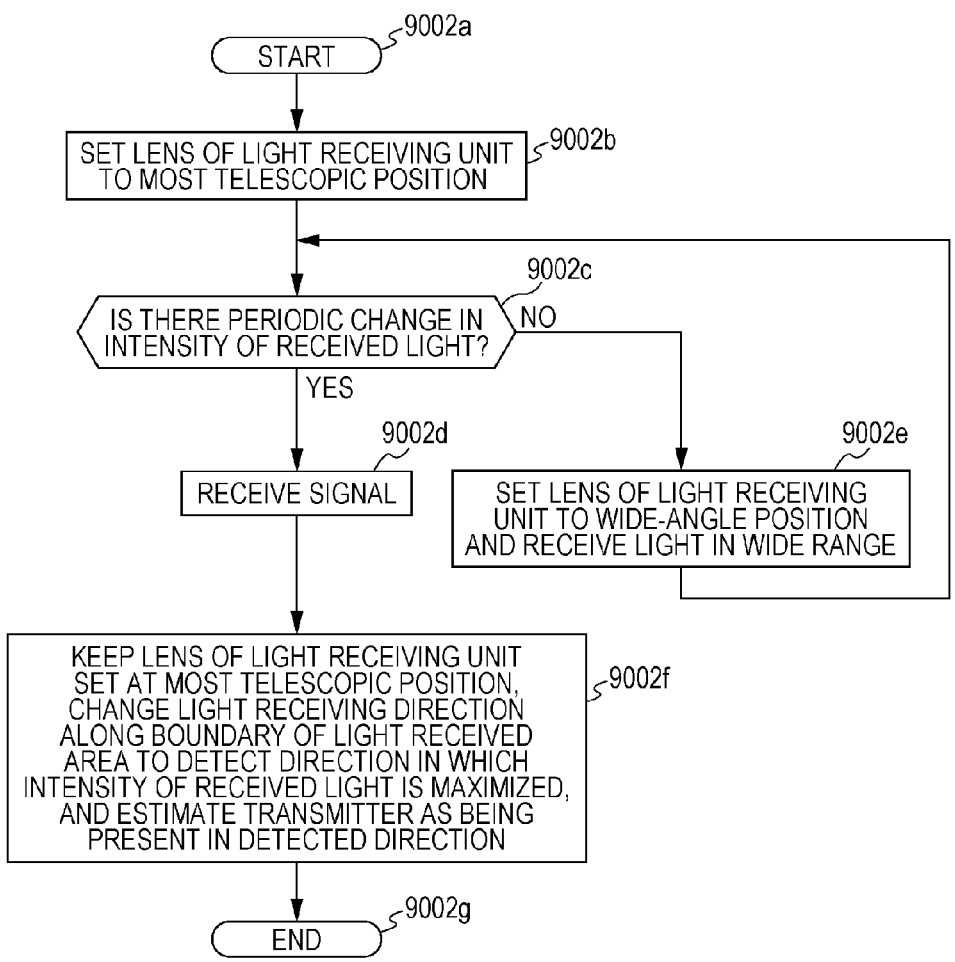

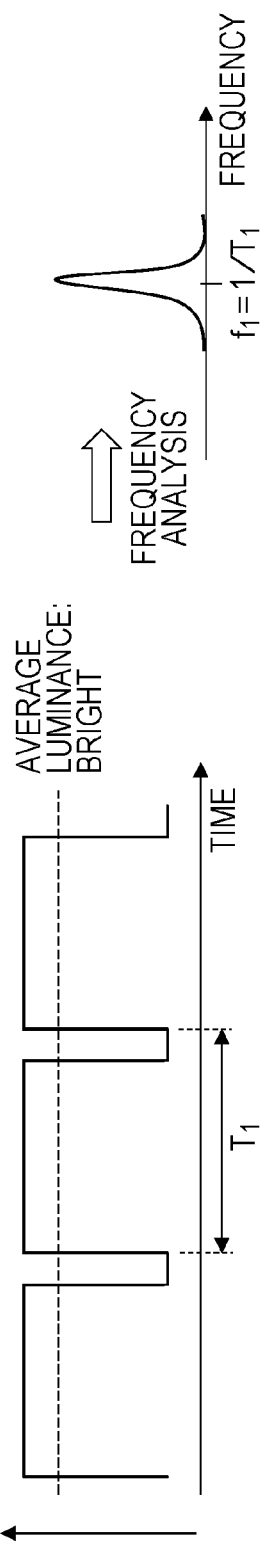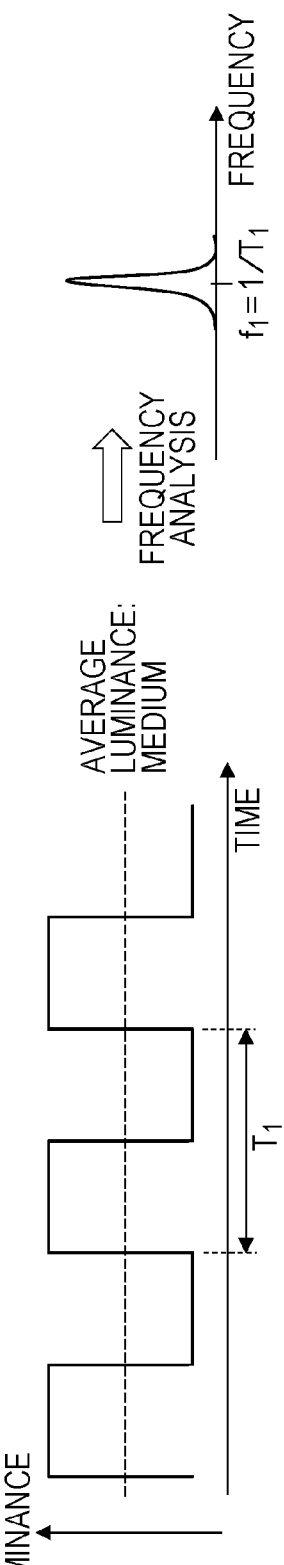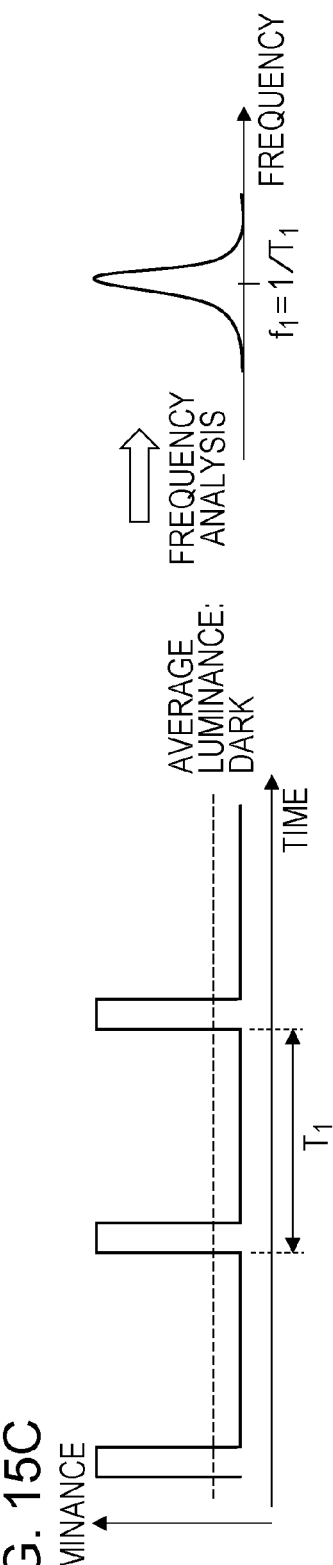

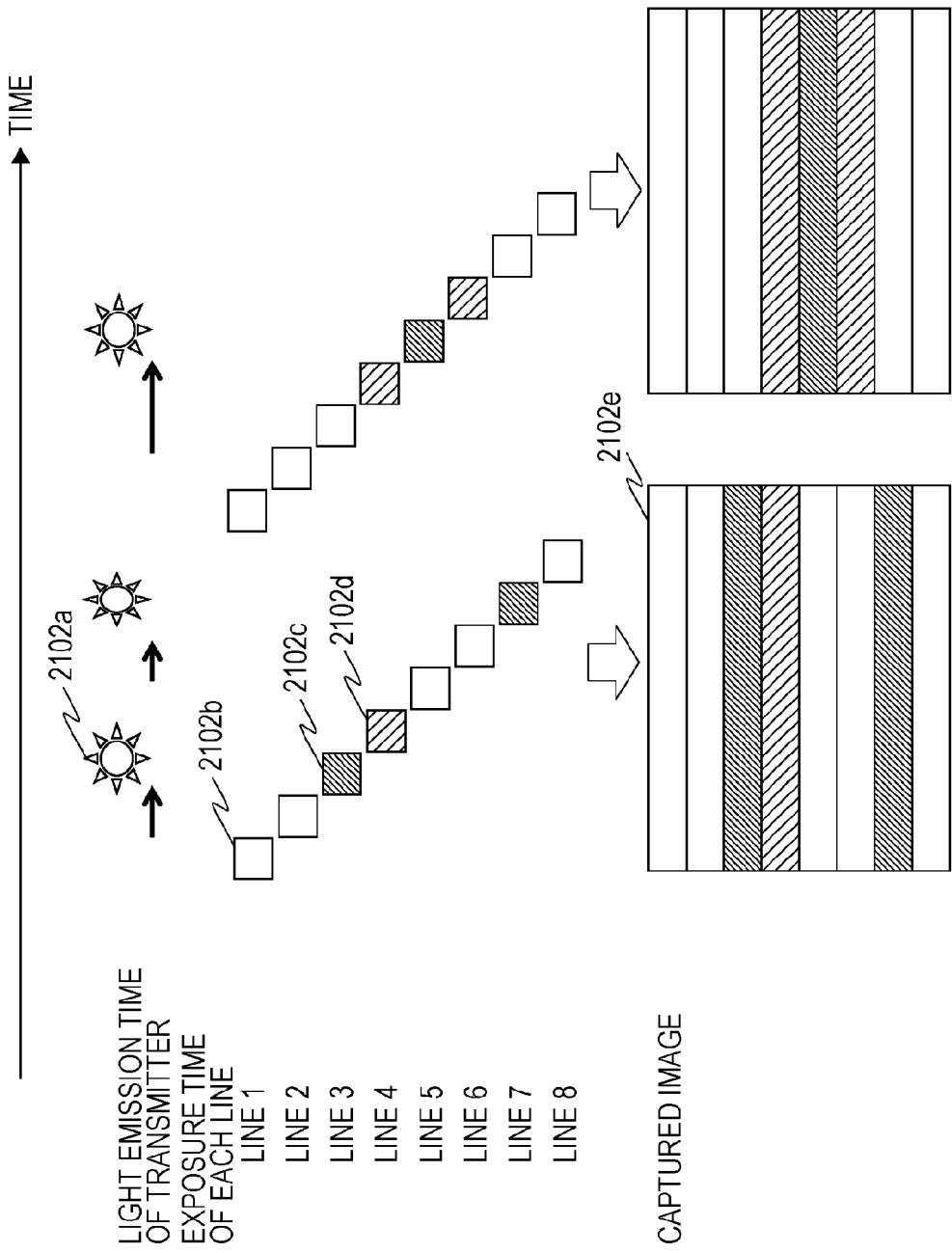

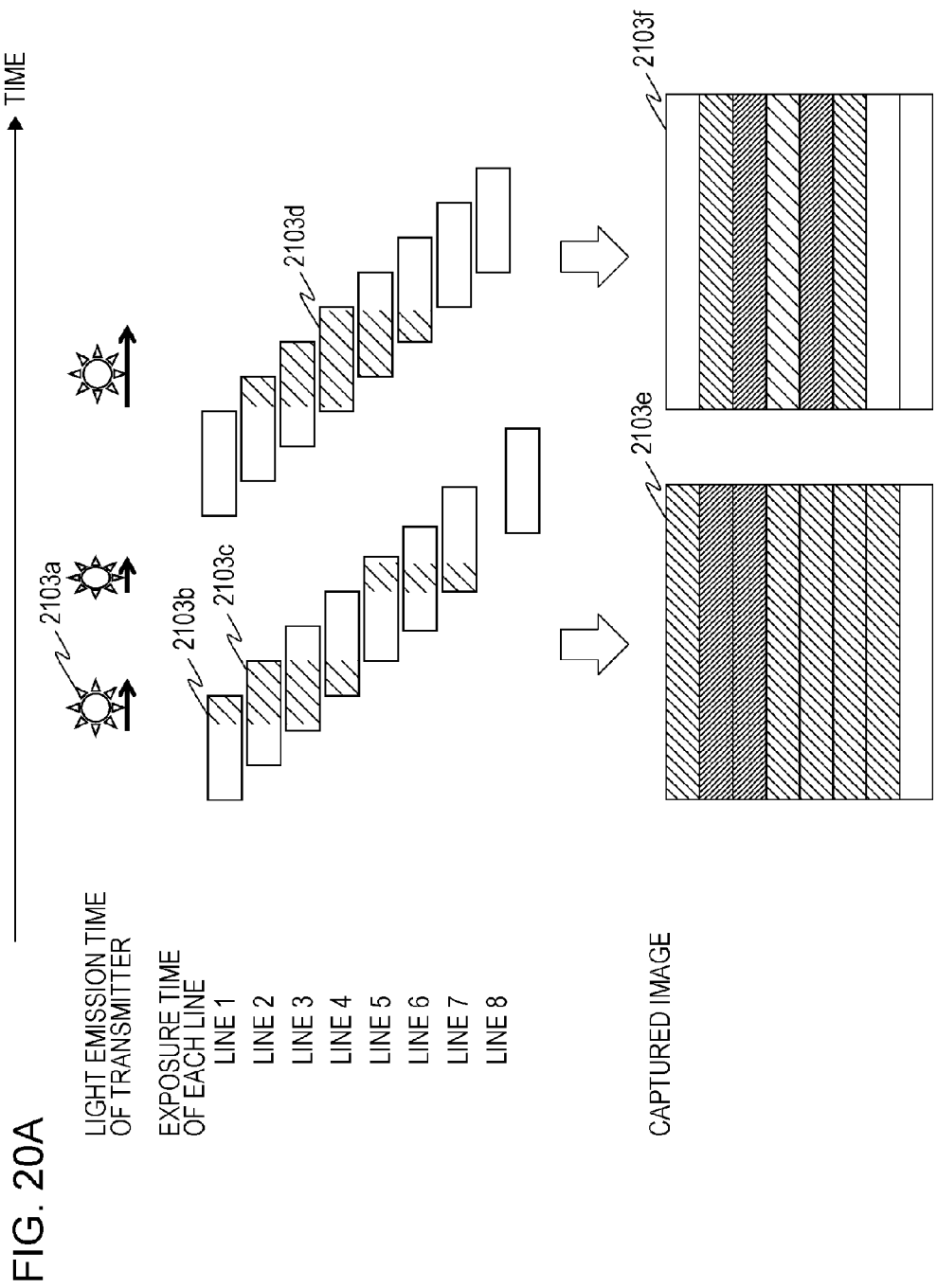

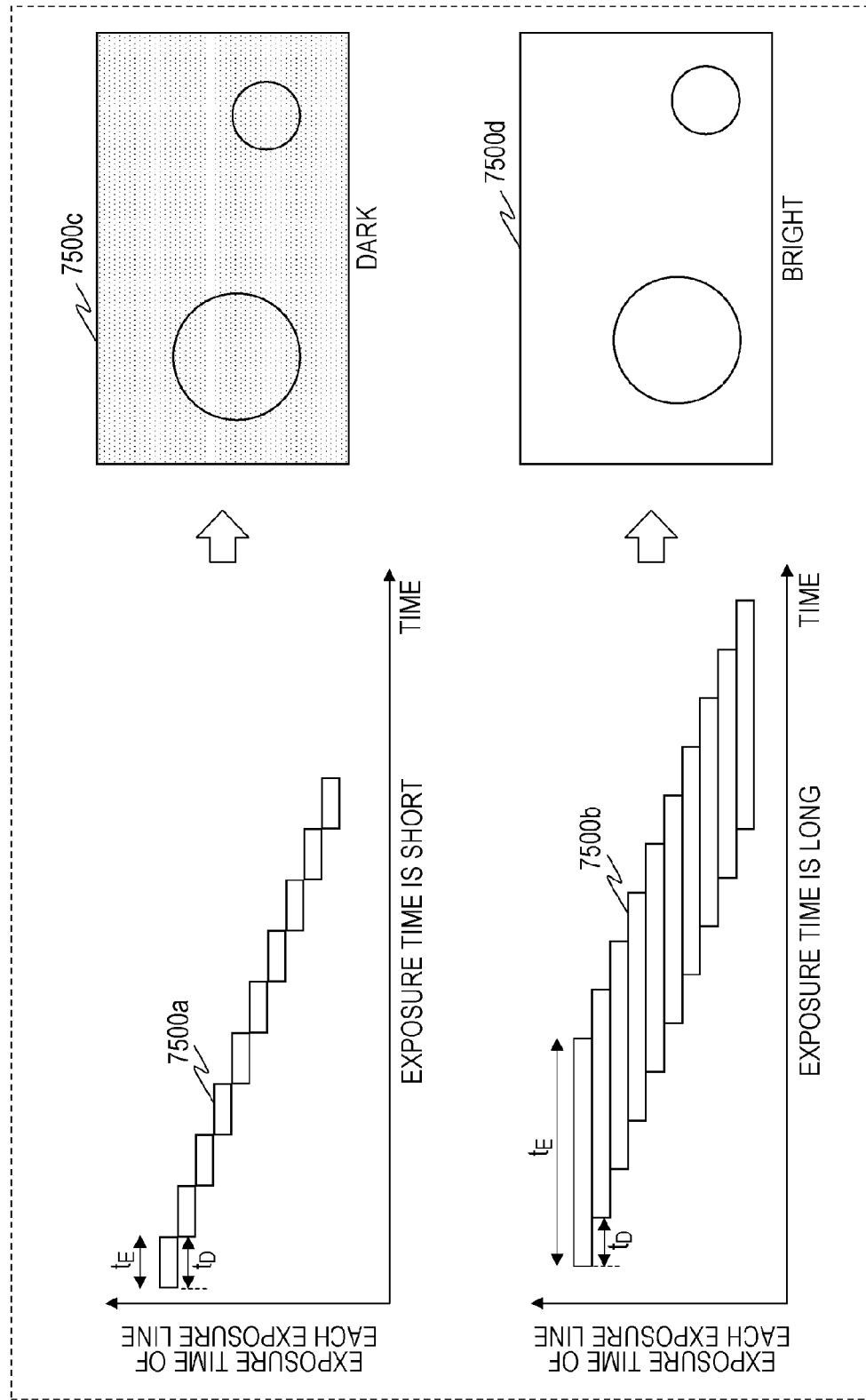

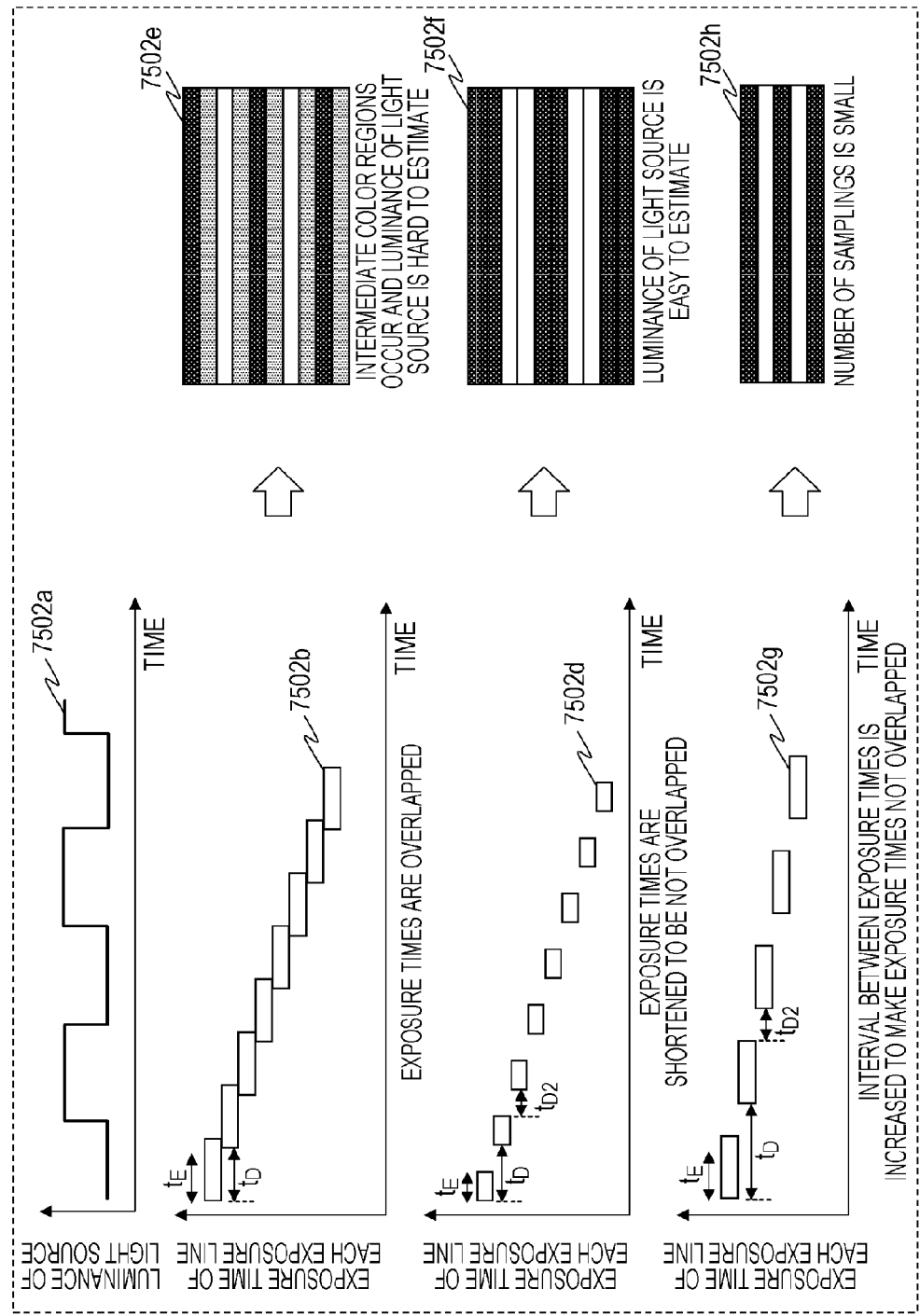

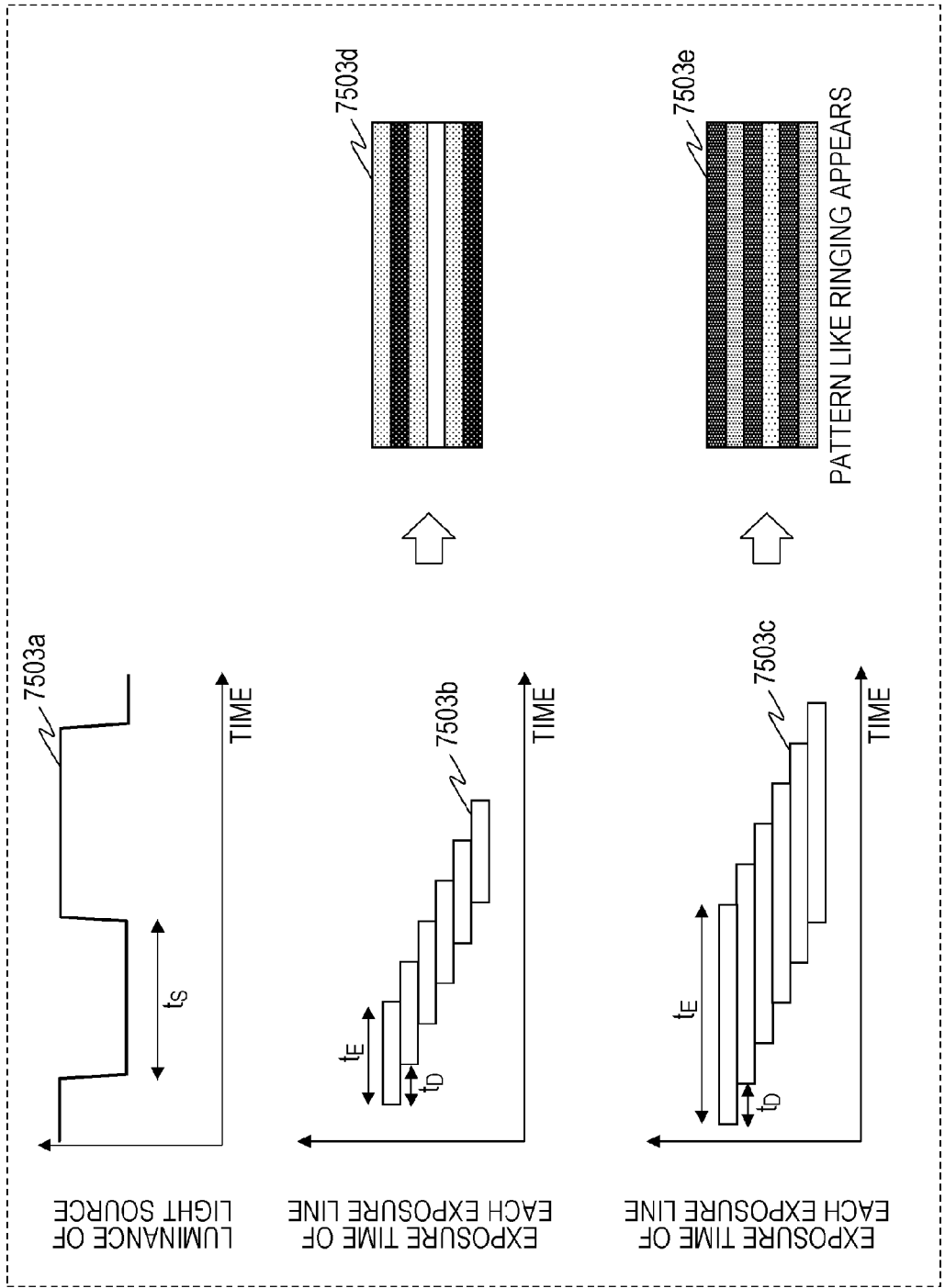

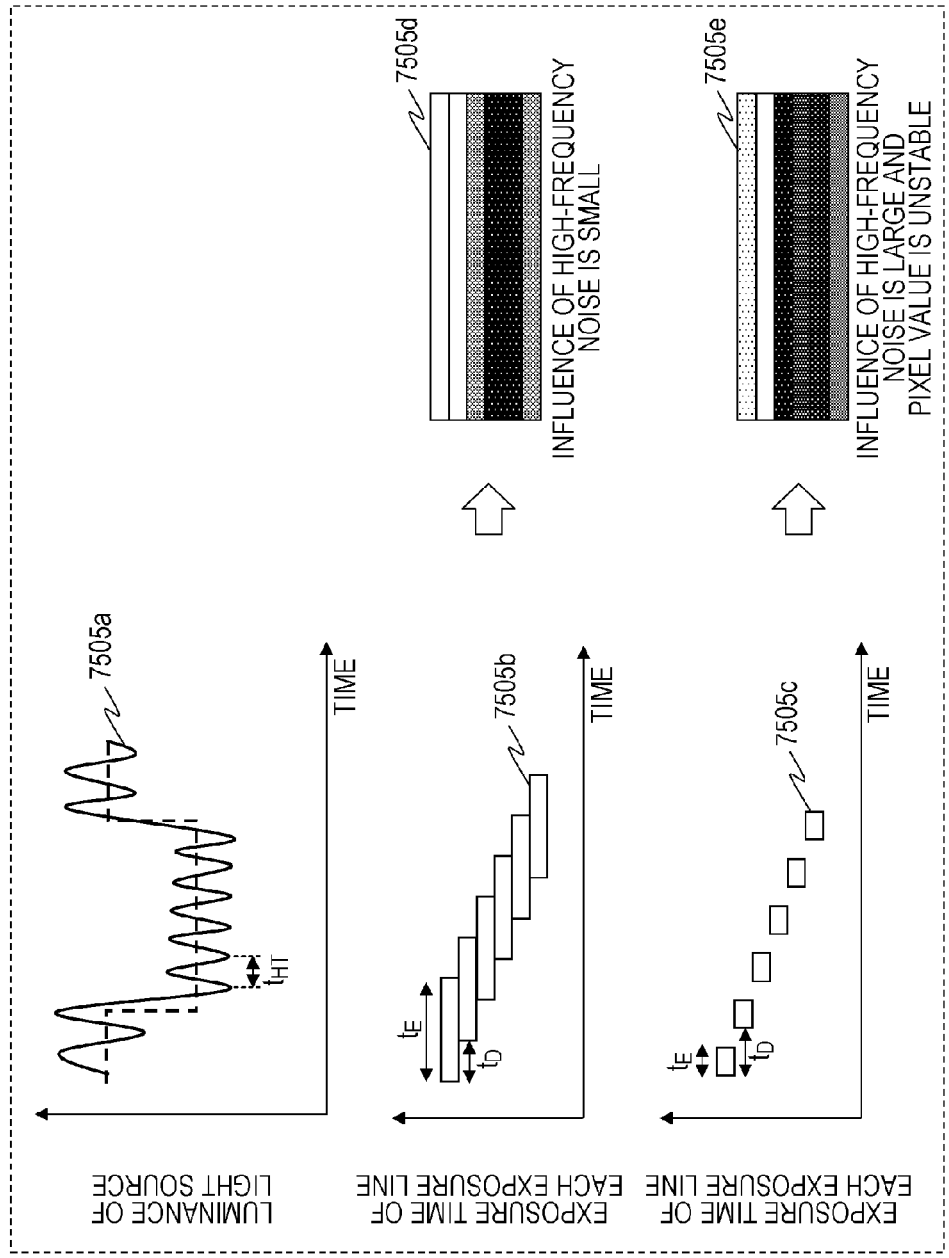

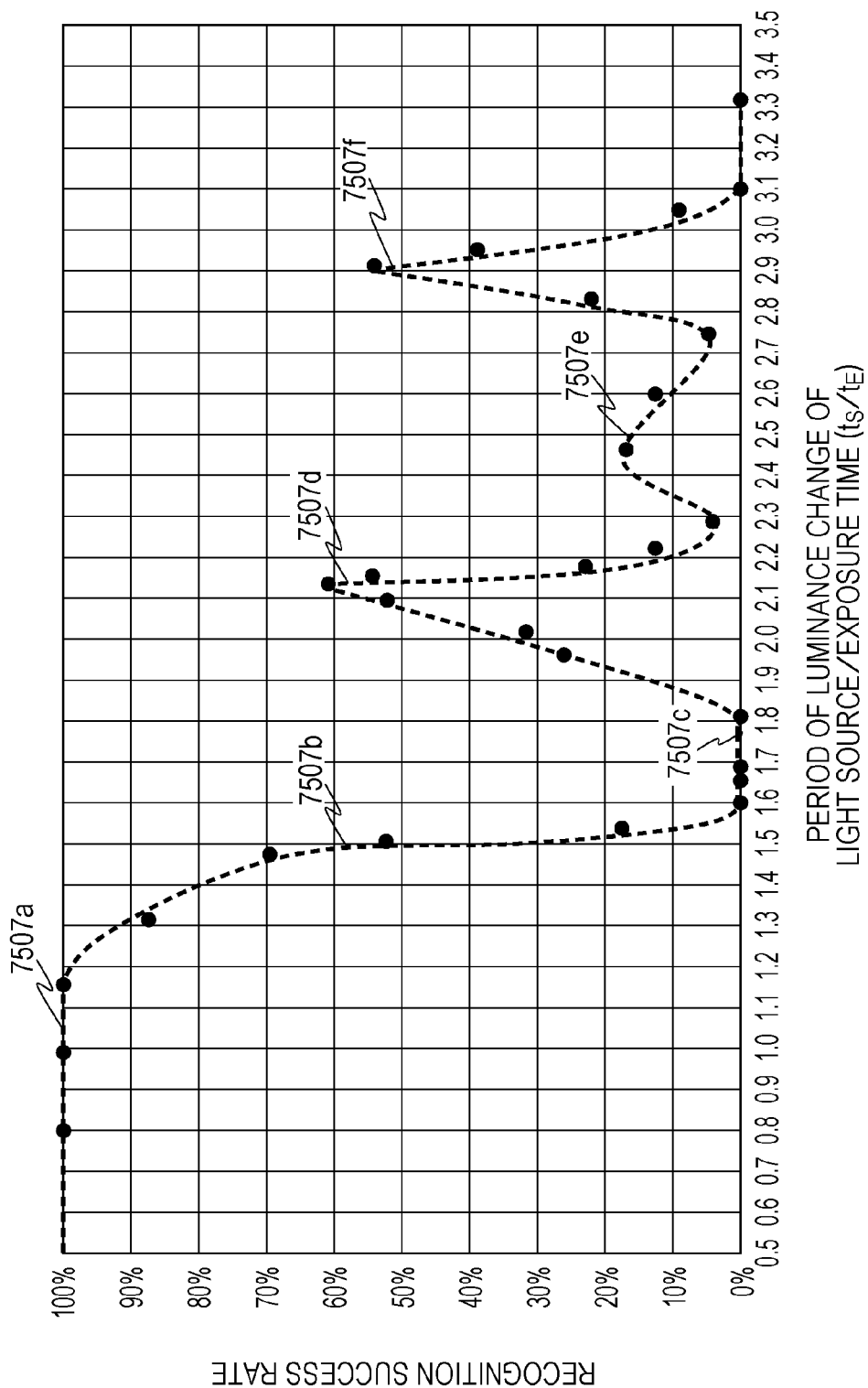

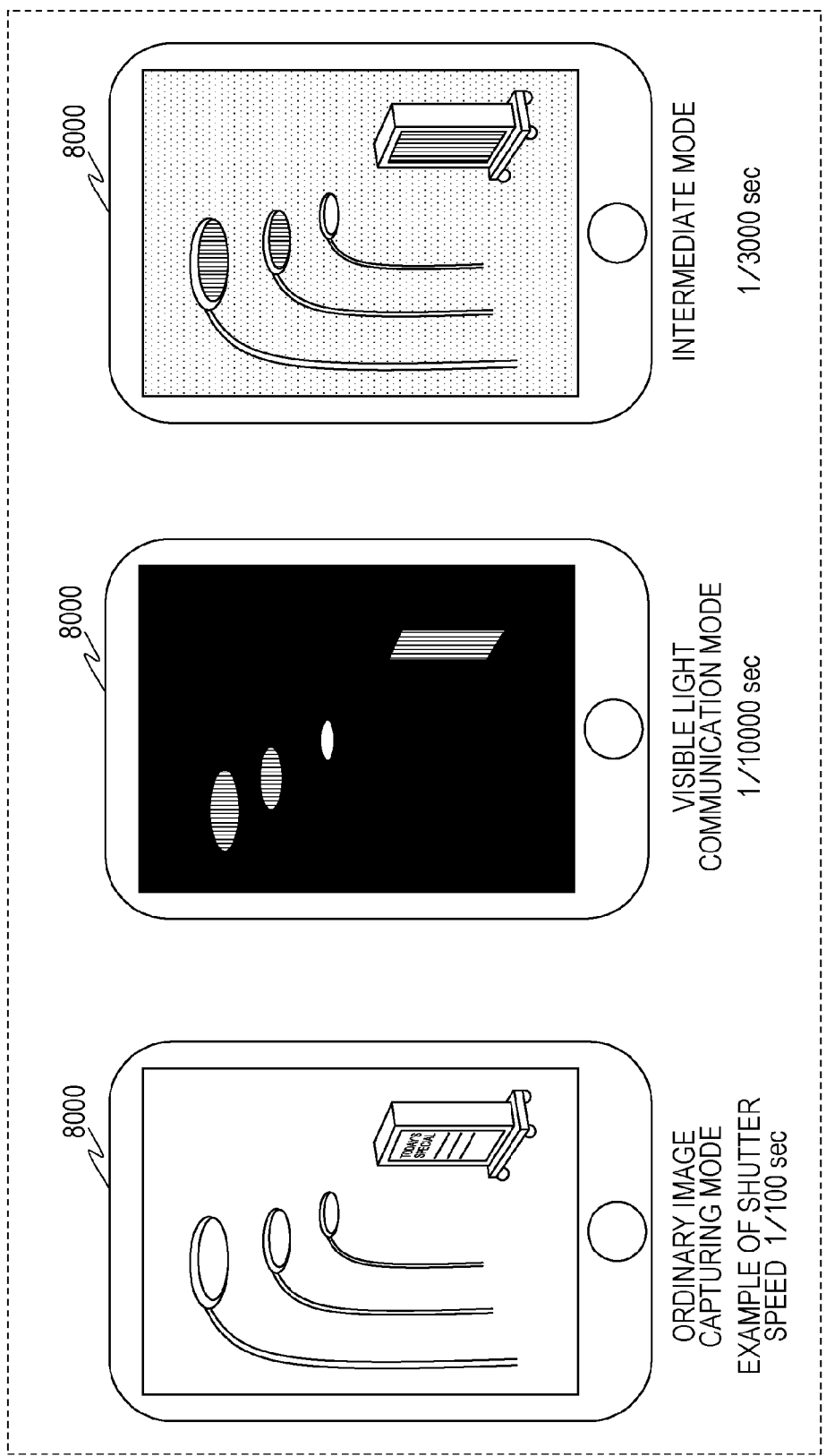

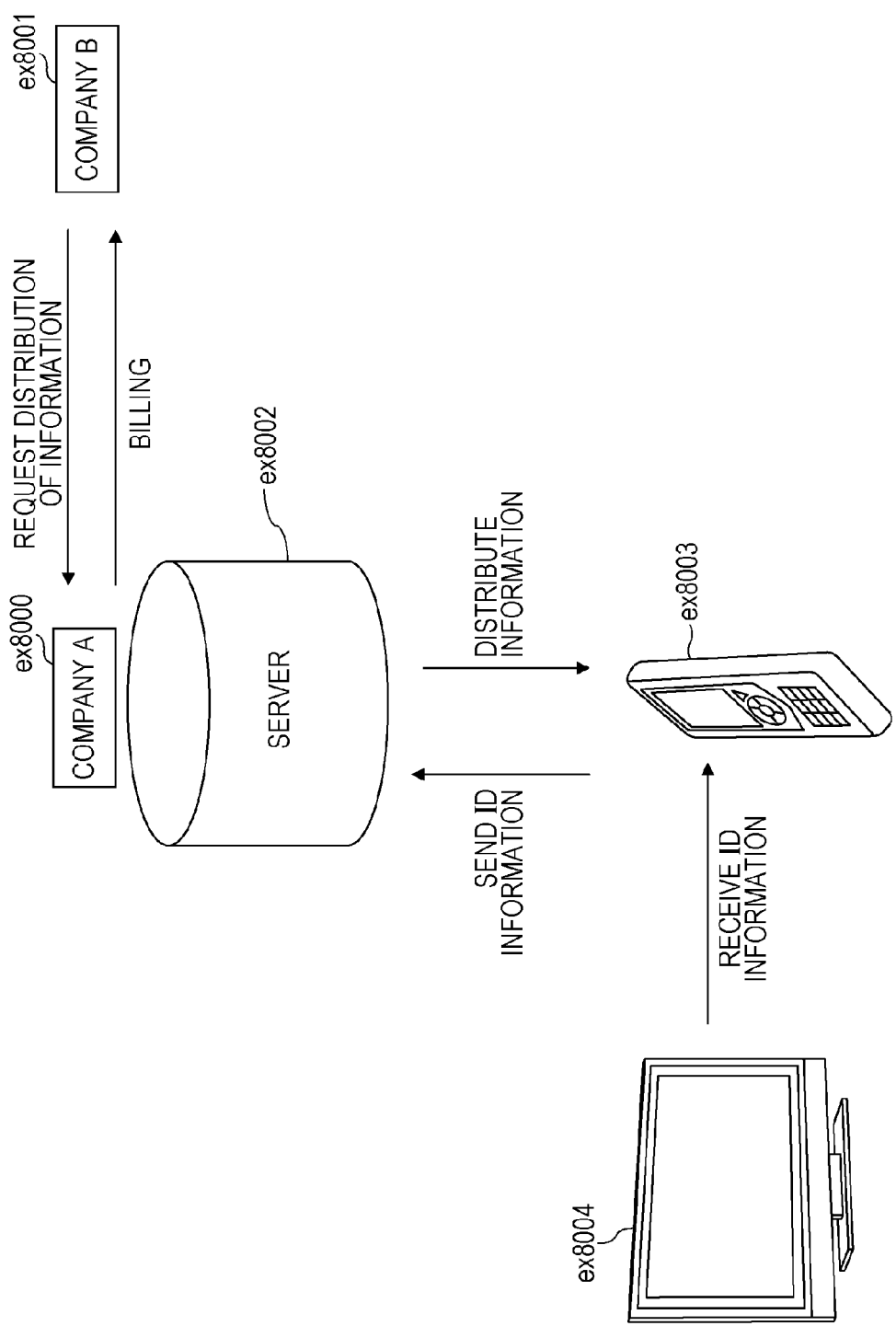

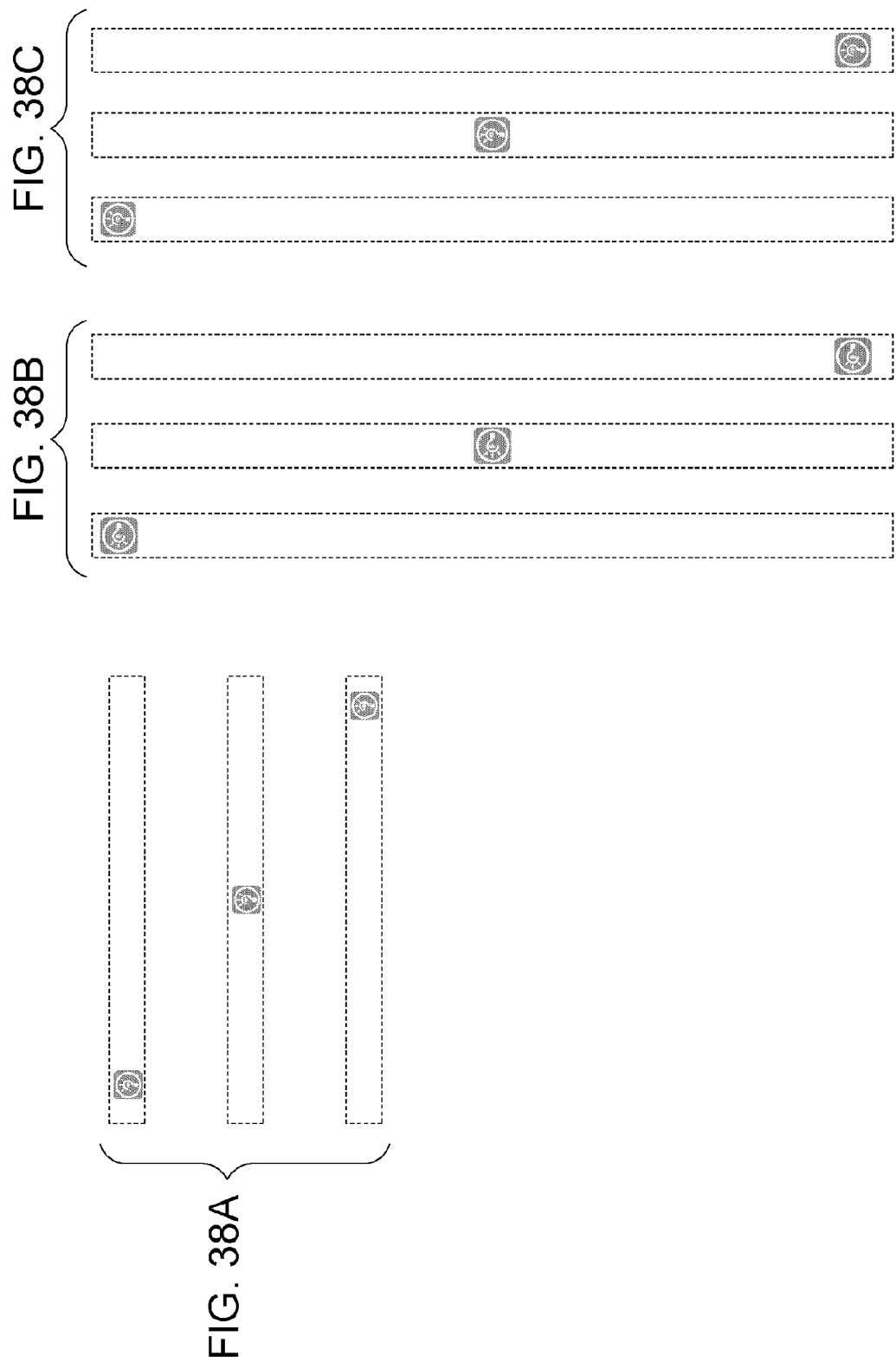

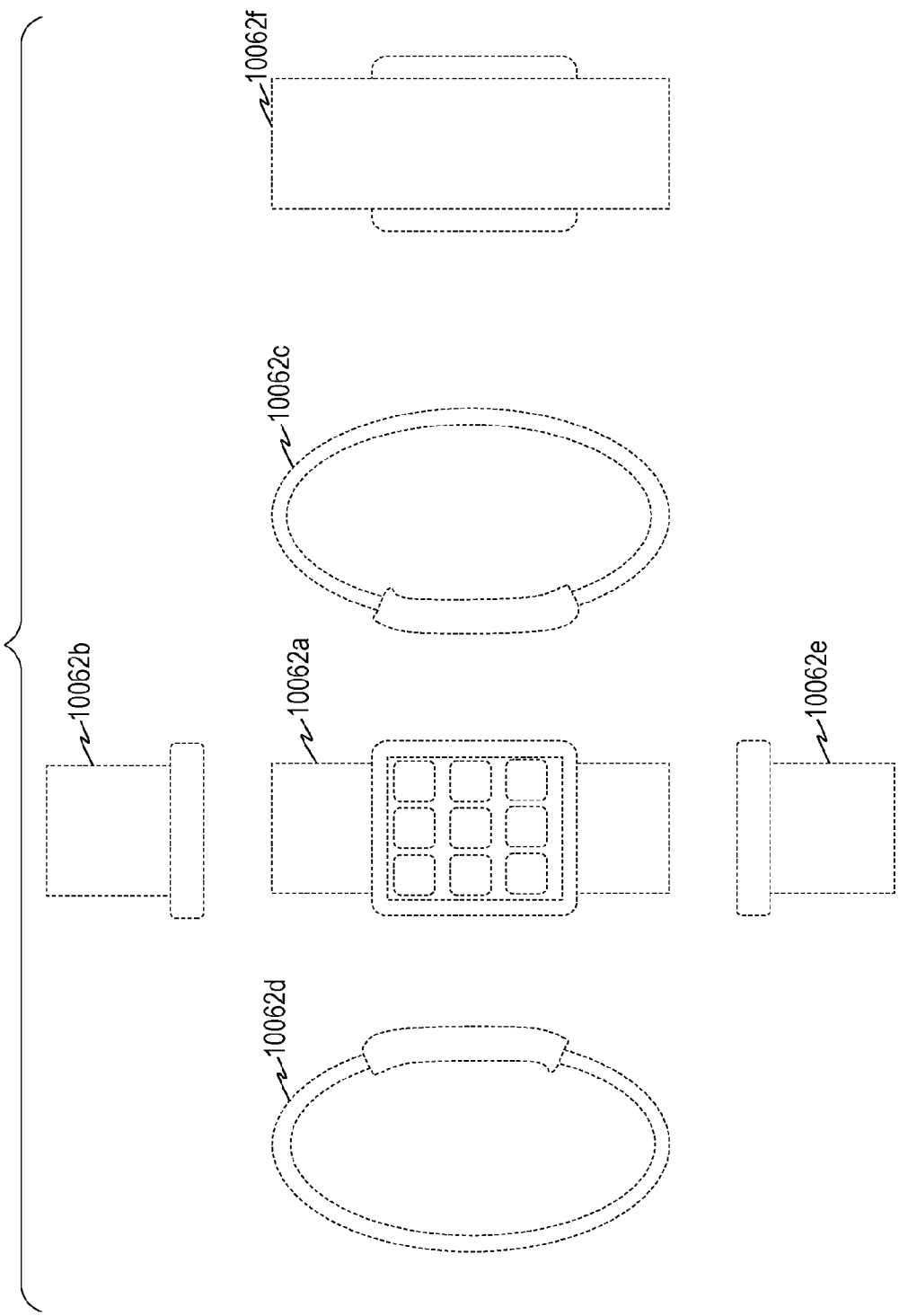

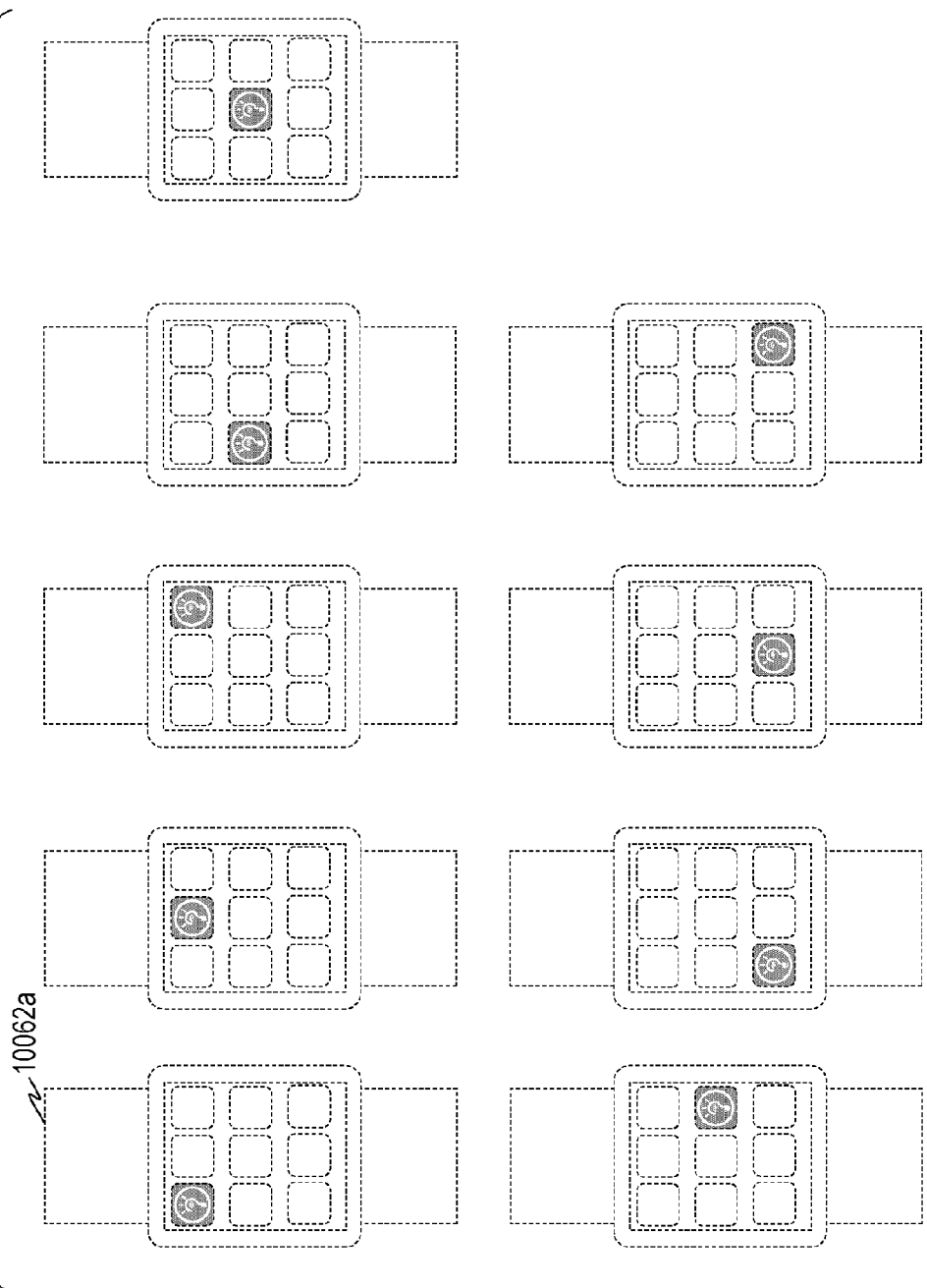

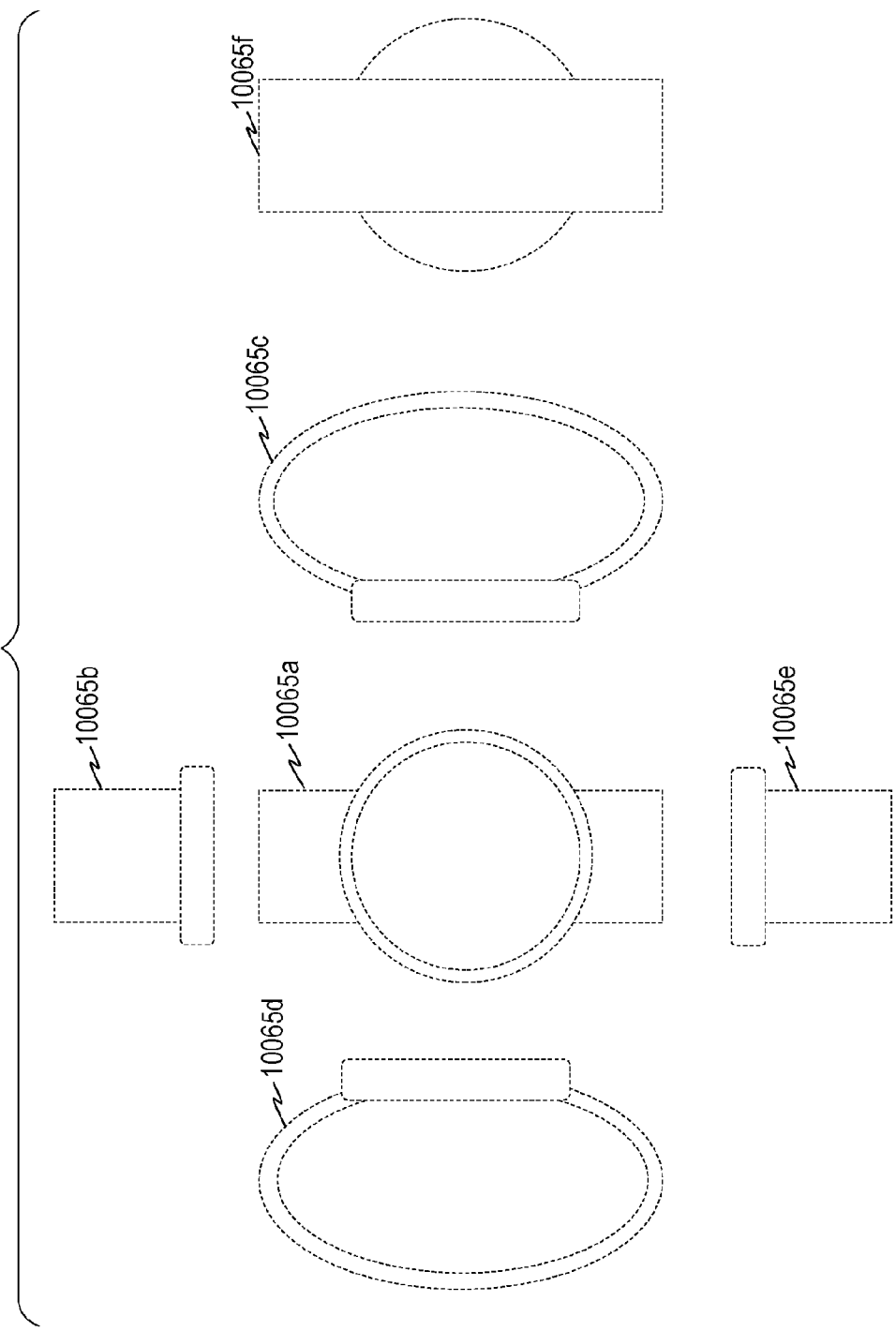

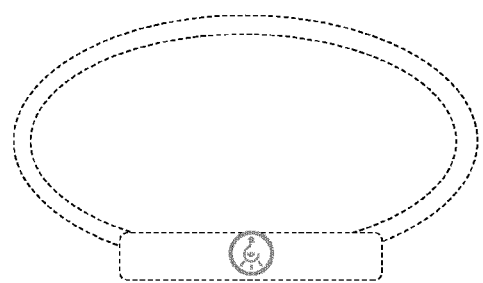
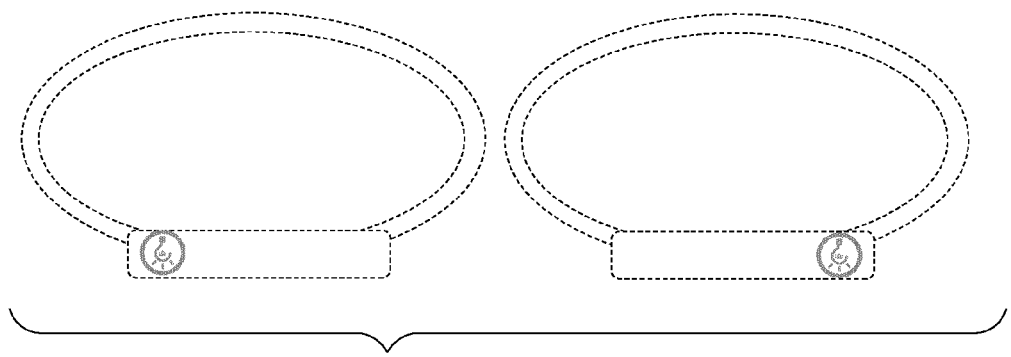
FIG. 44B
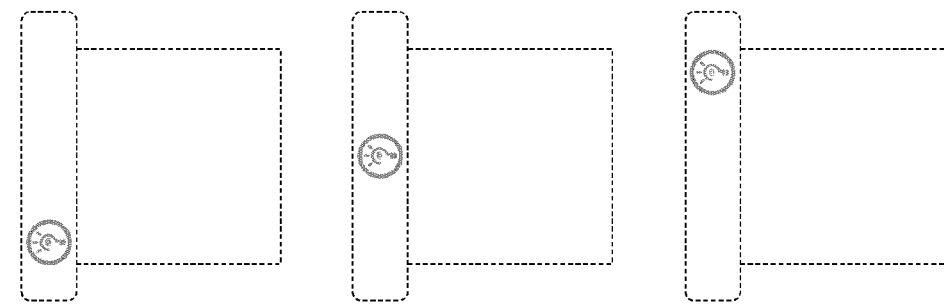
FIG. 44A

INFORMATION COMMUNICATION METHOD

BACKGROUND

1. Technical Field

The present disclosure relates to a communication method between a portable terminal, such as a smartphone, a tablet, or a cellular phone, and an electrical home appliance, such as an air conditioner, a lighting apparatus, or a rice cooker.

2. Description of the Related Art

In recent home networks, home-appliance linkage functions of enabling a variety of electrical home appliances to be connected to networks have been increasingly introduced with not only the progress of linkage of AV (Audio Visual) electrical home appliances through IP (Internet Protocol) connection using Ethernet (registered trademark) or wireless LAN (Local Area Network), but also with the development of management of power usage in consideration of environmental concerns and a Home Energy Management System (HEMS) having the function of turning on/off power from outside. However, there are electrical home appliances, which are insufficient in computing capacity to execute the communication function, or which are difficult to incorporate the communication function from the viewpoint of cost.

To cope with the above-described problem, Japanese Unexamined Patent Application Publication No. 2002-290335 discloses an optical space transmission apparatus for transmitting information through a free space with light, wherein communication is performed using a plurality of monochromatic light sources, which emit illumination lights, to realize efficient communication between devices by employing a limited number of transmission devices.

SUMMARY

However, applications of the above-described related art are limited to a device, such as a lighting apparatus, including light sources in three colors. The present disclosure is intended to solve such a problem and to provide an information communication method capable of realizing communication among a variety of devices including those ones that are poor in computing capacity.

According to one aspect of the present disclosure, there is provided an information communication method for use in a portable terminal to obtain information, the information communication method including a light receiving step of, by at least one of plural solar cells incorporated in the portable terminal and having respective directivities, receiving visible light that is emitted in a direction corresponding to the directivity of the relevant solar cell, and an information acquisition step of obtaining information by demodulating a signal that is specified by the received visible light.

Comprehensive and specific embodiments of the present disclosure may be practiced in individual forms of a system, a method, an integrated circuit, a computer program, and a recording medium such as a computer-readable CD-ROM. Furthermore, those embodiments may be further practiced in optional combinations of a system, a method, an integrated circuit, a computer program, and a recording medium.

With the present disclosure, the information communication method enabling communication to be performed among a variety of devices including those ones, which are poor in computing capacity, can be realized.

BRIEF DESCRIPTION OF THE DRAWINGS

FIG. 1 illustrates a watch incorporating photosensors in a first embodiment.

FIG. 2 illustrates one example of a receiver in the first embodiment.

FIGS. 3A and 3B illustrate other examples of the receiver in the first embodiment.

FIG. 6 illustrates another example of the reception system in the first embodiment.

FIG. 7A (a) illustrates one example of particular signals in terms of particular modulation frequencies.

FIG. 7A (b) illustrates one example of a particular bit tied to a particular modulation frequency.

FIG. 7B (b) illustrates one example of a particular bit tied to a particular modulation frequency expressed by binary optical patterns.

FIG. 7C (b) illustrates another example of different signals in terms of particular modulation frequencies.

FIG. 7C (c) illustrates one example of many values expressed by changing combination in superimposing the modulation frequencies.

FIG. 7D (a) illustrates one example of a structure of a receiver.

FIG. 7D (b) illustrates one example of receiving a mixed signal.

FIG. 7D (c) illustrates one example of specifying signals.

FIG. 7E (a) illustrates one example of a frequency division multiplexing modulation scheme.

FIG. 7E (b) illustrates one example of specifying signals from a change of a peak over time.

FIG. 9 is a flowchart illustrating a reception method, which is designed to eliminate interference, in the first embodiment.

FIG. 10 is a flowchart illustrating a method of estimating the azimuth of a transmitter in the first embodiment.

FIGS. 15A, 15B and 15C illustrate examples of a light control method (method of adjusting brightness) in a transmitter in the first embodiment.

FIG. 19 illustrates still another example of the method of observing the luminance of the light emitting unit in the second embodiment.

FIG. 20A illustrates still another example of the method of observing the luminance of the light emitting unit in the second embodiment.

FIG. 20B illustrates still another example of the method of observing the luminance of the light emitting unit in the second embodiment.

FIG. 20D illustrates still another example of the method of observing the luminance of the light emitting unit in the second embodiment.

FIG. 20E illustrates still another example of the method of observing the luminance of the light emitting unit in the second embodiment.

FIG. 20G illustrates still another example of the method of observing the luminance of the light emitting unit in the second embodiment.

FIG. 20I illustrates still another example of the method of observing the luminance of the light emitting unit in the second embodiment.

FIG. 21 illustrates one example of various modes of a receiver in the second embodiment.

FIG. 23 illustrates a service providing system using the reception method according to the embodiment.

FIGS. 38A, 38B and 38C are illustrations to explain logos in the fourth embodiment.

FIG. 39 is an illustration to explain logos in the fourth embodiment.

FIG. 40 is an illustration to explain logos in the fourth embodiment.

FIG. 42 is an illustration to explain logos in the fourth embodiment.

FIGS. 44A and 44B are illustrations to explain logos in the fourth embodiment.

DETAILED DESCRIPTION

Figure 4A:
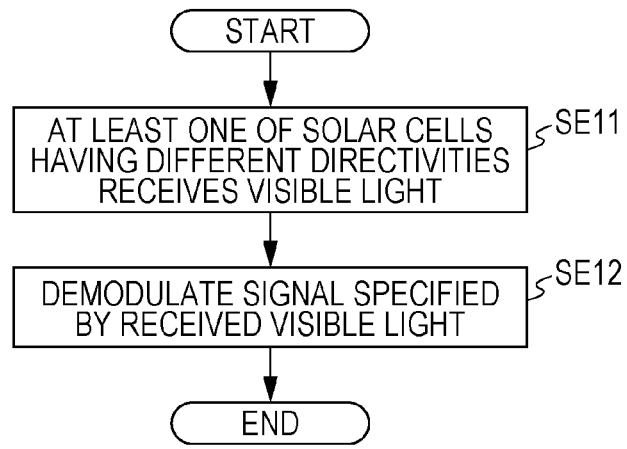
FIG. 4A is a flowchart illustrating an information communication method according to one aspect of the present disclosure.

An information communication method according to one aspect of the present disclosure is an information communication method for use in a portable terminal to obtain information, the method including a light receiving step of, by at least one of plural solar cells incorporated in the portable terminal and having respective directivities, receiving visible light that is emitted in a direction corresponding to the directivity of the relevant solar cell, and an information acquisition step of obtaining information by demodulating a signal that is specified by the received visible light.

With those features, the solar cell can also be used for solar power generation while it is used as a photosensor. Therefore, the cost of the portable terminal for obtaining information can be reduced, and the portable terminal can be made more compact. Since the plural solar cells have respective directivities different from one another, it is possible to, based on the directivity of the solar cell having received the visible light, estimate a direction in which a transmitter emitting the relevant visible light is present. Furthermore, since the plural solar cells have respective directivities different from one another, visible lights emitted from a plurality of transmitters can be received in a distinguishable way, and different items of information from the plural transmitters can be obtained appropriately.

In the light receiving step, the relevant solar cell may receive the visible light having passed through a prism that is included in the portable terminal.

With that feature, the direction in which the transmitter emitting the visible light is present can be estimated with high accuracy while the number of solar cells incorporated in the portable terminal can be held smaller.

The portable terminal may be a wristwatch, the plural solar cells may be arranged along a circumferential edge of a dial plate of the wristwatch, and directions of the visible lights received by the plural solar cells may be different from one another.

With that feature, different items of information can be appropriately obtained with the wristwatch.

The information communication method may further include a wireless communication step of, by the portable terminal, transmitting a control signal to a lighting apparatus via wireless communication that is different from visible light communication, a visible light communication step of, by the lighting apparatus, performing the visible light communication by changing luminance in accordance with the control signal, and an execution step of, by a control object appliance, detecting a luminance change of the lighting apparatus, demodulating a signal that is specified by the detected luminance change, to thereby obtain the control signal, and executing a process in accordance with the control signal.

With those features, even when the portable terminal does not have the function of changing luminance for the visible light communication, the portable terminal can change the luminance of the lighting apparatus instead of itself and can appropriately control the control target appliance.

The above-mentioned comprehensive and specific embodiments of the present disclosure may be practiced in individual forms of a system, a method, an integrated circuit, a computer program, and a recording medium such as a computer-readable CD-ROM. Furthermore, they may be practiced in optional combinations of a system, a method, an integrated circuit, a computer program, and a recording medium.

Embodiments of the present disclosure will be described in detail below with reference to the drawings.

It is to be noted that the following embodiments represent comprehensive or specific examples. Numerical values, shapes, materials, components, arranged positions and connection forms of the components, steps, sequences of steps, and so on, which are described in the following embodiments, are merely illustrative, and they are not purported to limit the present disclosure. Of the components in the following embodiments, those ones other than the components not stated in dependent claims, which define most significant concepts, are described as optional components.

First Embodiment

Reception of Signals Coming from Plural Directions by Plural Light Receiving Units FIG. 1 illustrates a watch incorporating photosensors.

The watch illustrated in FIG. 1 is constituted as a receiver for visible light communication, and it includes a plurality of photosensors and condensing lenses corresponding respectively to the photosensors. More specifically, as illustrated in a cross-sectional view of FIG. 1, the condensing lenses are each arranged on an upper surface of the photosensor. In FIG. 1, the condensing lens is arranged at a predetermined inclination. The shape of the condensing lens is not limited to the illustrated one, and the condensing lens may have any other suitable shape capable of condensing light. With such an arrangement, the photosensor can receive light from a light source in the outside after condensing the light through the condensing lens. Accordingly, even a small photosensor incorporated in a watch is able to perform visible light communication. In FIG. 1, the watch is divided into twelve regions, twelve photosensors are arranged respectively in the twelve regions, and the condensing lens is arranged on the upper surface of each photosensor. By dividing the watch into plural regions and arranging the plural photosensors, it is possible to obtain different items of information from plural light sources. For example, in FIG. 1, light from a light source 1 can be received by a first photosensor, and light from a light source 2 can be received by a sixth photosensor. A solar cell may be used as the photosensor. When a solar cell is used as the photosensor, not only solar power generation, but also visible light communication can be performed by a single photosensor. Therefore, cost reduction and a more compact shape can be realized. Furthermore, when the plural photosensors are arranged, accuracy in estimating a position can be increased because different items of information can be obtained from the plural light sources at the same time. While, in this embodiment, the photosensors are disposed in the watch, embodiments are not limited to the illustrated one, and the photosensors may be disposed in another type of device in the form of a mobile terminal, such as a cellular phone or a portable terminal.

FIG. 2 illustrates one example of a receiver in the first embodiment.

A receiver 9020a constituted in the form of a wristwatch, for example, includes a plurality of light receiving units. In more detail, as illustrated in FIG. 2, the receiver 9020a includes a light receiving unit 9020b arranged at an upper end of a rotating shaft that supports a long hand and a short hand of the wristwatch, and a light receiving unit 9020c arranged in a circumferential edge portion of the wristwatch at a position near a character indicating twelve o'clock. The light receiving unit 9020b receives light advancing toward the light receiving unit 9020b in the axial direction of the above-mentioned rotating shaft, and the light receiving unit 9020c receives light advancing toward the light receiving unit 9020c in the direction interconnecting the above-mentioned rotating shaft and the character indicating twelve o'clock. Therefore, when a user holds the receiver 9020a in front of the chest as in the case of checking time, the light receiving unit 9020b can receive light coming from above. As a result, the receiver 9020a can receive a signal provided by illumination from the ceiling. Moreover, when the user holds the receiver 9020a in front of the chest as in the case of checking time, the light receiving unit 9020c can receive light coming from the front side. As a result, the receiver 9020a can receive a signal provided from, e.g., a signage at the front side.

By giving directivity to each of the light receiving units 9020b and 9020c, the light receiving unit can receive the desired signal without interference even when there is a plurality of transmitters nearby.

FIGS. 3A and 3B illustrate other examples of the receiver in the first embodiment.

As illustrated in FIG. 3A, a receiver 9021 constituted in the form of a wristwatch includes, for example, seventeen light receiving elements (units). Those light receiving elements are arranged on a dial plate of the wristwatch. Of those light receiving elements, twelve light receiving elements are arranged at positions corresponding to one to twelve o'clock on the dial plate, and the remaining five light receiving elements are arranged in a central portion of the dial plate. The seventeen light receiving elements have different directivities from one another and receive lights (signals) coming from corresponding directions, respectively. By arranging the plural light receiving elements with different directivities as mentioned above, the receiver 9021 can estimate the direction of the received signal. Moreover, as illustrated in FIG. 3B, a prism for introducing light to the light receiving element may be arranged in front of the light receiving element. In other words, the receiver 9021 may include eight light receiving elements that are arranged in the circumferential edge portion of the dial plate at equal intervals, and a plurality of prisms 9021a to 9021c each serving to introduce light to at least one of the eight light receiving elements. With the provision of the prisms, the direction of a transmitter can be finely estimated even by employing a smaller number of light receiving elements. For example, when only the light receiving element 9021d of the eight light receiving elements receives light from a transmitter, the receiver 9021 can estimate that the transmitter is present in the direction interconnecting the center of the dial plate and a prism 9021a. When the light receiving element 9021d and the light receiving element 9021e receive the same signal, the receiver 9021 can estimate that the transmitter is present in the direction interconnecting the center of the dial plate and the prism 9021b. The function of providing directivity and the function of a prism may be incorporated in a windshield of the wristwatch.

FIG. 4A is a flowchart illustrating an information communication method according to one aspect of the present disclosure.

The information communication method according to one aspect of the present disclosure is an information communication method enabling a portable terminal to obtain information, and it includes steps SE11 and SE12.

More specifically, the information communication method includes a light receiving step (SE11) of, by at least one of plural solar cells incorporated in a portable terminal and having respective directivities, receiving visible light that is emitted in a direction corresponding to the directivity of the relevant solar cell, and an information acquisition step (SE12) of obtaining information by demodulating a signal that is specified by the received visible light.

Figure 4B:
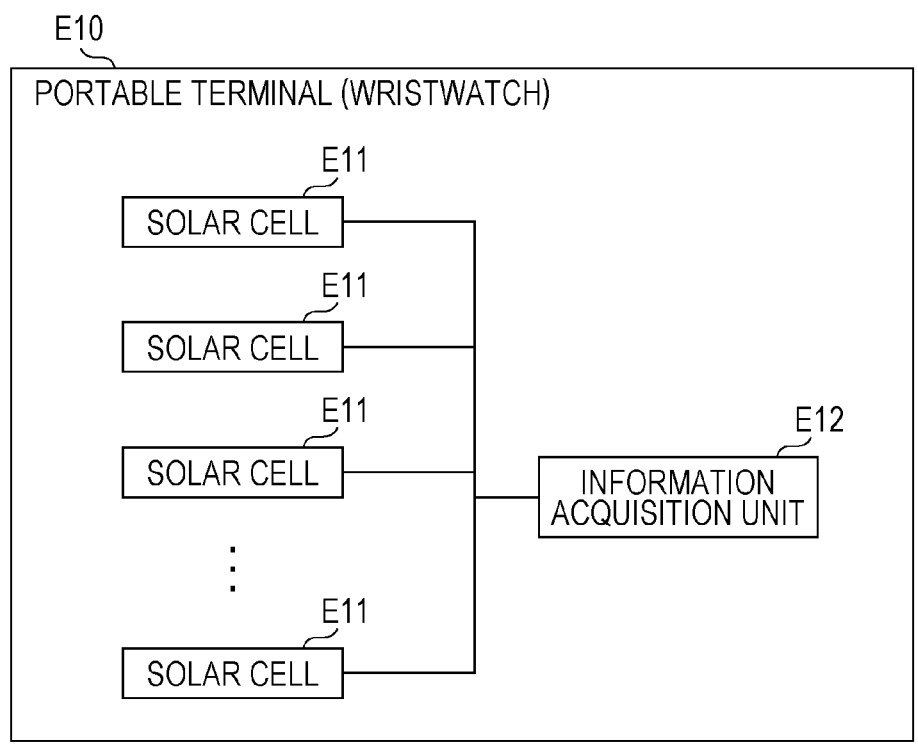
FIG. 4B is a block diagram of a portable terminal according to one aspect of the present disclosure.

FIG. 4B is a block diagram of a portable terminal according to one aspect of the present disclosure.

A portable terminal E10 according to one aspect of the present disclosure is a portable terminal that obtains information, and it includes a plurality of solar cells E11 having respective directivities, and an information acquisition unit E12. When at least one of the plural solar cells E11 receives visible light emitted in the direction corresponding to the directivity of the relevant solar cell E11, the information acquisition unit E12 obtains information by demodulating a signal that is specified by the received visible light.

According to the information communication method and the portable terminal E10 illustrated in FIGS. 4A and 4B, the solar cells E11 can be used as not only a photosensor for visible light communication, but also as a power generation cell. Therefore, the cost of the portable terminal E10 for obtaining information can be reduced, and the portable terminal E10 can be made more compact. Furthermore, since the plural solar cells E11 have respective directivities different from one another, it is possible to, based on the directivity of the solar cell E11 having received visible light, to estimate the direction in which a transmitter having emitted the relevant visible light is present. In addition, since the plural solar cells E11 have respective directivities different from one another, respective visible lights emitted from a plurality of transmitters can be received in a distinguishable manner, and different items of information from the plural transmitters can be obtained appropriately.

In the light receiving step (SE11), as illustrated in FIG. 3B, the solar cell E11 (9021d or 9021e) may receive the visible light having passed through the prism (9021a, 9021b or 9021c) that is disposed in the portable terminal E11 (9021). With such an arrangement, the direction in which the transmitter emitting the relevant visible light can be estimated with high accuracy while the number of the solar cells E11 disposed in the portable terminal E10 can be held smaller. Moreover, as illustrated in FIG. 3, the portable terminal E10 may be the wristwatch. The plural solar cells E11 (light receiving units) may be arranged along the circumferential edge of the dial plate of the wristwatch, and the directions of visible lights received respectively by the plural solar cells E11 may be different from one another. With that arrangement, the wristwatch constituting the portable terminal can obtain information appropriately.

(Linkage Between Wristwatch-Type Receiver and Smartphone)

Figure 5:
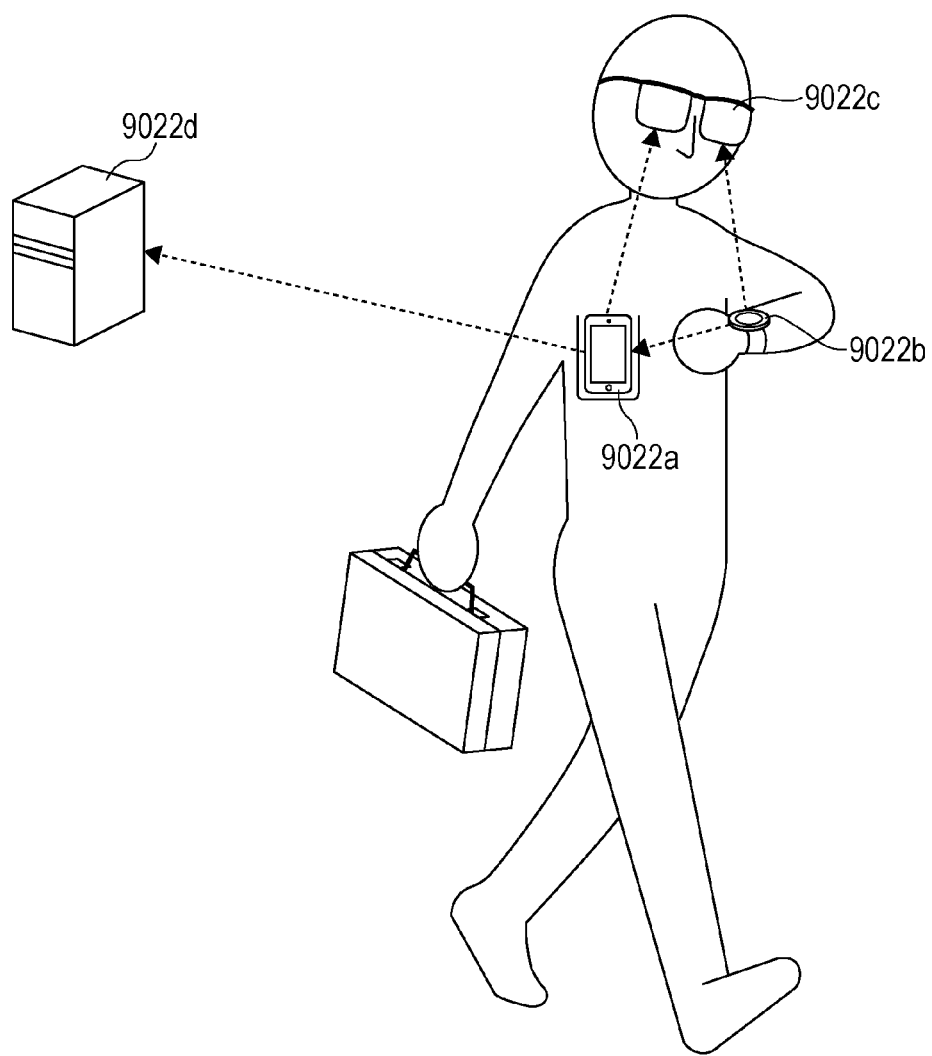
FIG. 5 illustrates one example of a reception system in the first embodiment.

FIG. 5 illustrates one example of a reception system in the first embodiment.

A receiver 9022b constituted in the form of a wristwatch, for example, is connected to a smartphone 9022a or a spectacle-type wearable display 9022c through wireless communication, e.g., Bluetooth (registered trademark). When the receiver 9022b has received a signal or has confirmed the presence of a signal, the receiver 9022b displays, on the display 9022c, information indicating that the signal has been received. Furthermore, the receiver 9022b transfers the received signal (reception signal) to the smartphone 9022a. The smartphone 9022a obtains data, which is tied to the reception signal, from a server 9022d, and displays the obtained data on the spectacle-type wearable display 9022c.

(Navigation with Wristwatch-Type Display)

FIG. 6 illustrates another example of the reception system in the first embodiment.

A receiver 9023b constituted in the form of a wristwatch, for example, is connected to the smartphone 9022a through wireless communication, e.g., Bluetooth (registered trademark). The receiver 9023b includes a dial plate constituted as a display of liquid crystal type, for example, and it can additionally display information other than time. The smartphone 9022a recognizes a current position from a signal received by the receiver 9023b, and then displays the route or the distance up to a destination on a display screen of the receiver 9023b.

(Frequency Shift Keying Modulation and Frequency Division Multiplexing Modulation)

Figure 7B:
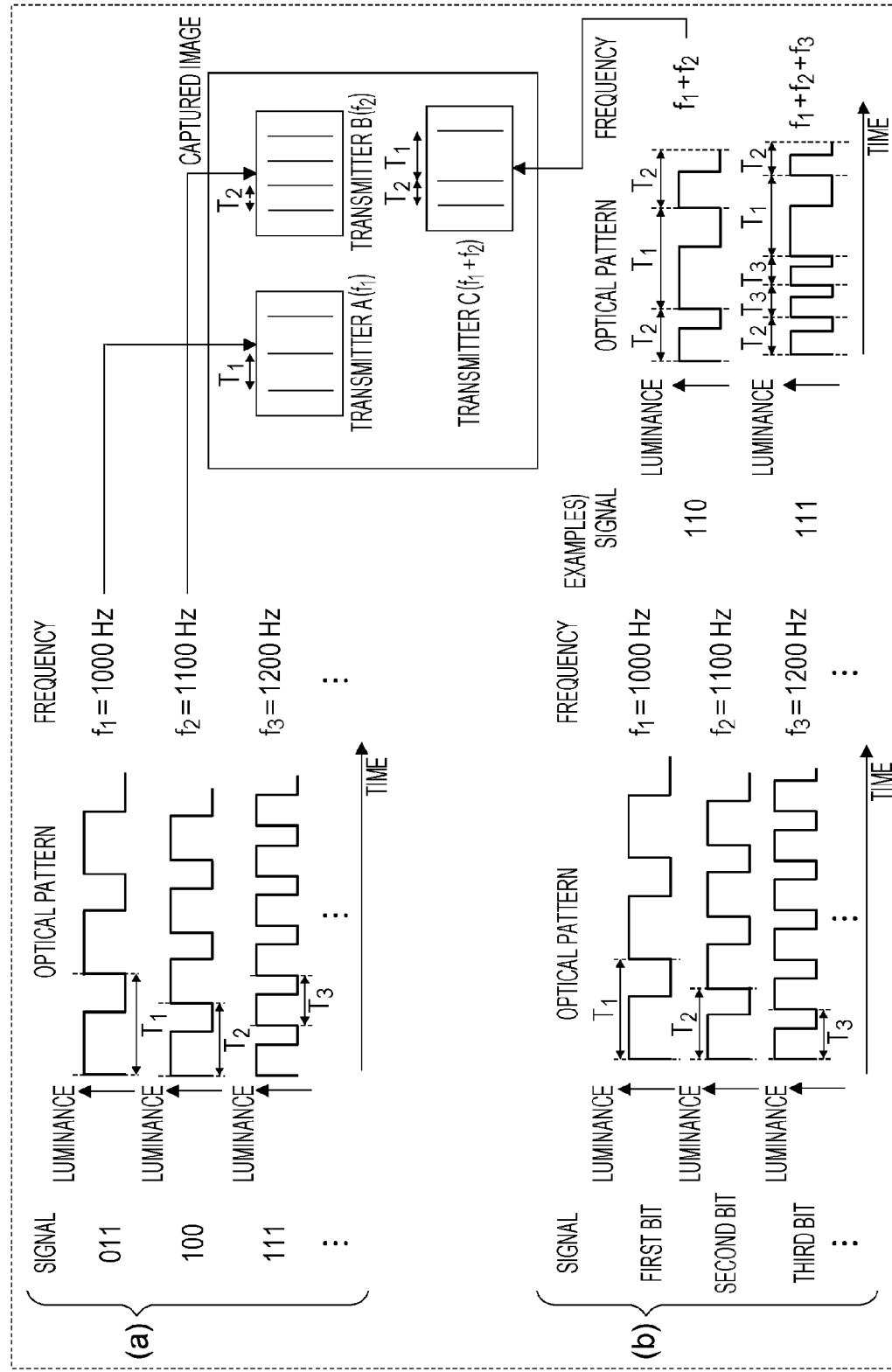
FIG. 7B (a) illustrates one example of particular signals in terms of particular modulation frequencies expressed by binary optical patterns.
Figure 7C:
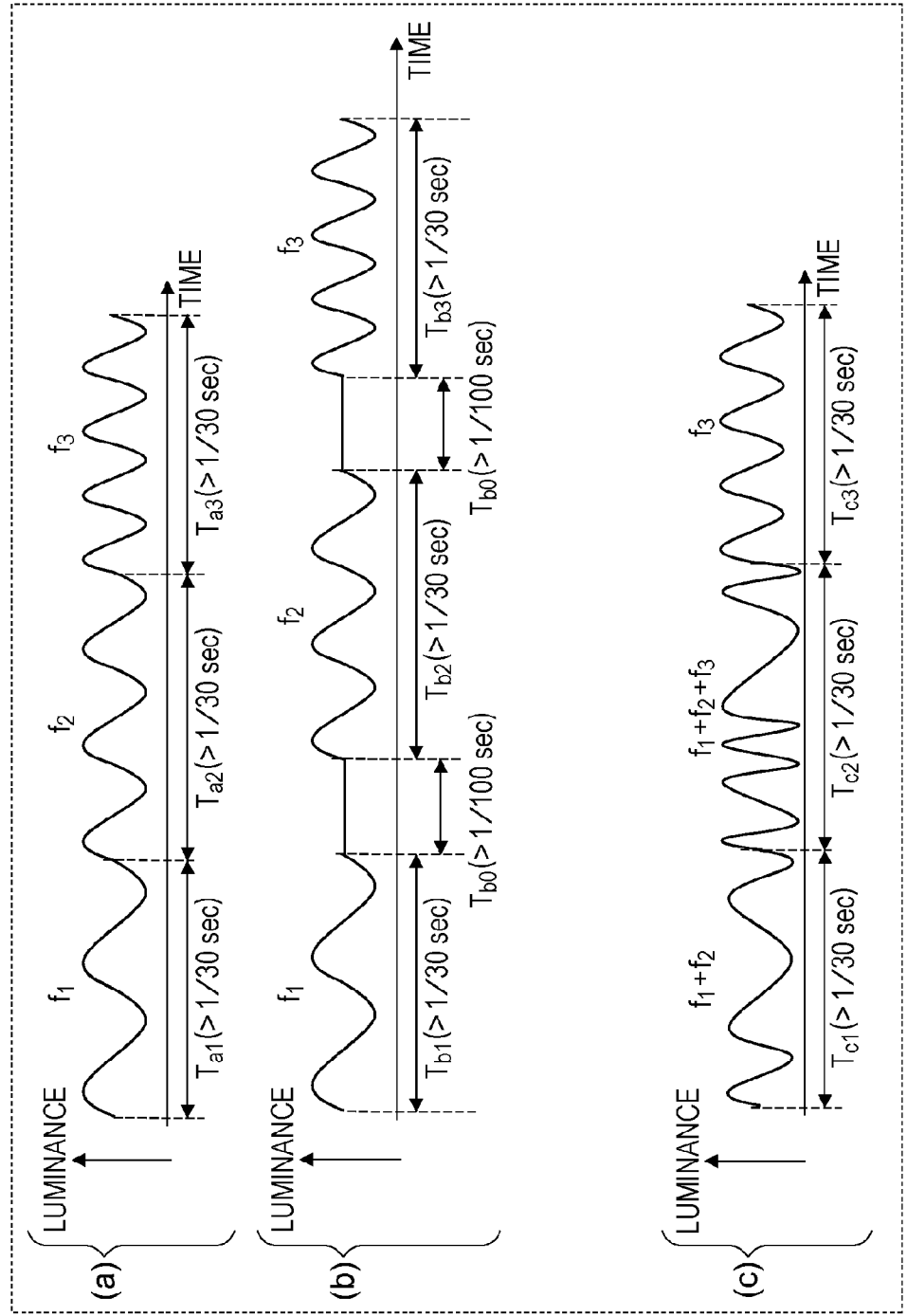
FIG. 7C (a) illustrates one example of different signals in terms of particular modulation frequencies.

FIGS. 7A, 7B and 7C illustrate examples of a modulation scheme in the first embodiment.

In FIG. 7A, (a) represents particular signals in terms of particular modulation frequencies. The receiving side determines a dominant modulation frequency by executing a frequency analysis of an optical pattern (i.e., a pattern of luminance change of a light source), and then restores a signal.

Many values can be expressed by changing the modulation frequency with time as illustrated at (a) in FIG. 7C. Because an image-capturing frame rate of a general image sensor is 30 fps, one modulation frequency can be reliably received by continuing the one modulation frequency for a 1/30 second or longer. Furthermore, as illustrated at (b) in FIG. 7C, by setting, when the modulation frequency is changed, a time between different frequencies during which no signal is superimposed, a receiver can more easily recognize a change of the modulation frequency. An optical pattern during the time in which no signal is superimposed can be distinguished from that in a signal-superimposed zone by setting the former optical pattern to have constant brightness or a particular modulation frequency. The particular modulation frequency used in the above-described case is preferably set to a frequency, which is integer multiple of 30 Hz, for the reason that such a frequency is hard to appear in a differential image and is less apt to impede the reception process. The reception is facilitated by setting a length of the time during which no signal is superimposed to be not shorter than the length of one of optical patterns used for the signals, the one having the longest period. For example, when the lowest modulation frequency of the optical pattern is 100 Hz, the length of the time during which no signal is superimposed is set to 1/100 sec or longer.

Moreover, (b) in FIG. 7A represents an example (1) in which a particular bit is tied to a particular modulation frequency, and respective particular modulation frequencies corresponding bits taking 1 are superimposed, to thereby define a waveform expressing the optical pattern. Comparing the modulation scheme illustrated at (a) in FIG. 7A, a higher CN ratio (Carrier to Noise Ratio) is required, but a larger number of values can be expressed. However, the example (1) has the problem that when the number of bits turning to be on is large, i.e., when the waveform includes a larger number of frequencies, energy per frequency is reduced and a higher CN ratio is required.

The above-mentioned problem can be avoided by (2) limiting the number of frequencies included in the waveform to a predetermined number or less, i.e., by allowing the number of frequencies to be changed within the range of a predetermined number or less, or by (3) restricting the number of frequencies included in the waveform to a predetermined number. In the example (3), since the number of frequencies included in the waveform is fixed, separation between signal and noise can be performed more easily than in the examples (1) and (2), and a method most durable against noise is provided.

When signals are expressed using n types of frequencies, ($2^n-1$) kinds of signals can be expressed in (1). When the number of types of frequencies is limited to m or less or restricted to m, ($\Sigma(k=1$ to m$)_nC_k)-1$) kinds of signals can be expressed in (2), and $_nC_m$ kinds of signals can be expressed in (3).

Plural modulation frequencies can be superimposed by (i) a method of simply summing individual waveforms, (ii) a method of calculating a weighted average after setting respective weights to individual waveforms, or (iii) a method of repeating respective waveforms of individual frequencies in sequence. When a frequency analysis, e.g., expansion into discrete cosine series, is executed on the receiving side, a higher frequency tends to have a smaller peak. Taking into account such a tendency, in the method (ii), the weighted average is preferably calculated with adjustment of making respective peaks of the individual frequencies comparable to one another. In other words, it is preferable to set larger weights for higher frequencies. In the method (iii), respective magnitudes of frequency peaks at the time of reception can be adjusted by adjusting a rate of the number of outputs among the individual frequencies instead of repeating outputting of the waveforms of the individual frequencies one by one. With the above-mentioned adjustment, the magnitudes of frequency peaks can be made even to facilitate the reception process. As an alternative, additional information may be expressed by giving meaning to differences in the magnitudes of frequency peaks. For example, when meaning is given to the sequence in the magnitudes of frequency peaks, an information amount of $\log_2(n!)$ bits can be added on condition that n types of frequencies are included. The frequency may be changed per period, per half period, per constant multiply of a half period, or per certain time. The timing of changing the frequency may be set to a point in time at which luminance is at maximum, minimum, or an arbitrarily set value. By making luminance levels equal to each other between before and after changing the frequency (i.e., by changing luminance continuously), flicker can be suppressed. To that end, it is preferable to output, for a time of a length corresponding to integer multiple of a half wavelength of each of the frequencies to be transmitted, the relevant frequency. In that case, times during which the individual frequencies are output are different from one another. By outputting a signal of a certain frequency for a time of a length corresponding to integer multiple of a half wavelength of the relevant frequency, the fact that the relevant frequency is included in the signal can easily recognized on the receiving side through a frequency analysis even in the case of a digital output. The same frequency is preferably output discontinuously instead of outputting it continuously from the viewpoint of making the relevant frequency less perceivable by a human eye or a camera. In the case of outputting frequencies at a rate of period $T_1$ twice, $T_2$ twice, and $T_3$ once, for example, a sequence of $T_1T_2T_3T_2T_1$ is more preferable than a sequence of $T_1T_1T_2T_2T_3$. The frequencies may be output while the sequence is changed, instead of repeating the frequency outputs in a predetermined sequence. Additional information can be further expressed by giving meaning to the sequence of the frequency outputs. The sequence of the frequency outputs does not appear in the frequency peaks, but the additional information can be obtained by analyzing the sequence of the frequency outputs. An exposure time needs to be set shorter in the case of analyzing the sequence of the frequency outputs than in the case of analyzing the frequency peaks. Taking into account that point, the exposure time may be set shorter only when the additional information is required. Alternatively, only a receiver with the function of setting the exposure time shorter may be designed to be able to obtain the additional information.

FIG. 7B represents the case where the signals in FIG. 7A are expressed by binary optical patterns. According to the above-mentioned (i) and (ii) which are the methods of superimposing frequencies, a resultant analog waveform is complex in shape and such a complex shape cannot be expressed even with binarization of the resultant analog waveform. Therefore, the receiver cannot obtain accurate frequency peaks, and reception errors increase. According to the above-mentioned method (iii), because the resultant analog waveform is not complex in shape, the influence of binarization is less and comparatively accurate frequency peaks can be obtained. For that reason, the method (iii) is superior in the case of employing optical patterns that have been digitized by binary or other notations using a few values. The modulation scheme (iii) can be interpreted as one type of frequency modulation when looking at a point that signals are expressed by frequencies of optical patterns, and also as one type of PWM modulation when looking at a point that signals are expressed by adjusting the size of a time width of a pulse.

As illustrated at (c) in FIG. 7C, many values can be expressed by changing combination in superimposing the modulation frequencies with time as in the case illustrated at (a) in FIG. 7C.

A signal having a high modulation frequency cannot be received unless the exposure time is set to be short. However, the modulation frequency until a certain high level can be utilized without setting the exposure time. By transmitting signals modulated at frequencies ranging from a low modulation frequency to a high modulation frequency, all terminals can receive the signal expressed at the low modulation frequency, and terminals capable of setting the exposure time to be short can receive the signals including the signal expressed at the high modulation frequency. It is hence possible to rapidly receive a larger number of items of information from one transmitter. Alternatively, when a modulation signal at the low frequency is found in an ordinary image capturing mode, an entire transmission signal including a modulation signal at a high frequency may be received in a visible light communication mode.

In the frequency shift keying modulation scheme and the frequency division multiplexing modulation scheme, a larger number of frequency bands can be used because those schemes have the effect of making flicker less perceived by the human eye than the scheme of expressing signals with pulse positions even when the low modulation frequency is used.

The first to the fourth embodiments can provide similar advantageous effects in the case using signals that are received and modulated by the above-described reception methods and modulation schemes.

(Separation of Mixed Signals)

FIGS. 7D and 7E illustrate examples of separation of mixed signals in the first embodiment.

A receiver has the functions illustrated at (a) in FIG. 7D. A light receiving unit receives optical patterns. A frequency analysis unit maps a signal into a frequency domain through Fourier transform of the received optical patterns. A peak detection unit detects peaks of frequency components of the optical patterns. If no peaks are detected in the peak detection unit, the subsequent process is interrupted. A peak temporal change analysis unit analyzes a change of the peak frequency over time. When plural frequency peaks are detected, a signal source specifying unit specifies in which combination are sent the modulation frequencies of signals from the same transmitter.

With the above-described process, the signal can be received without interference even when there are plural transmitters nearby. When receiving light emitted from a transmitter after the emitted light has been reflected by a floor, a wall, a ceiling, etc., lights from plural transmitters are mixed in many cases. Even in such a case, however, the signal can be received without interference.

For example, when a receiver receives optical patterns in which a signal from a transmitter A and a signal from a transmitter B are mixed, frequency peaks are obtained as illustrated at (b) in FIG. 7D. Because fA1 disappears and fA2 then appears, it is possible to specify fA1 and fA2 as signals from the same transmitter. Similarly, fA1, fA2 and fA3 can be specified as signals from the same transmitter, and fB1, fB2 and fB3 can be specified as signals from the same transmitter.

By setting constant a time interval at which the modulation frequency is changed by one transmitter, signals from the same transmitter can be specified more easily.

If the timings at which the modulation frequencies of plural transmitters are changed are coincident with one another, the above-mentioned method cannot specify the signals from the same transmitter. By setting time intervals at which the modulation frequencies of plural transmitters are changed to be different per transmitter, it is possible to avoid a situation that the timings at which the modulation frequencies of the plural transmitters are changed are always coincident with one another, and to specify the signals from the same transmitter.

As illustrated at (c) in FIG. 7D, by setting a time from a preceding change of the modulation frequency by the transmitter to a next change thereof to a value that can be calculated from the current modulation frequency and the modulation frequency before the change, it is possible to specify that the signals having which modulation frequencies are sent from the same transmitter, even when the modulation frequencies are changed by the plural transmitter at the same timing.

A transmitter may be designed to recognize a transmission signal from another transmitter, and to carry out adjustment such that the timings at which the modulation frequencies are changed will not coincide with one another.

The above-described method can be performed in a similar manner and can provide similar advantageous effects not only in the case of frequency shift keying modulation where one transmission signal is constituted by one modulation frequency, but also in the case where one transmission signal is constituted by a plurality of modulation frequencies.

As illustrated at (a) in FIG. 7E, when the optical patterns are not changed over time in the frequency division multiplexing modulation scheme, the signals from the same transmitter cannot be specified. However, by including a zone where there are no signals, or by changing the modulation frequency to a particular frequency as illustrated at (b) in FIG. 7E, the signals from the same transmitter can be specified from the change of the peak over time.

(Operation of Electrical Home Appliance with Visible Light Communication Through Lighting)

Figure 8A:
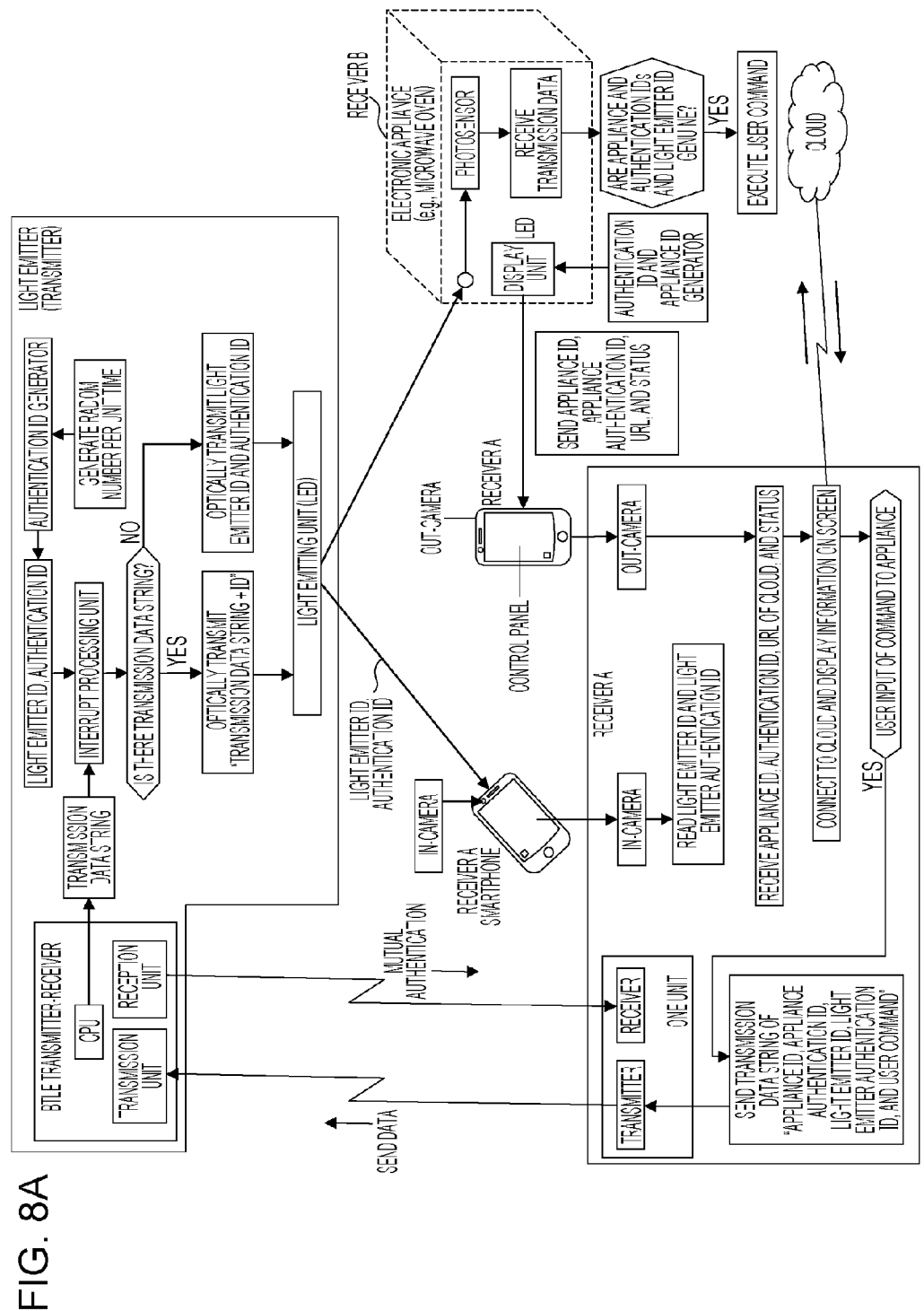
FIG. 8A illustrates one example of a visible light communication system in the first embodiment.

FIG. 8A illustrates one example of a visible light communication system in the first embodiment.

A transmitter constituted as a ceiling illumination apparatus (or lighting apparatus), for example, has the wireless communication function, e.g., Wi-Fi (Wireless Fidelity) or Bluetooth (registered trademark). The transmitter transmits information (such as a light emitter ID and an authentication ID), which are necessary for connection to the transmitter via wireless communication, with visible light communication. A receiver A constituted as a smartphone (portable terminal), for example, executes wireless communication with the transmitter in accordance with the received information. The receiver A may establish connection to the transmitter by employing other information. In such a case, the receiver A may not have the receiving function. A receiver B is constituted as an electronic appliance (control target appliance), e.g., a microwave oven. The transmitter transmits information of the receiver B to the receiver A, both the receivers being set as a pair. The receiver A displays the information of the receiver B that is an appliance operable by the receiver A. The receiver A sends an operation command (control signal) for the receiver B to the transmitter with the wireless communication, and the transmitter sends the operation command to the receiver B with the visible light communication. As a result, a user can operate the receiver B via the receiver A. Furthermore, another device connected to the receiver A via the Internet, for example, can also operate the receiver B via the receiver A.

When the receiver B has the transmitting function and the transmitter has the receiving function, two-way communication can be executed between them. The transmitting function may be realized with visible light generated by light emission, or with communication using sounds. For example, the transmitter may include a sound collecting unit, and may recognize a state of the receiver B by recognizing sounds generated from the receiver B. For example, the transmitter may recognize sounds indicating the end of operation of the receiver B and may send the recognized information to the receiver A such that the receiver A displays the relevant information on its display screen, thus notifying the end of operation of the receiver B to the user.

Each of the receivers A and B has the function of NFC (Near Field Communication). The receiver A receives a signal from the transmitter and then communicates with the receiver B via NFC, thus registering, in the receiver A and the transmitter, the fact that the receiver B can receive a signal from the transmitter having transmitted the signal received by the receiver A immediately before. This is called paring between the transmitter and the receiver B. For example, when the receiver B is moved, the receiver A registers cancelation of the pairing in the transmitter. When pairing is established between the receiver B and another transmitter, the other transmitter having newly established the pairing sends information indicating the establishment of the new pairing to the transmitter of the previous pairing, and cancels the previous pairing.

Figure 8B:
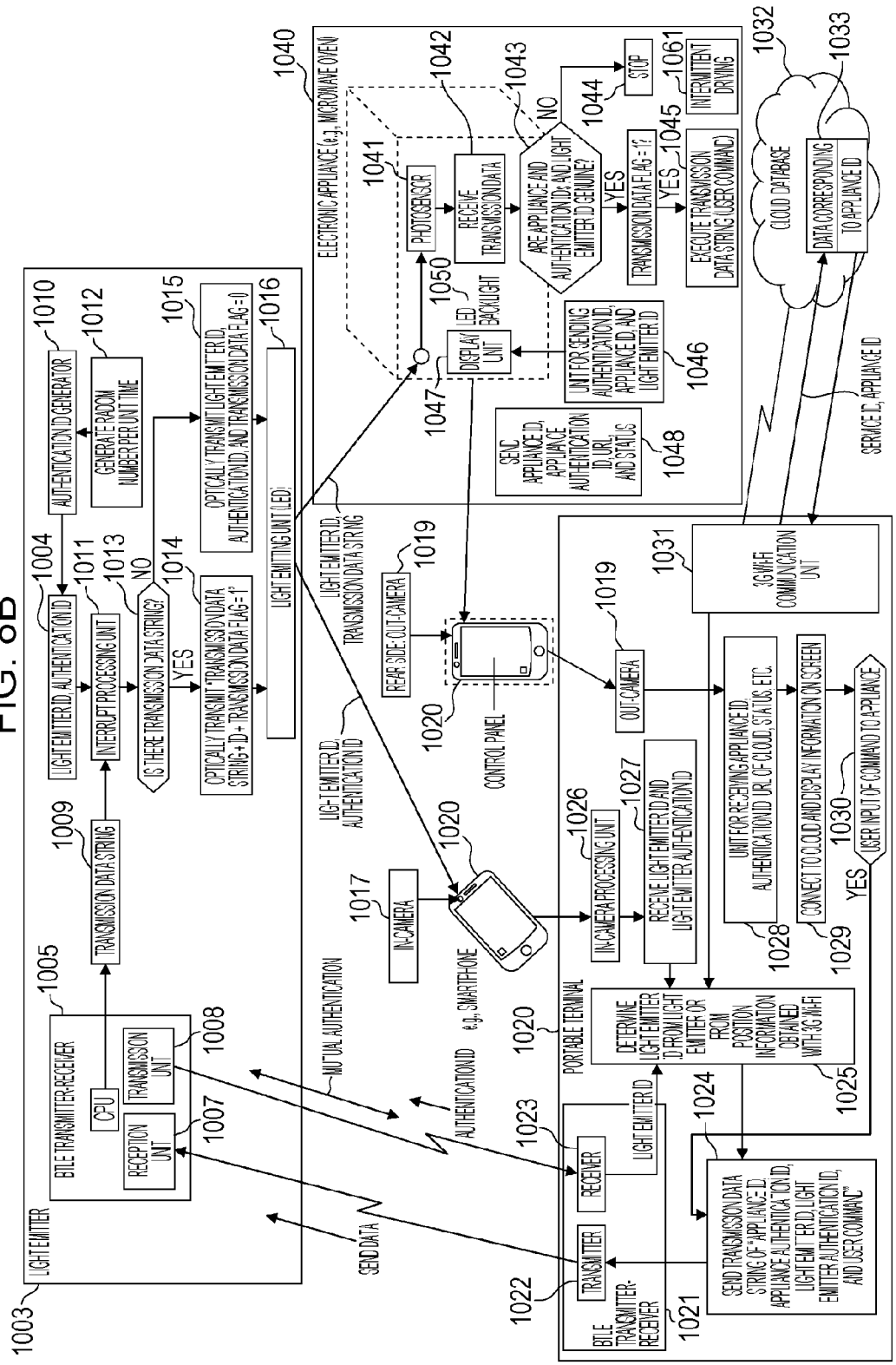
FIG. 8B is an illustration to explain a use case in the first embodiment.

FIG. 8B is an illustration to explain a use case in the first embodiment. By referring to FIG. 8B, a practical application will be described below in connection with the case of employing a reception unit 1028 that utilizes, as a modulation scheme, PPM (Pulse Position Modulation) in the present disclosure, FDM (Frequency Division Multiplexing), FSK (Frequency Shift Keying), or frequency assignment.

The light emitting operation of a light emitter 1003 constituted as, e.g., a lighting apparatus is described at the beginning. The light emitter 1003, e.g., a lighting apparatus mounted to the ceiling or wall, or a TV monitor, first generates an authentication ID 1004 in an authentication ID generator 1010 by employing a random number generator 1012 generating a random number that is changed per unit time. An ID of the light emitter 1003 and the authentication ID 1004 are handled as follows. If an interrupt process (step 1011) does not occur, the light emitter 1003 determines that there is no "transmission data string" sent from a portable terminal 1020, and a light emitting unit 1016, e.g., an LED, continuously or intermittently sends, to the outside, three optical signals indicating (1) the ID of the light emitter, (2) the authentication ID, and (3) an identifier to identify whether a transmission data string 1009 sent from an electronic appliance 1040, which is a control target appliance, via the portable terminal 1020 is present, i.e., a transmission data string flag=0.

The sent optical signals are received by a photosensor 1041 of the electronic appliance 1040 (step 1042), and the electronic appliance 1040 confirms in step 1043 whether an appliance ID and an authentication ID of the electronic appliance 1040 (i.e., the device and authentication IDs) and the light emitter ID are genuine. If the confirmation result is YES (i.e., genuine), the electronic appliance 1040 checks whether the transmission data string flag=1 is held (step 1051). Only when the check result is YES (i.e., transmission data string flag=1), the electronic appliance 1040 executes data of the transmission data string, e.g., a user command for executing a cooking recipe, for example (step 1045).

A scheme for executing optical transmission in the electronic appliance 1040 by employing the optical modulation scheme according to the present disclosure is described here. The electronic appliance 1040 sends the appliance ID, the authentication ID for authenticating the appliance, and the light emitter ID received by the electronic appliance 1040 as described above, i.e., the ID of the light emitter 1003 from which the electronic appliance 1040 can reliably receive information, by employing an LED backlight unit 1050 of a display unit 1047 (step 1046).

The optical signals according to the present disclosure are sent from the display unit 1047, e.g., a liquid crystal display unit in a microwave oven, a POS (Point-Of-Sale) machine, etc., at a modulation frequency of 60 Hz or higher without flicker by employing the PPM, FDM or FSK scheme. Therefore, ordinary consumers do not notice the fact that the optical signals are sent. Thus, the display unit 1047 can display a menu for the microwave oven, for example, in an independent manner.

(Method of Detecting ID of Light Emitter 1003 from which Electronic Appliance 1040 can Receive Information)

A user going to use the microwave oven, for example, previously receives the optical signals from the light emitter 1003 by an in-camera 1017 of the portable terminal 1020, and obtains the light emitter ID and the light emitter authentication ID in an in-camera processing unit 1026 (step 1027). The ID of light emitter from which the electronic appliance 1040 can receive is recorded in a cloud 1032 or inside the portable terminal 1020 itself together with position information using electric waves for cellular phones or Wi-Fi in accordance with 3G, for example, or the ID of the light emitter existing at the relevant position may be detected (step 1025).

When the user directs an out-camera 1019 of the portable terminal 1020 toward the display unit 1047 of the microwave oven 1040, for example, optical signals 1048 according to the present disclosure can be modulated by a MOS camera. Data at a higher speed can be received by increasing a shutter speed. The reception unit 1028 receives the appliance ID and the authentication ID of the electronic appliance 1040, a service ID, URL of the cloud 1032 for providing services, the URL being converted from the service ID, and/or an appliance status.

In step 1029, the portable terminal 1020 establishes connection to the cloud 1032, which exists at the outside, through a 3G Wi-Fi communication unit 1031 by employing the URL that is recorded in the portable terminal 1020 or that has been received, and then sends the service ID and the appliance ID to the cloud 1032. The cloud 1032 searches for data corresponding to the service ID and the appliance ID and stored in a database 1033, and then sends the data to the portable terminal 1020. In accordance with the sent data, video data, command buttons, etc. are displayed on a screen of the portable terminal 1020. While looking at the displayed data, the user inputs a desired command, for example, by a method of pushing one of the buttons on the screen (step 1030). In the case of YES (command input), a transmitter 1022 of a BTLE (Bluetooth (registered trademark) Low Energy) transmitter-receiver unit 1021 sends a transmission data string including the appliance ID and the authentication ID of the electronic appliance 1040, the light emitter ID, the light emitter authentication ID, and the user command having been input in step 1030, etc.

In the light emitter 1003, a reception unit 1007 of a BTLE transmitter-receiver unit 1005 receives the "transmission data string" and detects the reception of the "transmission data string" in an interrupt processing unit 1011 (YES in step 1013). Upon the detection, data of "transmission data string+ID+transmission data flag=1" is modulated in a modulation unit according to the present disclosure and is optically sent (step 1014) from the light emitting unit 1016, e.g., an LED. If the reception of the "transmission data string" is not detected (NO in step 1013), the light emitter 1003 continuously sends the light emitter ID and so on (step 1015).

The electronic appliance 1040 can reliably receive signals from the light emitter 1003 because, as described above, the capability of receiving signals from the light emitter 1003 has already been confirmed by actually receiving signals.

In this connection, since the light emitter ID is included in the transmission data string, the interrupt processing unit 1011 can determine that the electronic appliance as a transmission target is present within a light illumination range of the light emitter having the relevant ID. Accordingly, the signals are sent from only the light emitter, which is positioned in a very narrow space where the electronic appliance exists, without sending any signals from other light emitters. Hence an electromagnetic wave space can be used efficiently.

In the case not using the above-described method, because a Bluetooth signal reaches far, optical signals sent from another light emitter, which is located at a position different from an electronic appliance, may reach the electronic appliance. In other words, during a light emission period of the other light emitter, optical communication to the electronic appliance as a desired transmission target may not be executed or may be impeded. Thus, the above-described method is effective in solving that problem.

Countermeasures to cope with malfunction of the electronic appliance will be described below.

The photosensor 1041 receives the optical signals in step 1042. Because the light emitter ID is first checked, optical signals emitted from another light emitter having a different ID can be removed. Therefore, a possibility of malfunction is reduced.

In the present disclosure, the transmission data string 1009 contains the appliance ID and the appliance authentication ID of the electronic appliance that is to receive the optical signals. Whether the received appliance ID and appliance authentication ID are those IDs of the electronic appliance 1040 is checked in step 1043. Therefore, malfunction of the electronic appliance 1040 is avoided. Thus, the above-described method is effective in preventing malfunction of the electronic appliance 1040, e.g., a microwave oven, which may occur with the electronic appliance 1040 falsely processing a signal sent to another electronic appliance.

A method of preventing malfunction in execution of a user command will be described below.

In the case of the transmission data string flag=1, it is determined that the user command is present, and in the case of the transmission data string flag=0, the operation is stopped in step 1044. In the case of the transmission data string flag=1, the transmission data string, such as the user command, is executed after authenticating the appliance ID and the authentication ID in the transmission data string. For example, the electronic appliance 1040 takes out a recipe and displays the recipe on the screen. Upon pushing of a button by the user, the recipe, i.e., operations for cooking at 600 w for 3 minutes and then at 200 w for 1 minute, and steaming for 2 minutes, is started without malfunction.

When the user command is executed, electromagnetic noise at 2.4 GHz is generated from the microwave oven. To reduce the electromagnetic noise, an intermittent driving unit 1061 stops output power of the microwave oven intermittently, e.g., about 100 ms per 2 sec, when the microwave oven is operated upon receiving a command from the smartphone with Bluetooth or Wi-Fi. During a stop period, communication can be performed in accordance with, e.g., Bluetooth or Wi-Fi 802.11n. For example, if the output power of the microwave oven is not stopped, transmission of a stop command from the smartphone to the light emitter 1003 through BTLE is impeded. In contrast, according to the present disclosure, a command can be sent without being affected by disturbing electromagnetic waves such that the microwave oven can be stopped or the recipe cooked by the microwave oven can be changed with transmission of an optical signal.

Thus, this embodiment has a feature that two-way communication between an electronic appliance and a smartphone in cooperation with a cloud can be realized just by adding the photosensor 1041, of which cost is just several yens, to the electronic appliance equipped with a display unit. Therefore, the embodiment is effective in realizing smart white goods when applied to low-cost white goods. It is to be noted that, while the embodiment has been described in connection with the white goods, similar advantageous effects can also be obtained even when the present disclosure is applied to a POS terminal including a display unit, an electronic price tag used in supermarkets, and a personal computer.

In this embodiment, the light emitter ID can be received only from a lighting apparatus positioned above the electronic appliance. Because a reception area is narrow, another advantageous effect is also obtained in that the number of digits of light emitter ID can be reduced by specifying a small zone ID for, e.g., Wi-Fi per light emitter, and by assigning an ID per position in each zone. In such a case, since the number of digits of the light emitter ID that is to be sent with the above-described PPM, FSK or FDM according to the present disclosure is reduced, additional advantageous effects are obtained, for example, in that an optical signal can be received from a small light source, that the ID can be obtained more quickly, and that data from a light source positioned at a far position can be obtained.

Figure 8C:
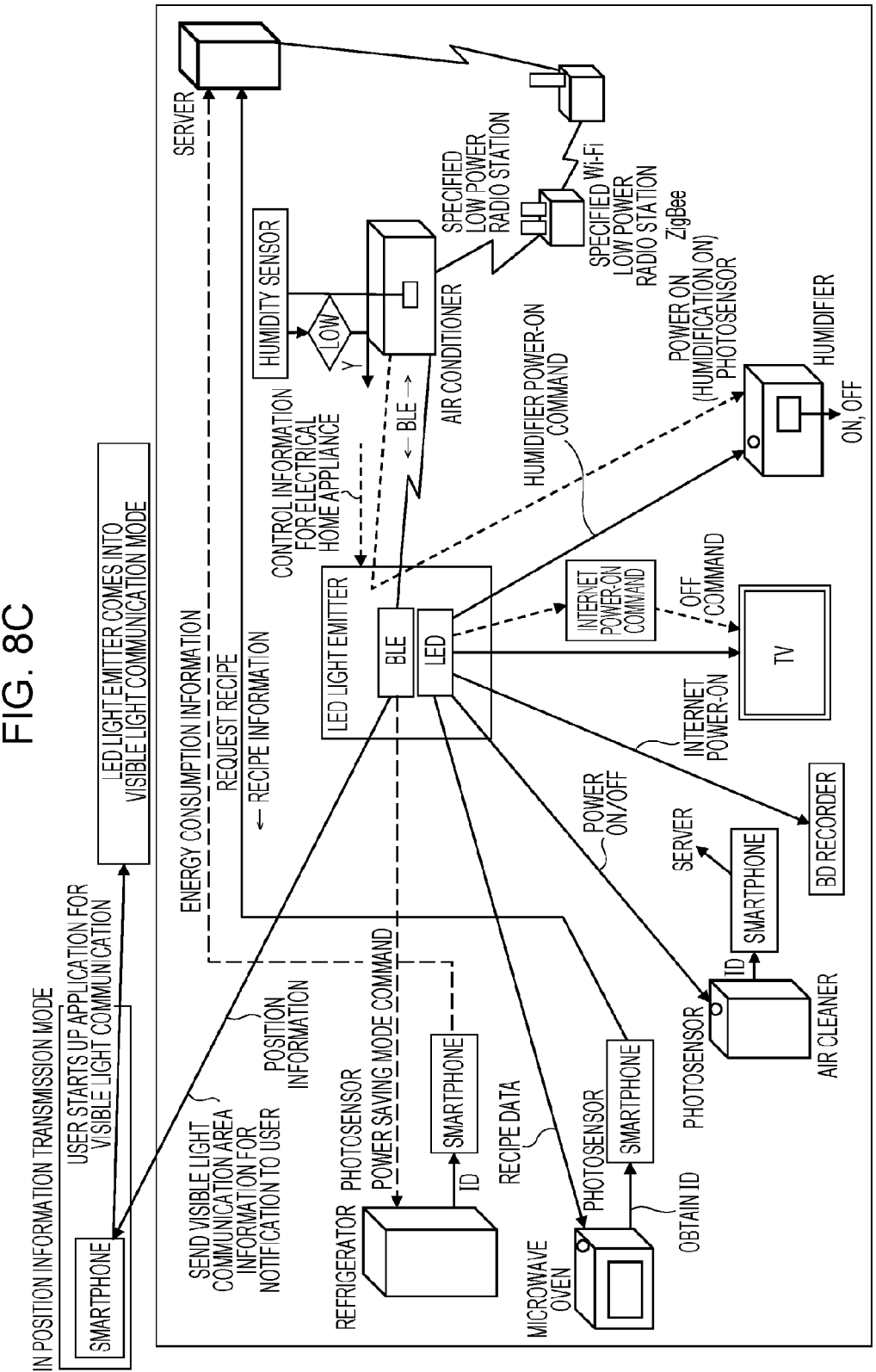
FIG. 8C illustrates one example of a signal transmission and reception system in the first embodiment.

FIG. 8C illustrates one example of a signal transmission and reception system in the first embodiment.

The transmission and reception system includes a smartphone that is a multifunction cellular phone, an LED light emitter that is a lighting apparatus, an electrical home appliance such as a refrigerator, and a server. The LED light emitter executes not only communication via BTLE (Bluetooth (registered trademark) Low Energy), but also visible light communication using an LED (Light Emitting Diode). For example, the LED light emitter controls the refrigerator or communicates with an air conditioner via BTLE. Moreover, the LED light emitter controls power supplies of a microwave oven, an air cleaner, a television (TV) set, and so on via visible light communication.

The TV set includes a solar cell, for example, and utilizes the solar cell as a photosensor. In more detail, when the LED light emitter sends a signal by changing its luminance, the TV set detects a change in luminance of the LED light emitter in accordance with a change in electric power generated by the solar cell. Then, the TV set demodulates a signal represented by the detected luminance change and obtains the signal sent from the LED light emitter. When the obtained signal is a command instructing power-on, the TV set turns on its main power supply. When the obtained signal is a command instructing power-off, the TV set turns off the main power supply.

A server can communicate with an air conditioner through a router and a specified low power radio station. Furthermore, because the air conditioner can communicate with the LED light emitter via BTLE, the server can also communicate with the LED light emitter. Accordingly, the server can selectively turns on and off the power supply of the TV set through the LED light emitter. In addition, a smartphone can control the power supply of the TV set through the server by communicating with the server via Wi-Fi (Wireless Fidelity), for example.

As illustrated in FIGS. 8A to 8C, the information communication method according to this embodiment includes a wireless communication step of sending, from a portable terminal (smartphone), a control signal (e.g., a transmission data string or a user command) to a lighting apparatus (light emitter) via wireless communication (e.g., BTLE or Wi-Fi)

different from visible light communication, a visible light communication step of, by the lighting apparatus, performing the visible light communication by changing luminance in accordance with the control signal, and an execution step of, by a control target appliance (e.g., a microwave oven), detecting the luminance change of the lighting apparatus, demodulating a signal, which is specified by the detected luminance change, to obtain the control signal, and executing a process corresponding to the control signal. Through those steps, even though the portable terminal cannot change the luminance for the visible light communication in itself, it can change the luminance of the lighting apparatus instead of itself via wireless communication, and can appropriately control the control target appliance. The portable terminal may be a wristwatch instead of the smartphone.

(Reception without Interference)

FIG. 9 is a flowchart illustrating a reception method, which is designed to eliminate interference, in the first embodiment.

First, processing is started in step 9001*a*. Then, in step 9001*b*, it is confirmed whether there is a periodic change in intensity of the received light. In the case of YES, the processing advances to step 9001*c*. In the case of NO, the processing advances to step 9001*d*. After setting a lens of a light receiving unit to a wide-angle position and receiving light in a wide range in step 9001*d*, the processing returns to step 9001*b*. In step 9001*c*, it is confirmed whether a signal can be received. In the case of YES, the processing advances to step 9001*e*. After receiving the signal in step 9001*e*, the processing is ended in step 9001*g*. In the case of NO in step 9001*c*, the processing advances to step 9001*f*. After setting the lens of the light receiving unit to a telescopic position and receiving light in a narrow range in step 9001*f*, the processing returns to step 9001*c*.

With the reception method described above, a signal from a transmitter existing in a wider-angle direction can be received while interference among signals from a plurality of transmitters is eliminated.

(Estimation of Azimuth of Transmitter)

FIG. 10 is a flowchart illustrating a method of estimating the azimuth of a transmitter in the first embodiment.

First, processing is started in step 9002*a*. After setting the lens of the light receiving unit to a most telescopic position in step 9002*b*, it is confirmed in step 9002*c* whether there is a periodic change in intensity of the received light. In the case of YES, the processing advances to step 9002*d*. In the case of NO, the processing advances to step 9002*e*. After setting the lens of the light receiving unit to the wide-angle position and receiving light in a wide range in step 9002*e*, the processing returns to step 9002*c*. The signal is received in step 9002*d*. In step 9002*f*, the lens of the light receiving unit is kept at the most telescope position, and the direction of receiving light is changed along the boundary of a light received area to detect the direction in which the intensity of the receives light is maximized. After estimating the transmitter in the detected direction in such a manner, the processing is ended in step 9002*g*.

With the method described above, the direction in which the transmitter exists can be estimated. The lens of the light receiving unit may be first set to a most wide-angle position and then gradually shifted toward the most telescopic position.

(Start of Reception)

Figure 11:
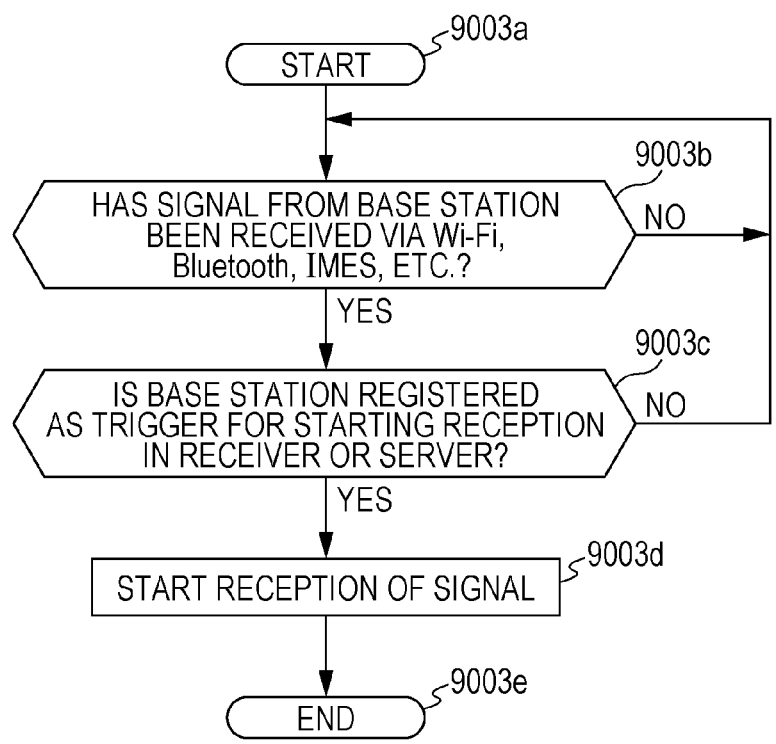
FIG. 11 is a flowchart illustrating a method of starting reception in the first embodiment.

FIG. 11 is a flowchart illustrating a method of starting reception in the first embodiment.

First, processing is started in step 9003*a*. Then, in step 9003*b*, it is confirmed whether a signal from a base station has been received via, e.g., Wi-Fi, Bluetooth (registered trademark), or IMES (Indoor MEssaging System). In the case of YES, the processing advances to step 9003*c*. In the case of NO, the processing returns to step 9003*b*. In step 9003*c*, it is confirmed whether the base station is registered as a trigger for start of the reception in the receiver or the server. In the case of YES, the processing advances to step 9003*d*. After starting the reception of the signal in step 9003*d*, the processing is ended in step 9003*e*. In the case of NO, the processing returns to step 9003*b*.

With the method described above, the reception can be started even when the user does not execute the operation for starting the reception. Furthermore, power consumption can be reduced in comparison with the case of executing the reception at all times.

(Generation of ID with Combined Use of Information of Another Medium)

Figure 12:
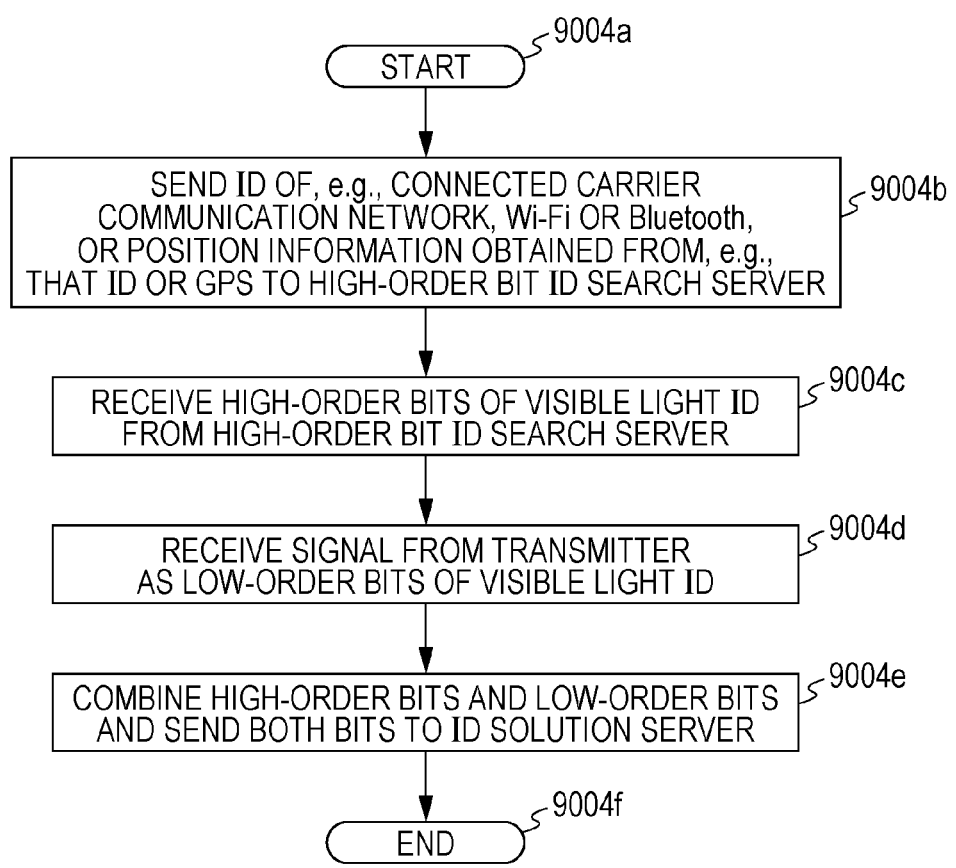
FIG. 12 is a flowchart illustrating a method of generating an ID with combined use of information of another medium in the first embodiment.

FIG. 12 is a flowchart illustrating a method of generating an ID with combined use of information of another medium in the first embodiment.

First, processing is started in step 9004*a*. Then, in step 9004*b*, an ID of, e.g., a connected carrier communication network, Wi-Fi or Bluetooth (registered trademark), or position information obtained from that ID, or position information obtained from, e.g., GPS (Global Positioning System) is sent to a high-order bit ID search server. In step 9004*c*, high-order bits of a visible light ID is received from the high-order bit ID search server. In step 9004*d*, a signal from a transmitter is received as low-order bits of the visible light ID. In step 9004*e*, the high-order bits and the low-order bits of the visible light ID are combined with each other and are sent to an ID solution server. The processing is ended in step 9004*f*.

With the method described above, the high-order bits that are used in common in a place near the receiver can be obtained, and an amount of data to be sent from the transmitter can be reduced. Furthermore, a reception rate of the receiver can be increased.

The transmitter may send both the high-order bits and the low-order bits. In this respect, a receiver employing the above-described method can combine an ID at time when it receives the low-order bits. A receiver not employing the above-described method obtains an ID by receiving the entire ID from the transmitter.

(Selection of Reception Method Through Frequency Separation)

Figure 13:
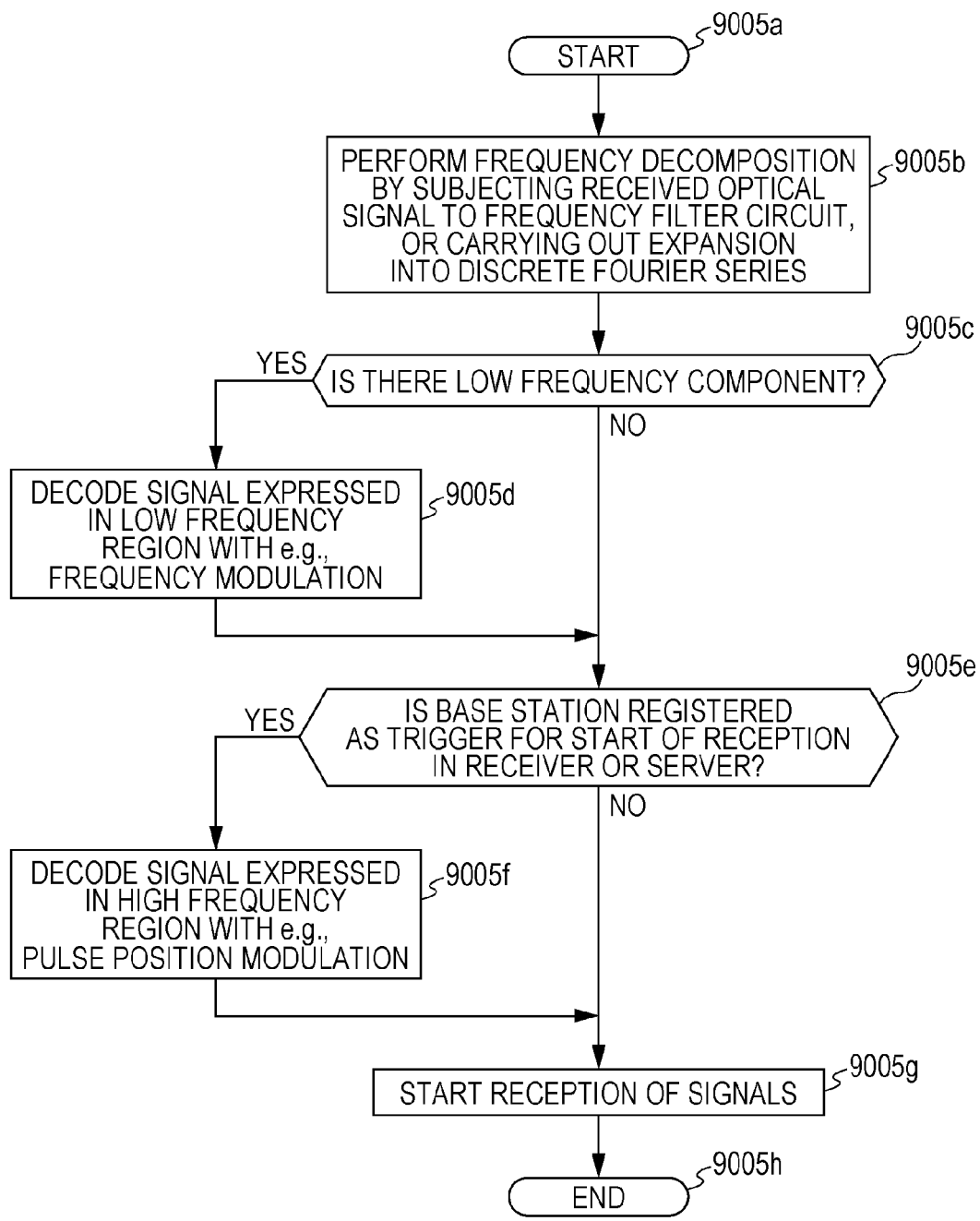
FIG. 13 is a flowchart illustrating a method of selecting a reception method through frequency separation in the first embodiment.

FIG. 13 is a flowchart illustrating a method of selecting a reception method through frequency separation in the first embodiment.

First, processing is started in step 9005*a*. Then, in step 9005*b*, frequency decomposition is performed by subjecting a received optical signal to a frequency filter circuit, or carrying out expansion into discrete Fourier series. In step 9005*c*, it is confirmed whether there is a low frequency component. In the case of YES, the processing advances to step 9005*d*. After decoding, in step 9005*d*, a signal expressed in a low frequency region with frequency modulation, for example, the processing advances to step 9005*e*. In the case of NO, the processing advances directly to step 9005*e*. In step 9005*e*, it is confirmed whether the above-mentioned base station is registered as a trigger for start of the reception in the receiver or the server. In the case of YES, the processing advances to step 9005*f*. After decoding, in step 9005*f*, a signal expressed in a high frequency region with pulse position modulation (PPM), for example, the processing advances to step 9005*g*. In the case of NO, the processing advances directly to step 9005g. After starting the reception of the signals in step 9005g, the processing is ended in step 9005h.

With the method described above, the signals modulated with a plurality of modulation schemes can be received.

(Signal Reception when Exposure Time is Long)

Figure 14:
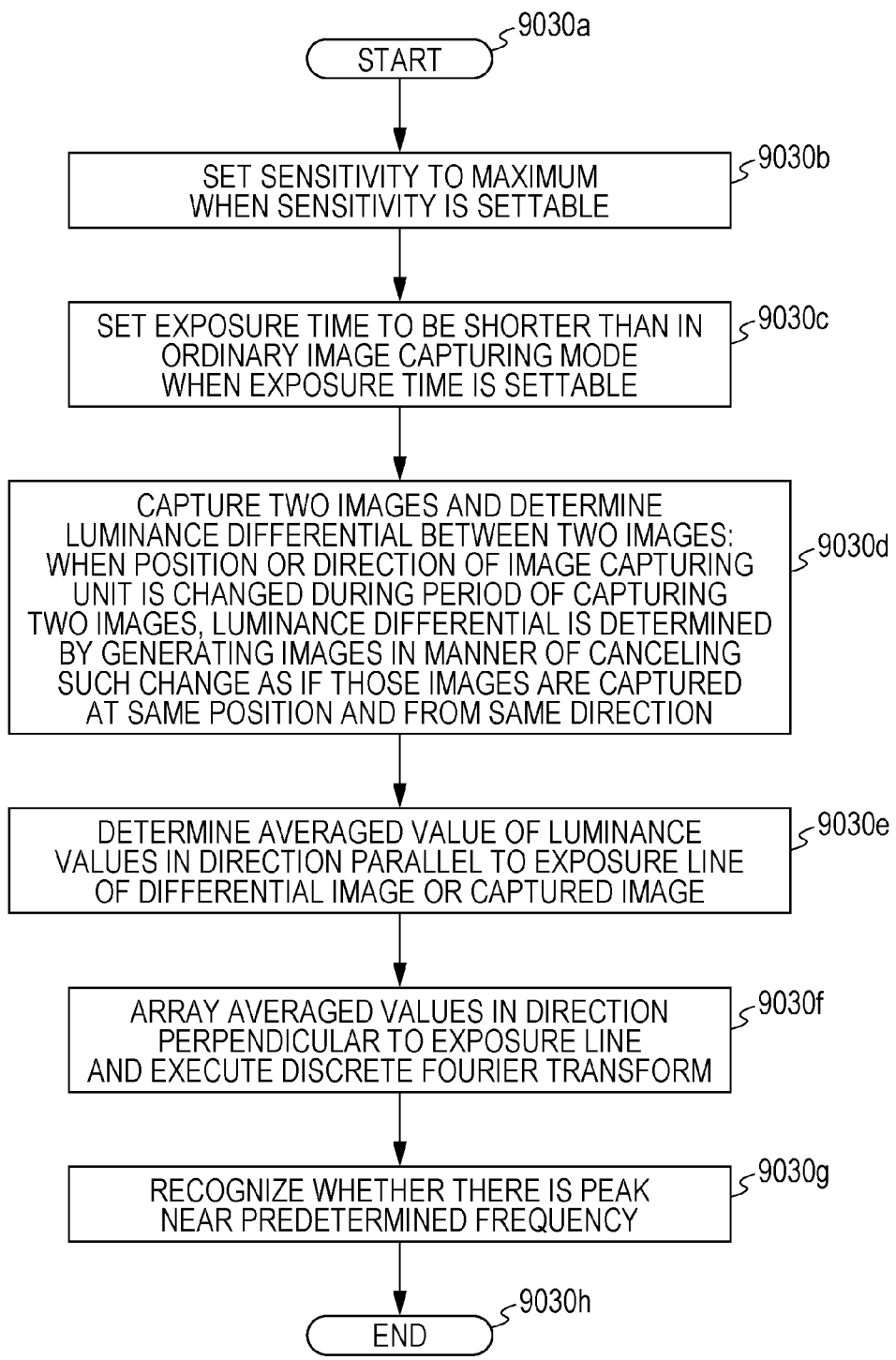
FIG. 14 is a flowchart illustrating a signal reception method when an exposure time is long in the first embodiment.

FIG. 14 is a flowchart illustrating a signal reception method when an exposure time is long in the first embodiment.

First, processing is started in step 9030a. When sensitivity is settable, the sensitivity is set to maximum in step 9030b. When an exposure time is settable, the exposure time is set to be shorter than in the ordinary image capturing mode in step 9030c. In step 9030d, two images are captured to determine the luminance differential between the two images. When the position or the direction of an image capturing unit is changed during a period in which the two images are captured, the luminance differential is determined by generating images in a manner of canceling such a change as if those images are captured at the same position and from the same direction. In step 9030e, an averaged value of luminance values in the direction parallel to an exposure line of the differential image or the captured image is determined. In step 9030f, the averaged values are arrayed in the direction perpendicular to the exposure line and are subjected to discrete Fourier transform. In step 9030g, it is recognized whether there is a peak near a predetermined frequency. The processing is ended in step 9030h.

With the method described above, the signal can be received even when the exposure time is long, such as when the exposure time cannot be set or when an ordinary image is captured at the same time.

In a mode of automatically setting the exposure time, when a camera is directed toward a transmitter constituted as a lighting apparatus, the exposure time is set to about 1/60 to 1/480 sec with the automatic exposure compensation function. When the exposure time cannot be set, the signal is received under such a condition. With an experiment, in the case of periodically blinking the lighting, it was possible to visually confirm fringes in the direction perpendicular to the exposure line and to recognize the blinking period through image processing if a time of one period was about 1/16 or more of the exposure time. On that occasion, in a region including an image of the lighting apparatus, the fringes are hard to confirm because the luminance is too high. Therefore, the signal period is preferably determined from a region where illumination light is reflected.

In the case of periodically turning on and off the light emitting unit as in the frequency shift keying modulation scheme and the frequency division multiplexing modulation scheme, flicker is harder to be visually recognized by the human eye and is also harder to appear in a moving image captured by a video camera than in the case of employing the pulse position modulation scheme even at the same modulation frequency. Accordingly, a lower frequency can be used as the modulation frequency. Since the time resolution of human sight is about 60 Hz, a frequency not lower than 60 Hz can be used as the modulation frequency.

If the modulation frequency is integer multiple of the image-capturing frame rate of the receiver, a difficulty occurs in reception for the reason that images of pixels at the same position on two images are captured at time when optical patterns from the transmitter are in the same phase, and that a bright line does not appear in an differential image. Because the image-capturing frame rate of the receiver is usually 30 fps, the modulation frequency is preferably set to a frequency other than the integer multiple of 30 Hz for reliable reception. Furthermore, receivers have various image-capturing frame rates. Thus, by assigning two modulation frequencies of relatively prime values to the same signal and causing the transceiver to send the signals while alternately employing those two modulation frequencies, the receiver can reliably restore the signal by receiving at least one of the signals.

FIGS. 15A, 15B and 15C illustrate examples of a light control method (method of adjusting brightness) in a transmitter.

By adjusting a ratio of a zone where luminance is high and a zone where luminance is low, an average luminance is changed and brightness can be adjusted. At that time, a frequency peak can be kept constant by keeping constant a period $T_1$ at which the luminance repeats a high and low level. For example, in any of FIGS. 15A, 15B and 15C, when the illumination light from the transmitter is controlled to be darker while the period $T_1$ between a first luminance change at which the illumination light is brighter than the average luminance and a second luminance change is kept constant, a time during which the illumination is controlled to be brighter than the average luminance is set shorter. On the other hand, when the illumination light from the transmitter is controlled to be brighter, a time during which the illumination is controlled to be brighter than the average luminance is set longer. In FIGS. 15B and 15C, the illumination light is controlled to be darker than in FIG. 15A. In FIG. 15C, the illumination light is controlled to be darkest. In such a manner, signals having the same meaning can be sent while the light control is performed for those signals.

Figure 16:
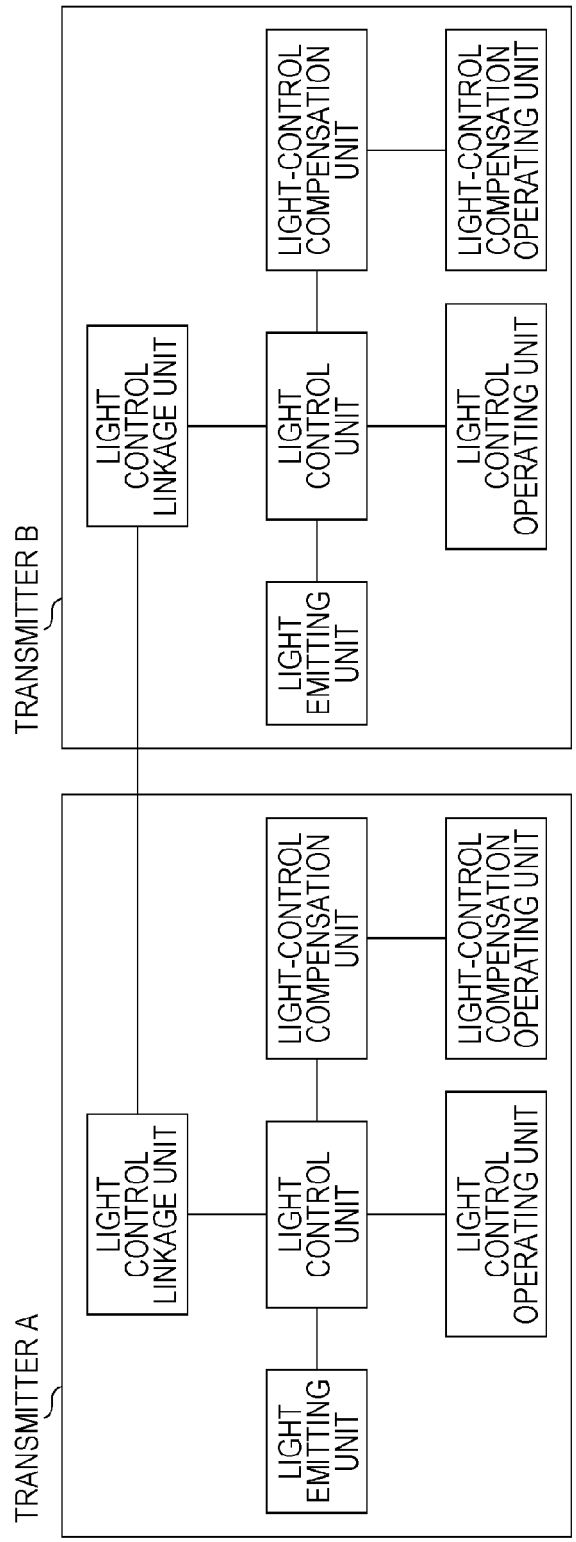
FIG. 16 illustrates one example of a method of practicing the light control function in transmitters in the first embodiment.

FIG. 16 illustrates one example of a method of practicing the light control function in transmitters.

Because there is a limitation in accuracy of components, brightness of one transmitter is slightly different from that of another transmitter even when the light control is set in the same manner. However, when transmitters are arranged side by side, the user feels unnaturally if the adjacent transmitters are different in brightness from each other. In such a case, the user operates a light-control compensation operating unit to adjust the brightness of the transmitter. The light-control compensation unit holds a compensation value, and a light control unit controls the brightness of a light emitting unit in accordance with the compensation value. When a degree of the light control is changed by the user operating the light control operating unit, the light control unit controls the brightness of the light emitting unit in accordance with both a changed light-control setting value and the compensation value held in the light-control compensation unit. Furthermore, the light control unit notifies the light-control setting value to another transmitter through a light control linkage unit. When the light-control setting value is notified from the other transmitter through the light control linkage unit, the light control unit controls the brightness of the light emitting unit in accordance with both the notified light-control setting value and the compensation value held in the light-control compensation unit.

According to one embodiment of the present disclosure, a control method for controlling an information communication apparatus that transmits a signal by changing luminance of a light emitter may include a decision step of causing a computer in the information communication apparatus to, by modulating a transmission signal including a plurality of different signals, decide patterns of luminance change at different frequencies for each of the plural different signals, and a transmission step of transmitting the transmission signal by changing the luminance of the light emitter such that only the pattern of the luminance change, which is obtained by modulating one of the different signals, is provided in a time corresponding to one of the different frequencies.

For example, when patterns of the luminance change, which are obtained by modulating plural signals, are provided in a time corresponding to one frequency, the waveform of the luminance change with the lapse of time is complicated, and a difficulty occurs in receiving the signals properly. However, by making control such that only the pattern of the luminance change, which is obtained by modulating one signal, is provided in a time corresponding to one frequency, plural signals can be properly received in a reception process.

According to another embodiment of the present disclosure, in the decision step, the number of transmissions may be decided such that the number of transmissions at which one of the plural different signals is transmitted within a predetermined time is different from the number of transmissions at which another signal is transmitted within the predetermined time.

Since the number of transmissions at which one signal is transmitted is different from the number of transmissions at which another signal is transmitted, flicker can be avoided which is otherwise generated at the time of transmission.

According to still another embodiment of the present disclosure, in the decision step, the number of transmissions may be decided such that the number of transmissions of a signal corresponding to a higher frequency within the predetermined time is larger than the number of transmissions of another signal.

When frequency conversion is performed on the receiving side, the signal corresponding to the higher frequency has lower luminance. By increasing the number of transmissions of the relevant signal, a luminance value can be increased when the frequency conversion is performed.

According to still another embodiment of the present disclosure, the pattern of the luminance change may be a pattern in which a waveform of the luminance change with the lapse of time is given by a rectangular wave, a triangular wave, or a saw-tooth wave.

When the pattern waveform is given by a rectangular wave or so, the signal can be received more appropriately.

According to still another embodiment of the present disclosure, when a value of the average luminance of the light emitter is to be increased, a time zone where the luminance of the light emitter is larger than a predetermined value in the time corresponding to one frequency is set longer than when the value of the average luminance of the light emitter is to be reduced.

By adjusting the time zone where the luminance of the light emitter is larger than the predetermined value in the time corresponding to one frequency, it is possible to transmit the signal and to adjust the average luminance of the light emitter concurrently. For example, when the light emitter is used for illumination, the signal can be transmitted while entire brightness is adjusted to be dark or bright.

Second Embodiment

A second embodiment will be described below.
(Observation of Luminance of Light Emitting Unit)

Figure 17:
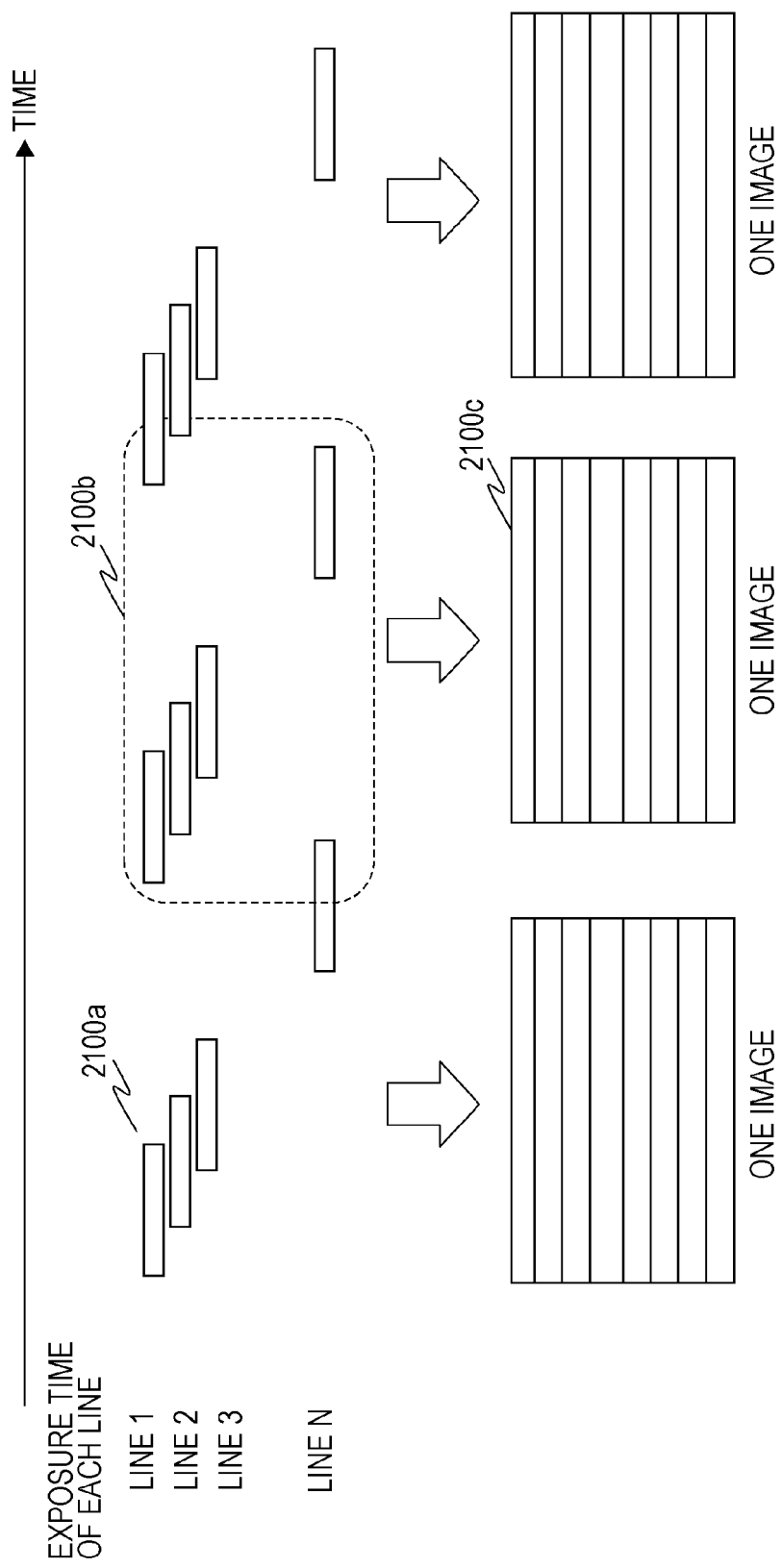
FIG. 17 illustrates one example of a method of observing the luminance of a light emitting unit in a second embodiment.

The second embodiment proposes an image capturing method of, when capturing one image, starting and ending exposure at different times per image capturing element instead of starting exposure for all the image capturing elements at the same timing. FIG. 17 illustrates an example of the case of capturing an image by starting exposure for an array of the image capturing elements on each row at the same timing, but shifting the start time of the exposure in order of rows successively from the first row. Here, a row of the image capturing elements that start the exposure at the same timing is called an exposure line, and a line of pixels on an image corresponding to those image capturing elements is called a bright line.

Figure 18:
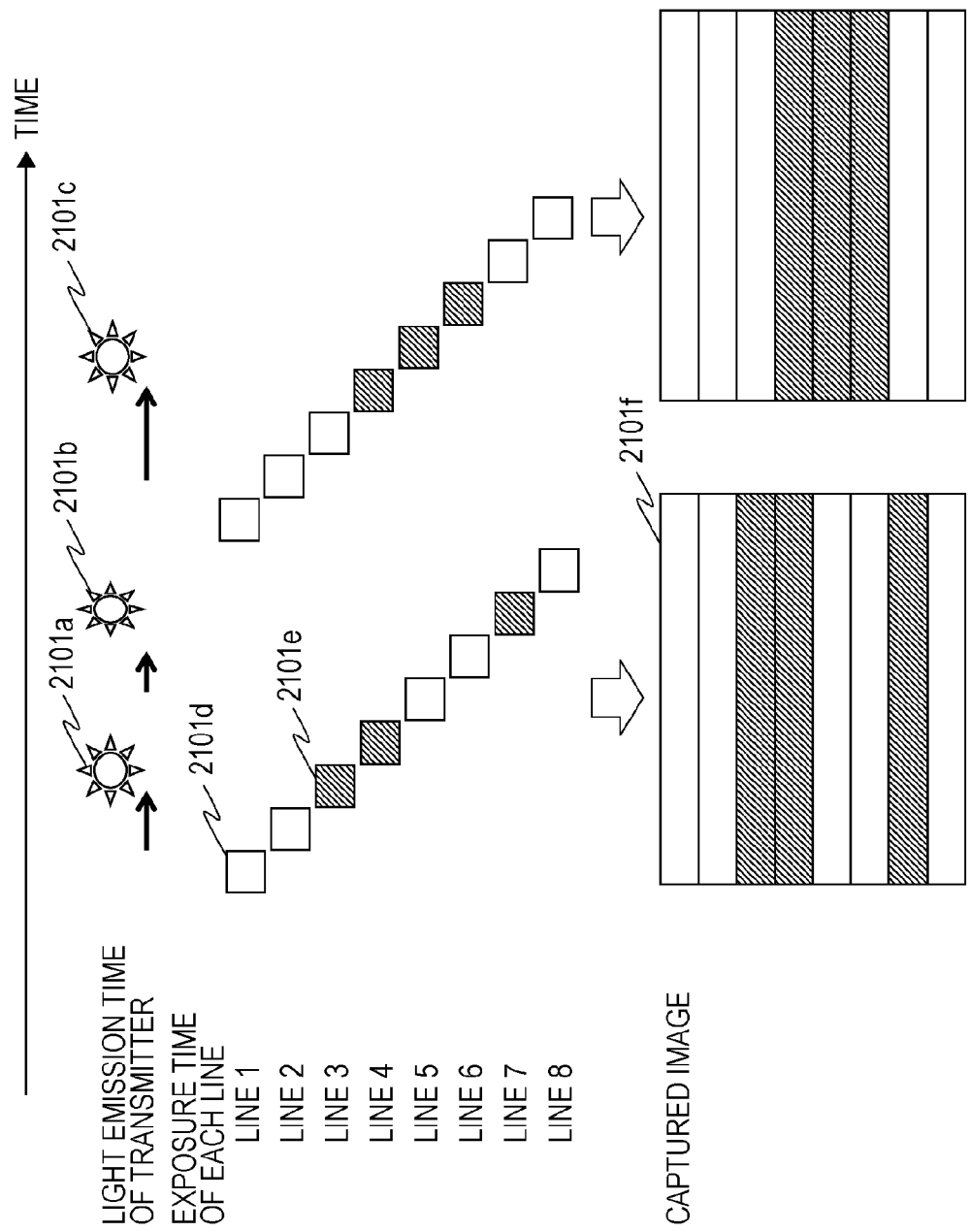
FIG. 18 illustrates another example of the method of observing the luminance of the light emitting unit in the second embodiment.

When images of blinking light sources are captured at all the faces of the image capturing elements by employing the above-described image capturing method, bright lines (i.e., bright and dark lines corresponding to pixel values) are generated on the captured image along the exposure line as illustrated in FIG. 18. By recognizing a pattern of those bright lines, a luminance change of the light source at a speed exceeding the image-capturing frame rate can be estimated. Thus, communication at a speed exceeding the image-capturing frame rate can be performed by sending a signal as a luminance change of the light source. When a signal is expressed with a light source having two levels of luminance values, a lower luminance value is called "LO", and a higher luminance value is called "HI". "LO" may correspond to a state where the light source emits no light, or a state where the light source emits weaker light than "HI".

Information is transferred at a speed exceeding the image-capturing frame rate by employing the above-described method.

When twenty exposure lines in which the exposure times are not overlapped with each other exist in one captured image and the image-capturing frame rate is 30 fps, a luminance change with a period of 1.67 msec can be recognized. When 1000 exposure lines in which the exposure times are not overlapped with each other exist in one captured image, a luminance change with a period of $\frac{1}{30000}$ sec (about 33 μsec) can be recognized. The exposure time is set shorter than 10 msec, for example.

FIG. 18 illustrates the case where, after the completion of exposure for one exposure line, exposure for the next exposure line is started.

In that case, assuming that the number of frames per sec (i.e., the frame rate) is denoted by f and the number of exposure lines constituting one image is denoted by l, information can be transferred at a speed of fl bits per sec at maximum on condition that the information is transferred depending on whether each exposure line receives light in a predetermined amount or more.

When exposure is performed at a time difference per pixel instead of being per line, higher-speed communication can be realized.

In that case, when the number of pixels per exposure line is m and information is transferred depending on whether each pixel receives light in a predetermined amount or more, a transmission speed is given by flm bits per sec at maximum.

When an exposure state of each exposure line resulting from light emission of the light emitting unit is recognizable at plural levels as illustrated in FIG. 19, a larger amount of information can be transferred by controlling the light emission time of the light emitting unit in a unit time shorter than the exposure time of each exposure line.

When the exposure state is recognizable in the Elv stage, information can be transferred at a speed of flElv bits per sec at maximum.

Moreover, a basic period of the transmission can be recognized by causing the light emitting unit to emit light at timing slightly shifted from the timing of exposure for each exposure line.

FIG. 20A illustrates the case where, before the completion of exposure for one exposure line, exposure for the next exposure line is started. In other words, the exposure times of the adjacent exposure lines are partially overlapped with each other on the time base. With such a feature, the following advantageous effects are obtained. (1) The number of samplings within a predetermined time can be increased in comparison with the case where, after waiting the end of the exposure time of one exposure line, exposure for the next exposure line is started. Since the number of samplings within a predetermined time can be increased, optical signals generated from an optical transmitter as an object can be detected more appropriately. Thus, an error rate in detecting the optical signals can be reduced. (2) The exposure time of each exposure line can be prolonged in comparison with the case where, after waiting the end of the exposure time of one exposure line, exposure for the next exposure line is started. Therefore, a brighter image can be obtained even when the object is dark. Thus, an S/N ratio can be increased. It is not always required that the exposure times of the adjacent exposure lines are partially overlapped with each other on the time base for all the exposure lines. Some of the exposure lines may not be partially overlapped with each other on the time base. When some of the exposure lines are not partially overlapped with each other on the time base, it is possible to suppress intermediate colors that may occur on the captured image due to the overlap of the exposure times, and to detect the bright line more appropriately.

In the above-mentioned case, the light emission state of the light emitting unit is recognized by calculating the exposure time from the brightness of each exposure line.

When the brightness of each exposure line is distinguished as a binary value indicating whether the luminance is not less than a threshold, the light emitting unit has to continue a state not emitting light for a time longer than the exposure time of each exposure line in order to recognize the state where no light is emitted.

FIG. 20B illustrates the influence of difference in the exposure time when the exposure start times of the exposure lines are the same. In FIG. 20B, 7500*a* represents the case where the exposure end time of the preceding exposure line is the same as the exposure start time of the next exposure line, and 7500*b* represents the case where the exposure time is set longer than that in the above case. As in the case represented by 7500*b*, the exposure time can be prolonged by setting the exposure times of the adjacent exposure lines to be partially overlapped with each other on the time base. In other words, an amount of light entering the image capturing element is increased, and a brighter image can be obtained. Furthermore, image capturing sensitivity to capture images having the same brightness can be held lower, and an image including less noise can be obtained. Hence communication errors are reduced.

Figure 20C:
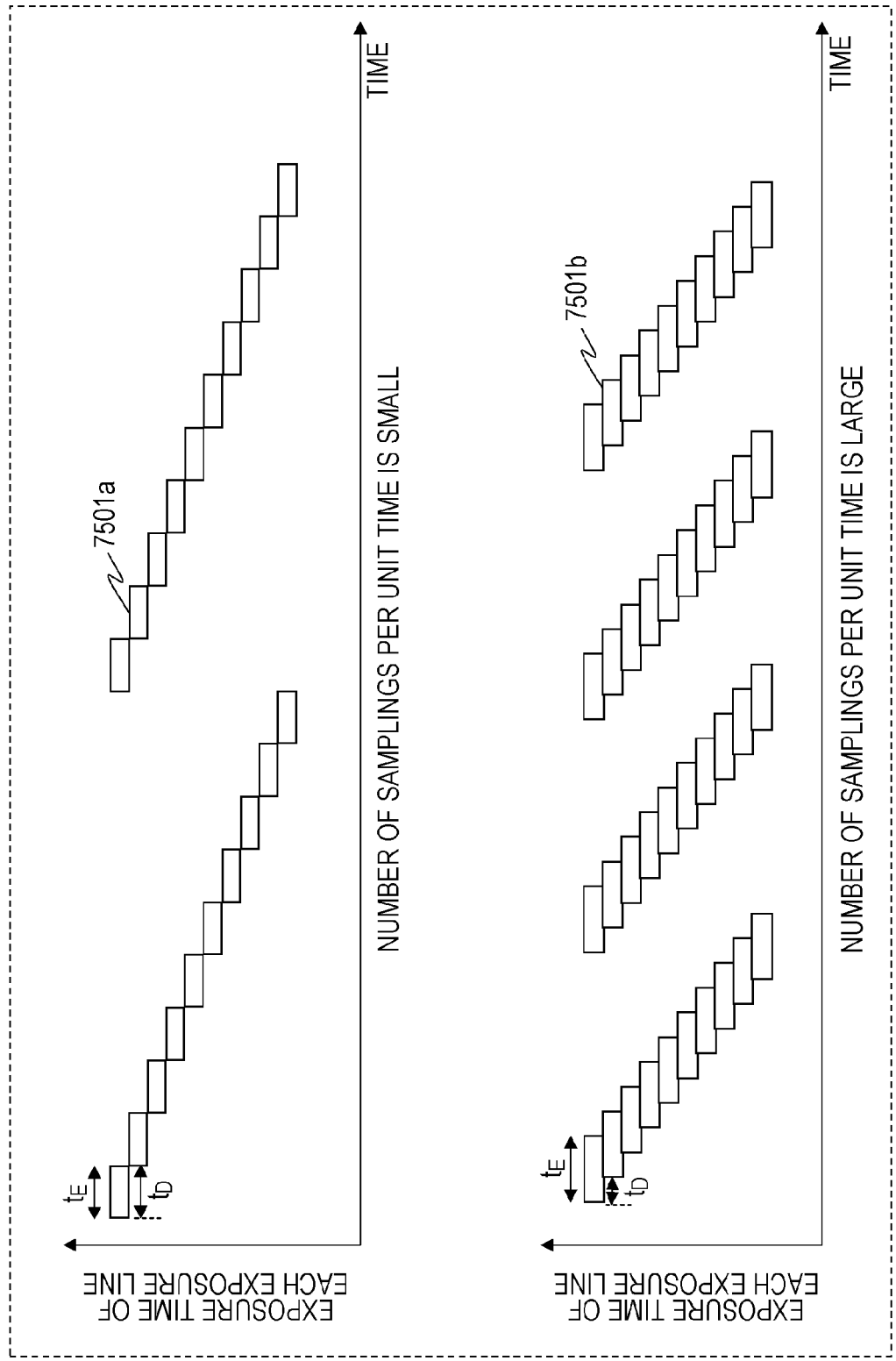
FIG. 20C illustrates still another example of the method of observing the luminance of the light emitting unit in the second embodiment.

FIG. 20C illustrates the influence of difference in the exposure start time of the exposure line when the exposure times are the same. In FIG. 20C, 7501*a* represents the case where the exposure end time of the preceding exposure line is the same as the exposure start time of the next exposure line, and 7501*b* represents the case where the exposure for the next exposure line is started before the end of the exposure for the preceding exposure line. As represented by the case of 7501*b*, the number of lines capable of being exposed per unit time can be increased by setting the exposure times of the adjacent exposure lines to be partially overlapped with each other on the time base. Accordingly, resolution can be increased and a larger amount of information can be obtained. Since a sampling interval (=difference in exposure start time) is shorter (smaller), a luminance change of the light source can be estimated more accurately, and an error rate can be reduced. Moreover, the luminance change of the light source in a shorter time can be recognized. Since the exposure times are overlapped with each other, blinking of the light source at a period shorter than the exposure time can also be recognized by utilizing the difference in exposure value between the adjacent exposure lines.

As described above with reference to FIGS. 20B and 20C, when the exposure lines are successively exposed such that the exposure times of the adjacent exposure lines are partially overlapped with each other on the time base, the communication speed can be drastically increased by employing the bright line pattern for signal transmission, which pattern is generated by setting the exposure time to be shorter than in the ordinary image-capturing mode. A more appropriate bright line pattern can be generated by setting the exposure time in visible light communication to be $\frac{1}{480}$ sec or shorter. It is here required that, given the frame frequency=f, the exposure time is set to satisfy (exposure time <$\frac{1}{8}$×f). Blanking generated at the time of image capturing is a half one frame at maximum. Because a blanking time is a half the image capturing time, an actual image capturing time is $\frac{1}{2}$f at minimum. Furthermore, because 4-value information needs to be received within a time of $\frac{1}{2}$f, it is at least required to set the exposure time to be shorter than 1/(2f×4). Thus, because the frame rate is usually 60 frames/sec or less, it is possible to generate an appropriate bright line pattern in the image data and to realize high-speed signal transmission by setting the exposure time to be $\frac{1}{480}$ sec or shorter.

FIG. 20D illustrates the advantages when the exposure times of the exposure lines are not overlapped with each other and when the exposure time is short. In the case of the exposure time being long, even when the light source provides a binary luminance change as represented by 7502*a*, intermediate color regions appear in the captured image as represented by 7502*e*, and a difficulty tends to occur in recognizing the luminance change of the light source. However, when, as represented by 7502*d*, a predetermined blank time during which no exposure occurs (i.e., a predetermined waiting time) $t_{D2}$ is set after the end of the exposure for one exposure line and before the start of the exposure for the next exposure line, the luminance change of the light source can be recognized more easily. Thus, a more appropriate bright line pattern can be detected as represented by 7502*f*. The scheme of providing the predetermined blank time during which no exposure occurs, as represented by 7502*d*, can be realized by setting an exposure time $t_E$ to be shorter than a time difference $t_D$ between the exposure start times of the adjacent exposure lines. When, in the ordinary image capturing mode, the exposure times of the adjacent exposure lines are partially overlapped with each other on the time base, the predetermined blank time can be provided by setting the exposure time to be shorter than in the ordinary image capturing mode to such an extent as allowing appearance of the predetermined blank time during which no exposure occurs. Moreover, even when, in the ordinary image capturing mode, the exposure end time of the preceding exposure line is the same as the exposure start time of the next exposure line, the predetermined blank time can be provided by setting the exposure time to be shorter than in the ordinary image capturing mode to such an extent as allowing appearance of the predetermined blank time during which no exposure occurs. Moreover, the scheme of setting the predetermined blank time during which no exposure occurs (i.e., the predetermined waiting time) $t_{D2}$ after the end of the exposure for one exposure line and before the start of the exposure for the next exposure line can also be realized by setting the time difference $t_D$ between the exposure start times of the adjacent exposure lines to be longer as represented by 7502g. With the above-mentioned scheme, since the exposure time can be prolonged, a brighter image can be captured, and noise is reduced. Hence error tolerance is relatively high. On the other hand, the above-mentioned scheme has the disadvantage that the number of exposure lines capable of being exposed within a predetermined time is reduced and the number of samplings is reduced as represented by 7502h. Thus, it is desired that the above-mentioned schemes are optionally employed depending on situations. In practice, an error in estimating the luminance change of the light source can be reduced, for example, by employing the former scheme when the image capturing object is bright, and the latter scheme when the image capturing object is dark.

It is not always required for all the exposure lines that the exposure times of the adjacent exposure lines are partially overlapped with each other on the time base. Those exposure times may not be partially overlapped with each other on the time base for some of the exposure lines. It is also not always required for all the exposure lines that the predetermined blank time during which no exposure occurs (i.e., the predetermined waiting time) is set after the end of the exposure for one exposure line and before the start of the exposure for the next exposure line. Some of the exposure lines may be partially overlapped with each other. The advantageous effects of the above-mentioned schemes can be utilized by selectively employing those schemes. In the ordinary image capturing mode in which images are captured at the ordinary frame rate (30 fps or 60 fps) and in the visible light communication mode in which images are captured with the exposure time of 1/480 sec or shorter via the visible light communication, signals may be read out by employing the same reading method or circuit. In the case of reading out signals by employing the same reading method or circuit, separate circuits are not needed for the ordinary image capturing mode and the visible light communication mode, and a circuit scale can be reduced.

FIG. 20E illustrates the relations among a minimum change time $t_S$ of the luminance of the light source, the exposure time $t_E$, the time difference $t_D$ between the exposure start times of the adjacent exposure lines, and the captured image. On condition of $t_E+t_D<t_S$, an image of one or more exposure lines is always captured in the state where the luminance of the light source is not changed from the start to the end of the exposure. Therefore, an image exhibiting a clear change in brightness is obtained as represented by 7503d, and the luminance change of the light source can be recognized easily. On condition of $2t_E>t_S$, bright lines in a pattern different from the pattern of the luminance change of the light source may be obtained in some cases, and the luminance change of the light source is difficult to recognize from the captured image.

Figure 20F:
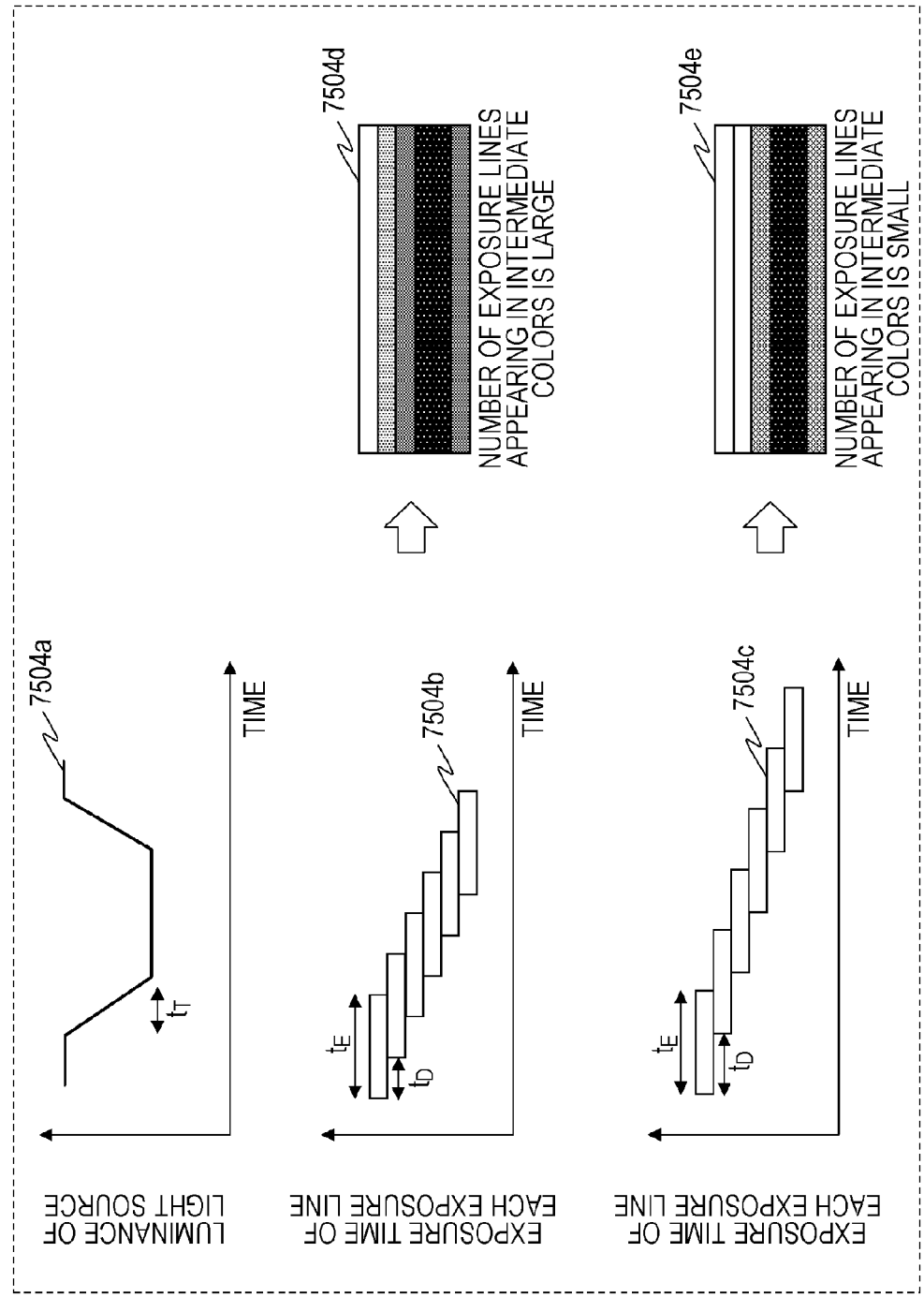
FIG. 20F illustrates still another example of the method of observing the luminance of the light emitting unit in the second embodiment.

FIG. 20F illustrates the relation between a transition time $t_T$ of the luminance of the light source and the time difference $t_D$ between the exposure start times of the adjacent exposure lines. As $t_D$ increases relative to $t_T$, the number of exposure lines appearing in intermediate colors reduces, and the luminance of the light source is easier to estimate. On condition of $t_D>t_T$, the number of exposure lines appearing in intermediate colors is desirably reduced to be not larger than two in succession. Because $t_T$ is 1 μsec or shorter when the light source is an LED, and it is about 5 μsec when the light source is an organic EL, the luminance of the light source can be easily estimated by setting $t_D$ to 5 μsec or longer.

FIG. 20G illustrates the relation between a high-frequency noise period $t_{HT}$ of the luminance of the light source and the exposure time $t_E$. As $t_E$ increases relative to $t_{HT}$, the influence of the high-frequency noise upon the captured image reduces, and the luminance of the light source is easier to estimate. When $t_E$ is integer time $t_{HT}$, the influence of the high-frequency noise disappears and the luminance of the light source is easiest to estimate. Thus, the condition of $t_E>t_{HT}$ is desirable in estimating the luminance of the light source. The high-frequency noise is mainly attributable to a switching power supply circuit, and $t_{HT}$ is 20 μsec or shorter in switching power supplies for many lighting apparatuses. Therefore, the luminance of the light source can be easily estimated by setting $t_E$ to 20 μsec or longer.

Figure 20H:
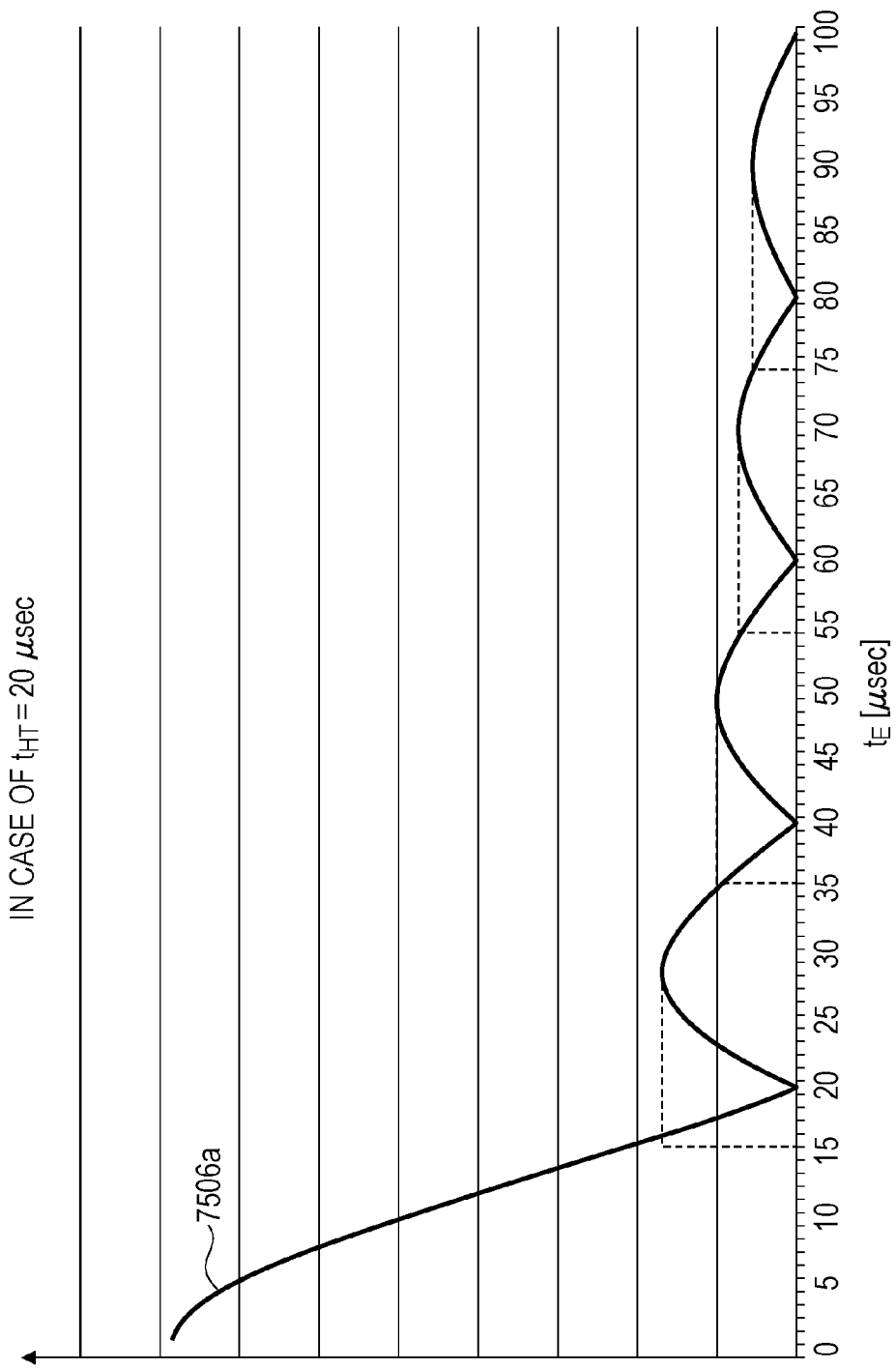
FIG. 20H illustrates still another example of the method of observing the luminance of the light emitting unit in the second embodiment.

FIG. 20H is a graph representing the relation between the exposure time $t_E$ and the magnitude of the high-frequency noise when $t_{HT}$ is 20 μsec. Taking into account that $t_{HT}$ varies depending on light sources, it is understood from the graph that good efficiency is obtained by setting $t_E$ to be not shorter than any of 15 μsec, 35 μsec, 54 μsec, and 74 μsec at which the noise magnitude takes a value equal to that at its local maximum. From the viewpoint of reducing the high-frequency noise, $t_E$ is desirably as long as possible. On the other hand, as discussed above, there is such a property that as $t_E$ reduces, the intermediate color region is harder to appear and the luminance of the light source is easier to estate. It is hence preferable to set $t_E$ to be not shorter than 15 μsec when the period of the luminance change of the light source is 15 to 35 μsec, to be not shorter than 35 μsec when the period of the luminance change of the light source is 35 to 54 μsec, to be not shorter than 54 μsec when the period of the luminance change of the light source is 54 to 74 μsec, and to be not shorter than 74 μsec when the period of the luminance change of the light source is 74 μsec or longer.

FIG. 20I illustrates the relation between the exposure time $t_E$ and a recognition success rate. Since the exposure time $t_E$ has relative meaning with respect to a time during which the luminance of the light source is constant, the horizontal axis in a graph of FIG. 20I represents a value resulting from dividing the period $t_S$ of the luminance change of the light source by the exposure time $t_E$ (i.e., a relative exposure time). As seen from the graph, when the recognition success rate is to be kept substantially at 100%, the relative exposure time needs to be set to 1.2 or less. For example, when the transmission signal is 1 kHz, the exposure time needs to be set to about 0.83 msec or shorter. Similarly, it is seen that when the recognition success rate is to be kept at 95% or higher, the relative exposure time needs to be set to 1.25 or less, and that when the recognition success rate is to be kept at 80% or higher, the relative exposure time needs to be set to 1.4 or less. Furthermore, the recognition success rate abruptly reduces near 1.5 and becomes substantially 0% at 1.6. It is hence understood that the relative exposure time should be set not to exceed 1.5. In addition, as seen from FIG. 20I, after falling down to 0 as denoted by 7507c, the recognition success rate rises again as denoted by 7507d, 7507e, or 7507f. Accordingly, when a bright image is to be captured by prolonging the exposure time, the exposure time may be set to a value at which the relative exposure time is in the range of 1.9 to 2.2, 2.4 to 2.6, or 2.8 to 3.0. For example, those exposure times are preferably used in an intermediate mode illustrated in FIG. 21.

The visible light communication function in this embodiment may be the function that is previously incorporated in the portable terminal. Furthermore, a program may be stored in the portable terminal through distribution of the program, and a computer in the portable terminal may be controlled in accordance with that program. The ordinary image capturing function may be the function that is previously incorporated in the portable terminal, or may be included in a distributed program that has the visible light communication function. The visible light communication function and the ordinary image capturing function may be provided as the optionally selectable function.

Figure 22A:
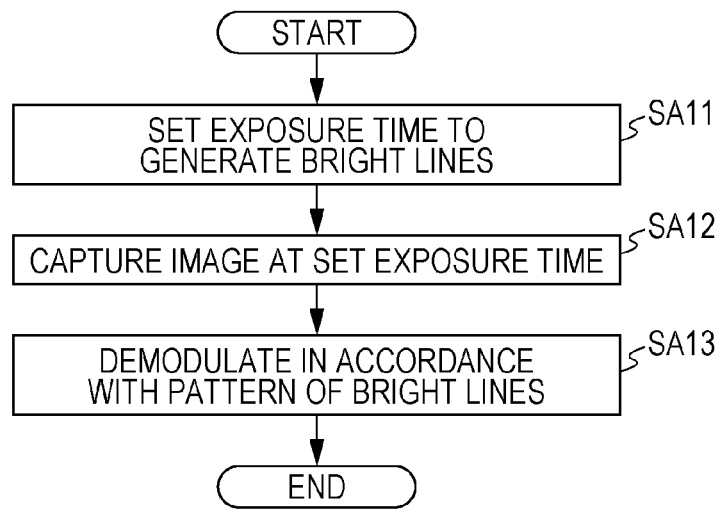
FIG. 22A is a flowchart illustrating an information communication method according to another aspect of the present disclosure.

FIG. 22A is a flowchart illustrating an information communication method according to another aspect of the present disclosure.

The information communication method according to another aspect of the present disclosure is an information communication method for obtaining information from an object, and it includes steps SA11, SA12, and SA13.

More specifically, the information communication method includes an exposure time setting step (SA11) of setting an exposure time of an image sensor such that, on an image of an object captured by the image sensor, bright lines corresponding to exposure lines included in the image sensor are generated in accordance with a luminance change of the object, an image capturing step (SA12) of obtaining the image including the bright lines by capturing the image of the object, of which luminance is changed, at the set exposure time by the image sensor, and an information obtaining step (SA13) of obtaining information by demodulating data specified by a pattern of the bright lines, which are included in the obtained image.

Figure 22B:
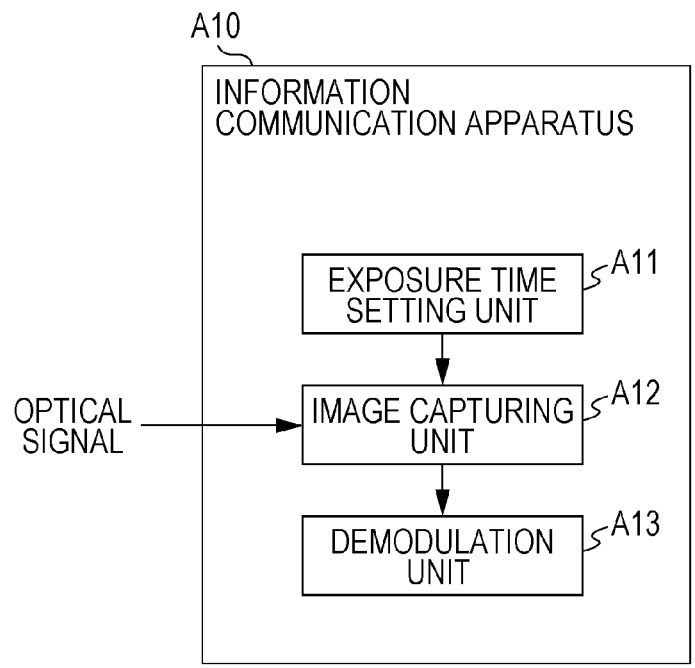
FIG. 22B is a block diagram of an information communication device according to the other aspect of the present disclosure.

FIG. 22B is a block diagram of an information communication apparatus according to the other aspect of the present disclosure.

An information communication apparatus A10 according to the other aspect of the present disclosure is an information communication apparatus for obtaining information from an object, and it includes components A11, A12 and A13.

More specifically, the information communication apparatus A10 includes an exposure time setting unit A11 for setting an exposure time of an image sensor such that, on an image of an object captured by the image sensor, bright lines corresponding to exposure lines included in the image sensor are generated in accordance with a luminance change of the object, an image capturing unit A12 constituted as the image sensor that obtains the image including the bright lines by capturing the image of the object, of which luminance is changed, at the set exposure time, and a demodulation unit A13 that obtains information by demodulating data specified by a pattern of the bright lines, which are included in the obtained image.

Third Embodiment

FIG. 23 illustrates a service providing system using the reception method according to the embodiment described above.

First, distribution of information to a portable terminal ex8003 is requested for a company A ex8000, which manages a server ex8002, from another company B or a person ex8001. For example, the company B or the person ex8001 requests distribution of detailed advertisement information, coupon information, map information or the like to the portable terminal ex8003 that has communicated with a signage via the visible light communication. The company A ex8000 managing the server further manages information, which is distributed to the portable terminal ex8003, in relation to corresponding ID information. The portable terminal ex8003 obtains ID information from an object ex8004 via the visible light communication and sends the obtained ID information to the server ex8002. The server ex8002 sends the information corresponding to the ID information to the portable terminal ex8003 and counts the number of times at which the information corresponding to the ID information has been sent. The company A ex8000 managing the server bills a charge depending on the counted number of times to the company B or the person ex8001 who has requested the information. For example, as the counted number of times increases, the charge is billed in a larger amount.

Figure 24:
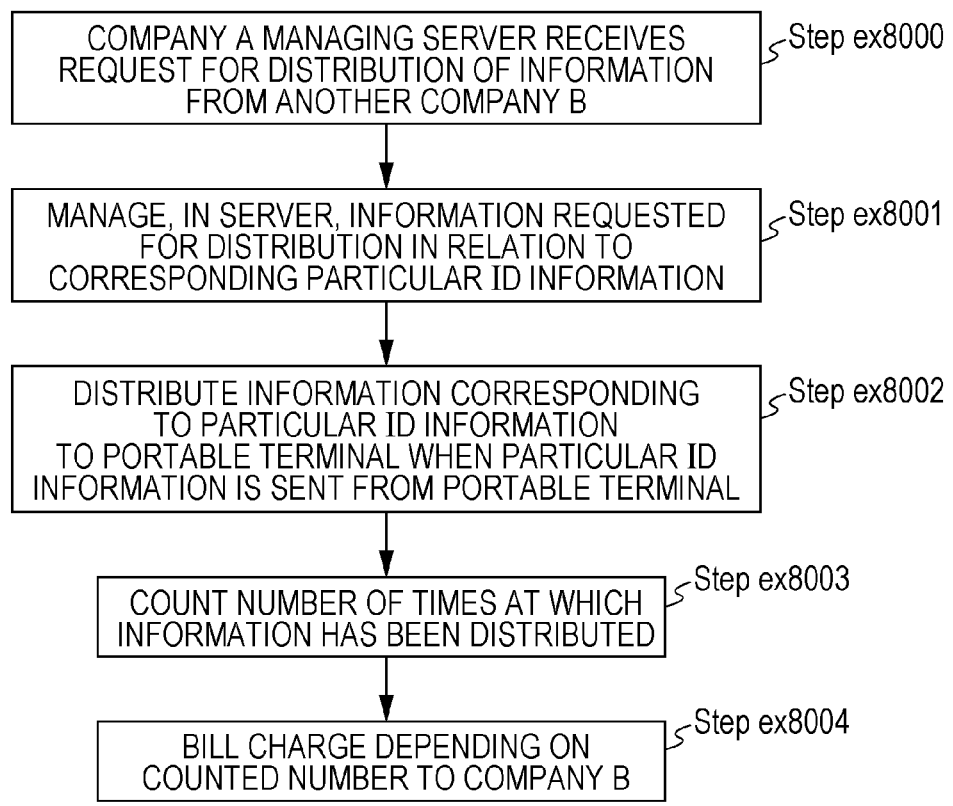
FIG. 24 is a flowchart illustrating a service providing flow.

FIG. 24 is a flowchart illustrating a service providing flow.

In Step ex8000, the company A managing the server receives a request for distribution of information from the other company B. Next, in Step ex8001, the information having been requested for distribution is made related to the particular ID information in the server that is managed by the company A. In Step ex8002, the portable terminal receives the particular ID information from the object via the visible light communication and sends the particular ID information to the server that is managed by the company A. Details of the visible light communication method are not described here because the details have already been described in the other embodiments. The server sends, to the portable terminal, the information corresponding to the particular ID information that has been sent from the portable terminal. In Step ex8003, the server counts the number of times at which the information has been distributed. Finally, in Step ex8004, a charge depending on the number of times at which the information has been distributed is billed to the company B. By billing the charge depending on the counted number in such a manner, an appropriate charge corresponding to the advertisement effect, which is represented by the distribution of the information, can be charged on the company B.

Figure 25:
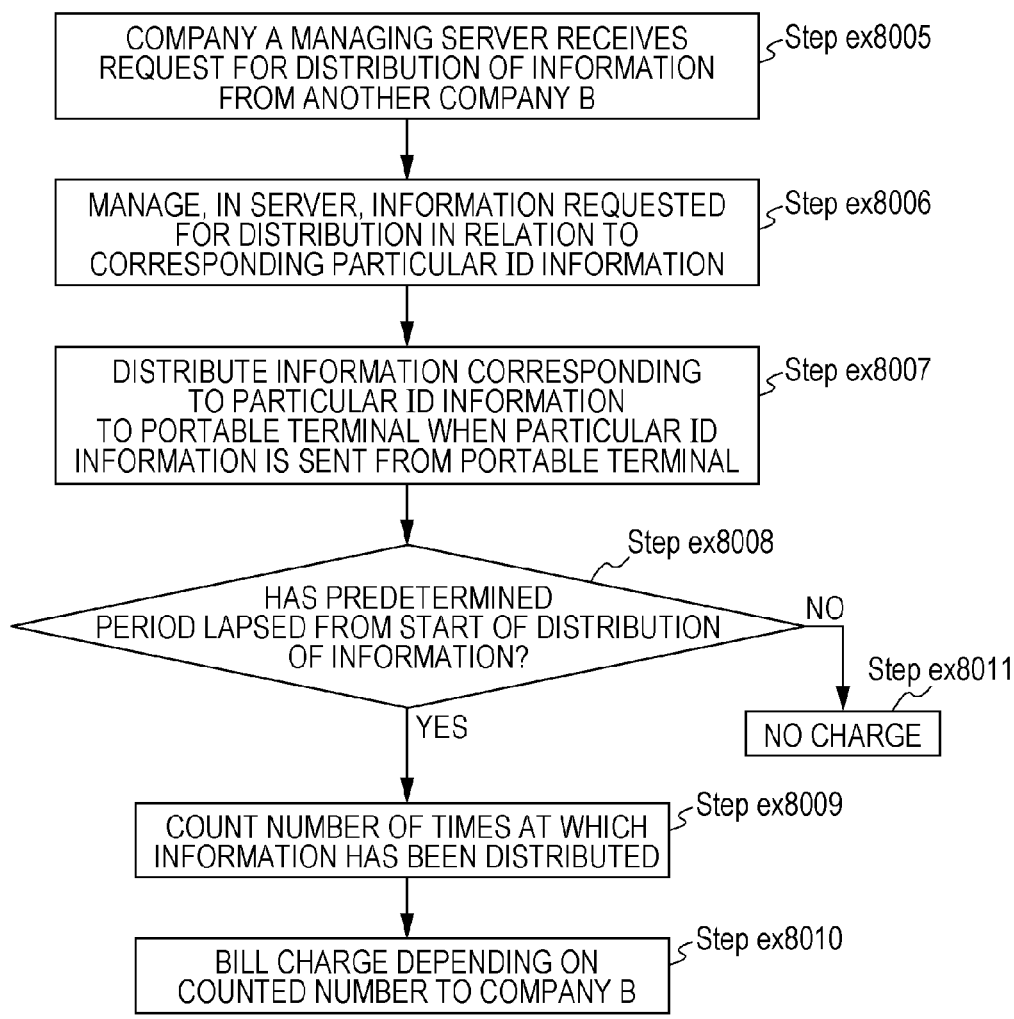
FIG. 25 is a flowchart illustrating a service providing flow in another example.

FIG. 25 is a flowchart illustrating a service providing flow in another example. Description of steps overlapped with those in FIG. 24 is omitted.

In Step ex8008, it is determined whether a predetermined period has lapsed from start of the distribution of the information. If it is determined that the lapsed time is within the predetermined period, no charge is billed to the company B in Step ex8011. On the other hand, if it is determined that the lapsed time exceeds the predetermined period, the number of times at which the information has been distributed is counted in Step ex8009. Then, a charge depending on the counted number of the information distributions is billed to the company B in Step ex8010. Thus, since information is distributed at no charge within the predetermined period, the company B can receive billing service after confirming the advertisement effect, for example.

Figure 26:
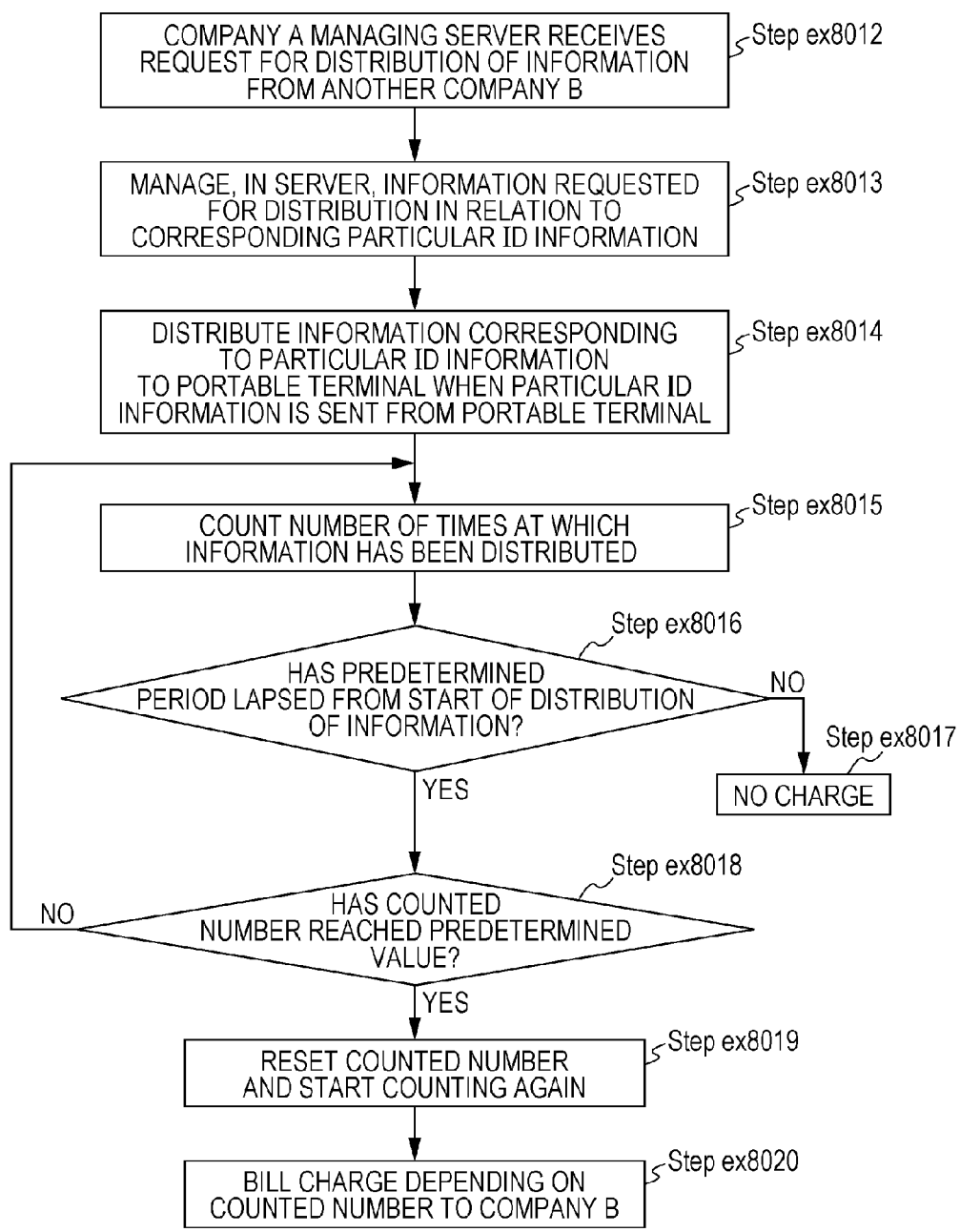
FIG. 26 is a flowchart illustrating a service providing flow in still another example.

FIG. 26 is a flowchart illustrating a service providing flow in still another example. Description of steps overlapped with those in FIG. 25 is omitted.

In Step ex8015, the number of times at which the information has been distributed is counted. If it is determined in Step ex8015 that the predetermined period has not yet lapsed from start of the distribution of the information, no charge is billed in Step ex8017. On the other hand, if it is determined that the predetermined period has lapsed, it is determined in Step ex8018 whether the number of times at which the information has been distributed reaches a predetermined value. If the number of times of the information distributions does not reach the predetermined value, the counted number is reset and counting of the number of times of the information distributions is restarted. In this respect, no charge is billed to the company B for the predetermined period during which the number of times of the information distributions has been less than the predetermined value. If the number of times of the information distributions reaches or exceeds the predetermined value in Step ex8018, the counted number is reset and counting of the number of times of the information distributions is restarted in Step ex8019. Then, a charge depending on the counted number is billed to the company B in Step ex8020. By thus setting the period of no-charge distribution again when the counted number in the period during which the information has been distributed at no charge is small, the company B can receive billing service at appropriate timing. Furthermore, when the counted number is small, the company A can analyze the details of the information and can propose change of the content of the information to the company B, for example, when the information is not matched with the season. When the period of no-charge distribution is set again, the newly set period may be shorter than the initial predetermined period. Setting the next period to be shorter than the initial predetermined period can reduce the burden imposed on the company A. Alternatively, the period of no-charge distribution may be set again after a certain blank period. For example, when the season affects the information, a certain blank period may be set until change of the season, and the period of no-charge distribution may be set again after start of the next season.

The billed charge may be changed depending on the amount of distributed data instead of being depending on the number of times of the information distributions. The charge may not be billed for the distribution of the information until reaching a predetermined data amount, and may be billed for the distribution of the information exceeding the predetermined data amount. The billed charge may be increased as the data amount increases. Moreover, when the information is managed in relation to the corresponding particular ID information, a management fee may be billed. In the case of billing the management fee, the fee can be determined at the time of requesting the distribution of the information.

The visible light communication is a communication method of capturing an image of an object, which emits visible light corresponding to transmitted information, by an image capturing element (image sensor) that is incorporated in a receiver, and obtaining the transmitted information from the captured image. The transmitted information is, for example, information for indicating (specifying) an object. Details of the visible light communication have been described in the second embodiment.

Fourth Embodiment

Explanation of Logos and Coincidence of Icons Between Transmitter and Receiver

Figure 27:
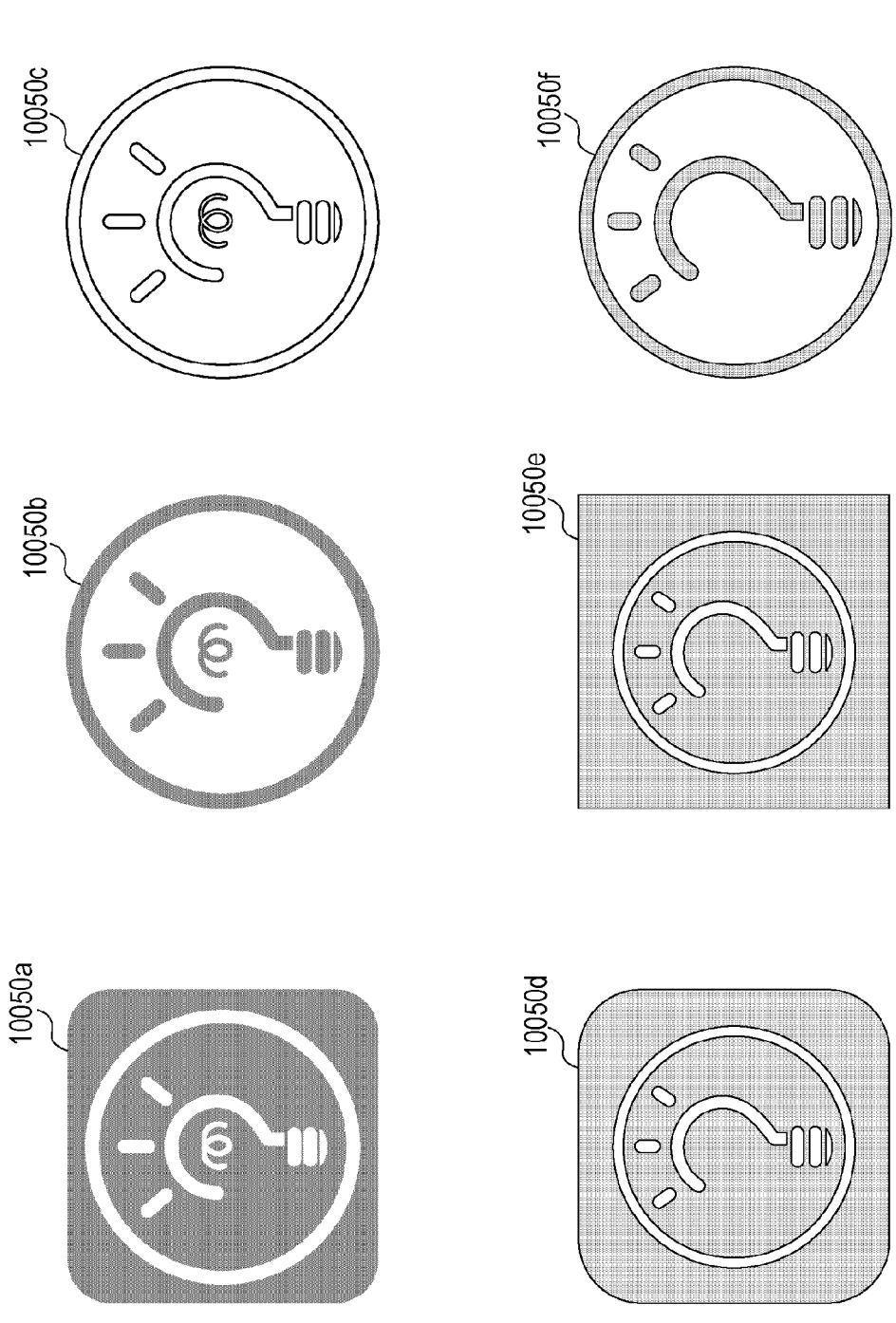
FIG. 27 is an illustration to explain logos in a fourth embodiment.

FIG. 27 illustrates examples of logos indicating adaptation to the visible light communication.

Logos 10050*a*, 10050*b*, 10050*c*, 10050*d*, 10050*e* and 10050*f* are each designed in the motif of a light bulb and a question mark. The light bulb intimates visible light. The question mark intimates the presence of something that is not explicitly unclear. Thus, the logo in combination of the light bulb and the question mark indicates that something occurs via the visible light communication, or that some information is obtained via the visible light communication.

FIG. 27 illustrates examples of the logos that are designed on the basis of the above-mentioned idea.

By displaying, on a transmitter, one of those logos designed as described above, the user can recognize that an apparatus having the logo is a transmitter transmitting a visible light signal.

By employing, as an icon to start up an application, one of those logos designed as described above, the user can recognize that a visible light signal can be received by starting up the application related to the icon.

In other words, by employing, as an icon to start up an application, an icon being the same as the log indicating a transmitter or an icon constituted in design partly common to the relevant icon, the user can recognize that a visible light signal can be received by starting up the application related to the icon.

While the following description is made in connection with the case using one of the illustrated logs as an example, similar advantageous effects can also be obtained in the case using another logo.

(Startup of Reception Application and Logo Representation by Signage-Type Transmitter)

Figure 28:
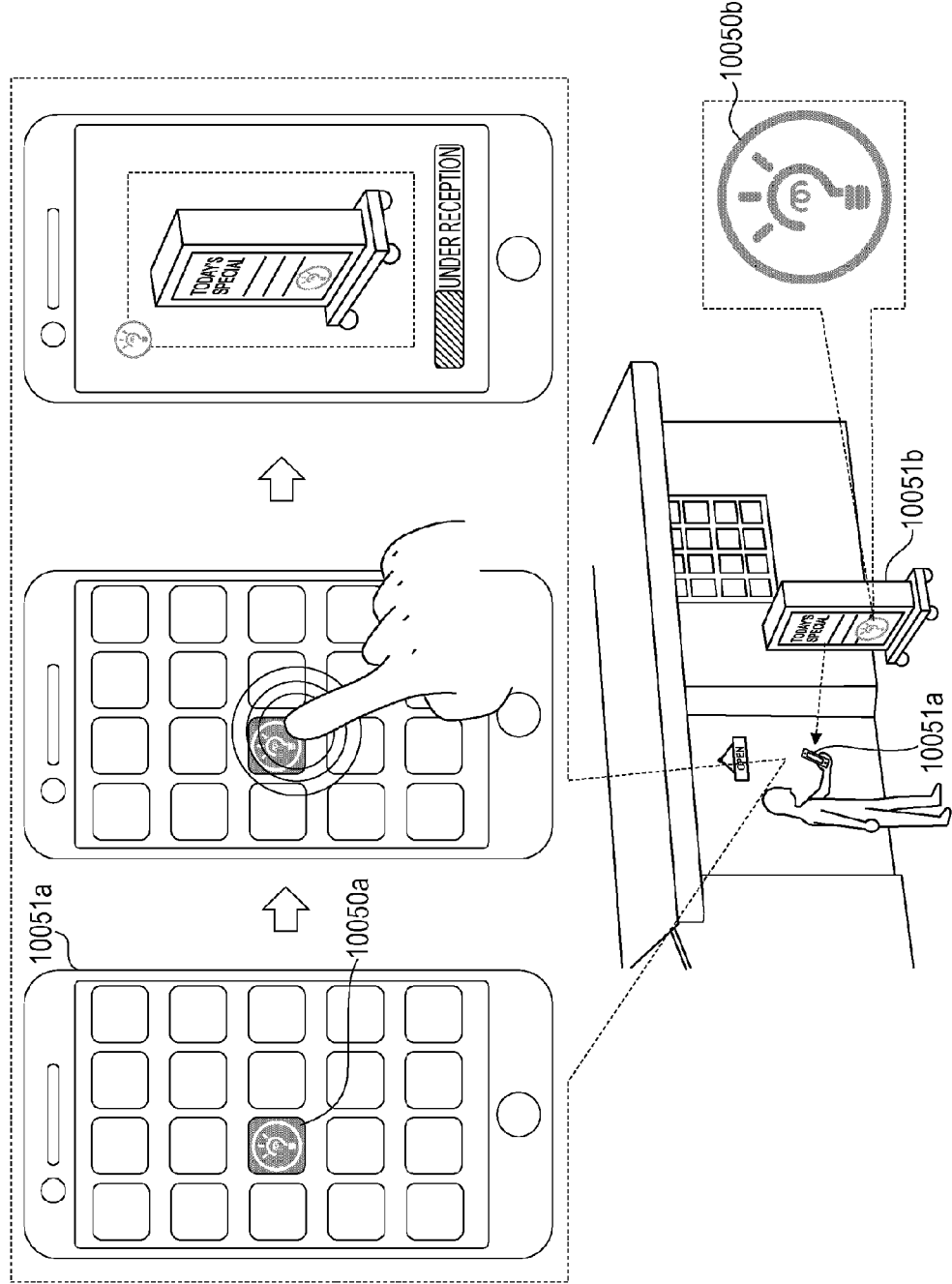
FIG. 28 is an illustration to explain logos in the fourth embodiment.

FIG. 28 illustrates one example of an operation for receiving a visible light signal.

The user starts up a visible light reception application by tapping the icon 10050*a* displayed on a receiver 10051*a*.

The receiver may display the logo on its screen when the receiver is in a state capable of receiving the visible light signal. When the receiver has received a part of the visible light signal, the receiver may display the logo on the screen to indicate that it is in a state under reception.

The transmitter 10051*b* constituted in the form of a signage, for example, can indicate that it is transmitting the visible light signal, by representing the logo 10050*b*. The logo 10050*b* is represented, for example, by printing it in a part of the signage.

(Logo Representation by Lighting-Type Transmitter)

Figure 29:
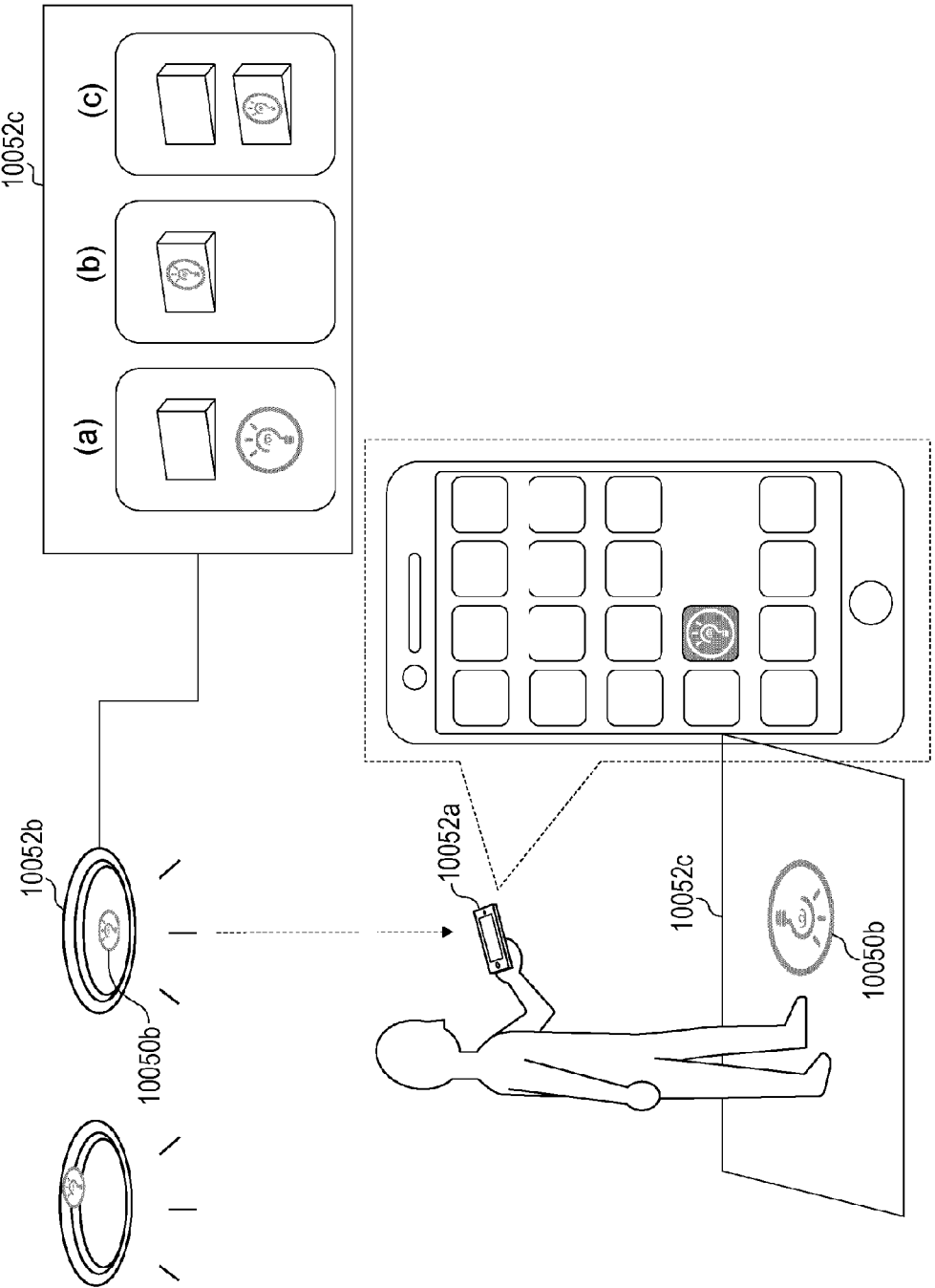
FIG. 29 is an illustration to explain logos in the fourth embodiment.

FIG. 29 illustrates one example of logo representation by a transmitter that is constituted as a lighting apparatus, for example. A transmitter 10052*b* constituted as a lighting apparatus, for example, can indicate that the transmitter is transmitting a visible light signal, by representing the logo 10050*b*.

Because illumination light is difficult to visually recognize, the logo may be represented on a floor surface 10052*c*, an exhibited object, or the vicinity thereof, which is illuminated with the lighting apparatus.

A lighting controller 10052*a* for operating the lighting apparatus (transmitter) 10052*b* can also indicate that the lighting apparatus 10052*b* is transmitting a visible light signal, by displaying the logo 10050*b*. In FIG. 29, (a) and (b) illustrate examples indicating that the relevant switch is a switch for operating the lighting apparatus transmitting the visible light signal. Furthermore, (c) illustrates an example of the case where an upper switch controls on/off of the lighting apparatus, and a lower switch controls on/off of communication of the visible light signal.

(Logo Representation by Exhibition Lighting-Type Transmitter)

Figure 30:
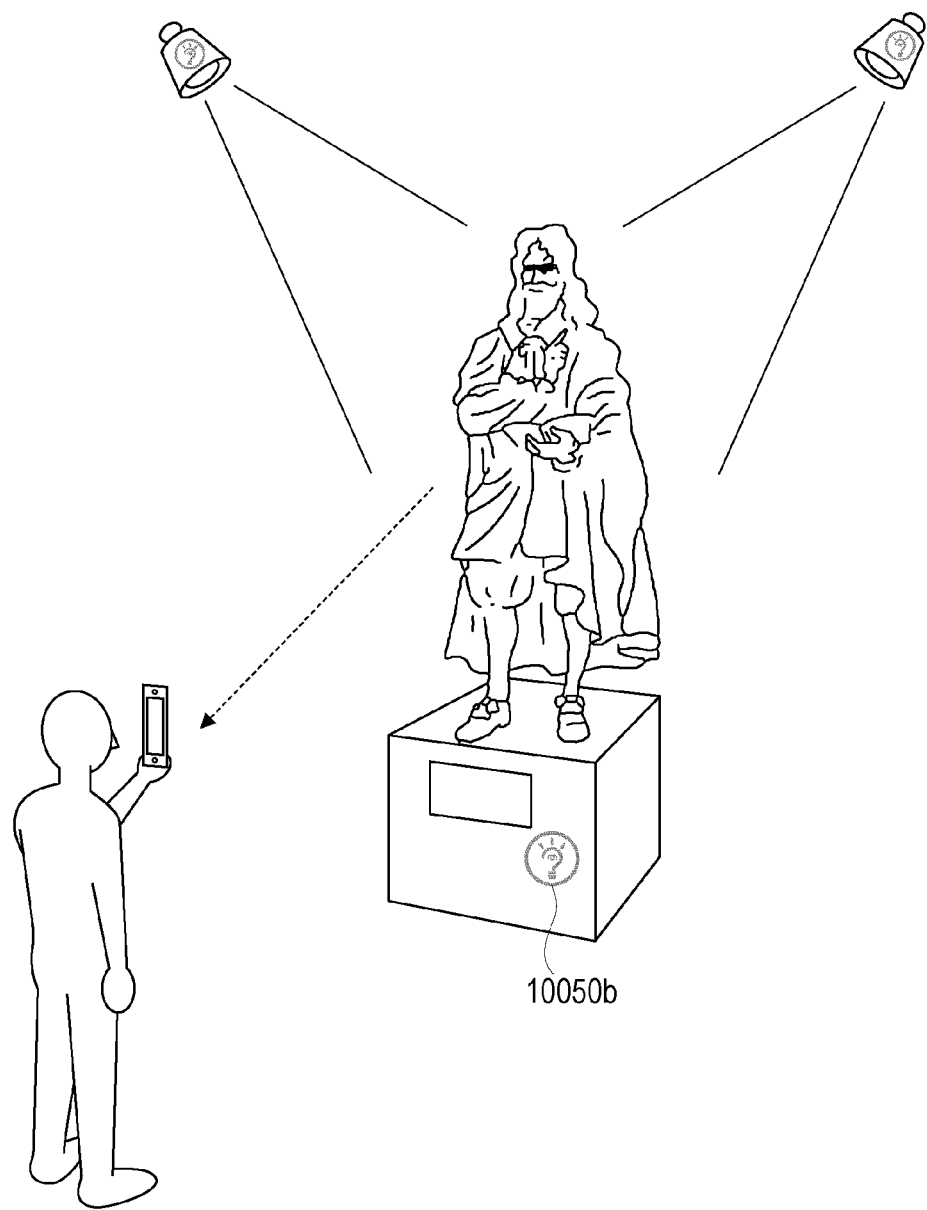
FIG. 30 is an illustration to explain logos in the fourth embodiment.

FIG. 30 illustrates one example of logo representation by a transmitter that is constituted as an exhibition lighting apparatus, for example. By representing the logo 10050*b* near an exhibited object to be illuminated with the exhibition lighting apparatus, the user can be urged to recognize that a visible light signal is superimposed on the illumination light for the exhibition.

(Logo Representation by Display-Type Transmitter)

Figure 31:
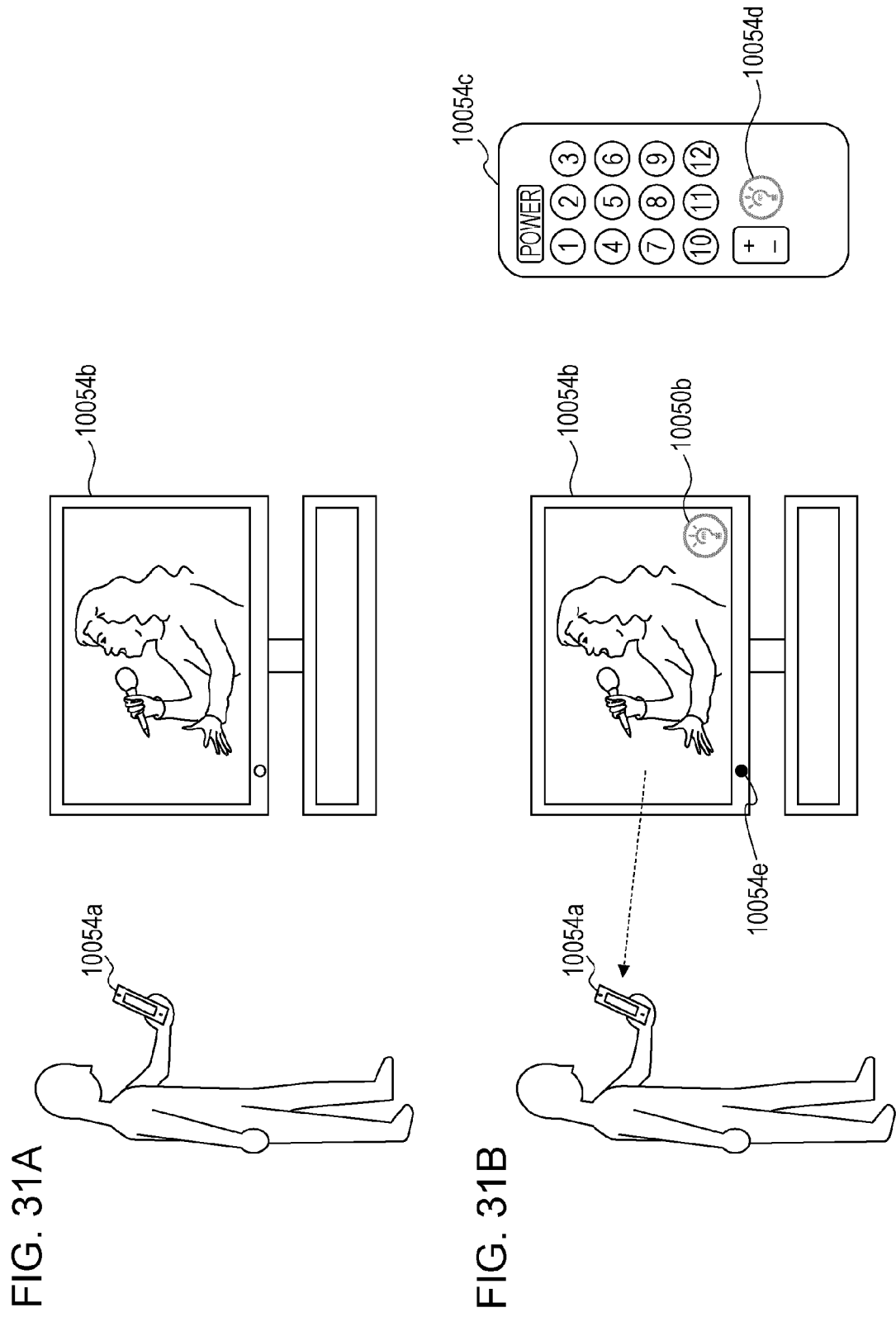
FIGS. 31A and 31B are illustrations to explain logos in the fourth embodiment.

FIG. 31 illustrates one example of logo representation by a transmitter that is constituted as a display of a TV set, a digital signage, a personal computer, or a smartphone, for example.

A display (transmitter) $10054b$ can urge the user to recognize whether the transmitter is transmitting a visible light signal or not, by (a) not displaying the logo $10050b$ when the visible light signal is not transmitted, and (b) displaying the logo $10050b$ when the visible light signal is transmitted. In the case of (b), the logo may be disposed in superimposed relation to the content displayed on a screen. By superimposing the logo in a semitransparent state, the displayed log is less apt to impede viewing of the content. Alternatively, the logo may be represented using, e.g., a lamp denoted by $10054e$, which is disposed in a region other than the screen displaying the content.

A controller $10054c$ for the display includes a switch $10054d$ for controlling on/off of transmission of the visible light signal. By representing the logo $10050b$ on the surface of the switch $10054d$ or the vicinity thereof, the user can be urged to recognize that the switch $10054d$ is a switch for controlling on/off of transmission of the visible light signal. The controller $10054c$ may be included in the transmitter $10054b$ or may be a remote controller.

(Logo Representation by Projector-Type Transmitter)

Figure 32:
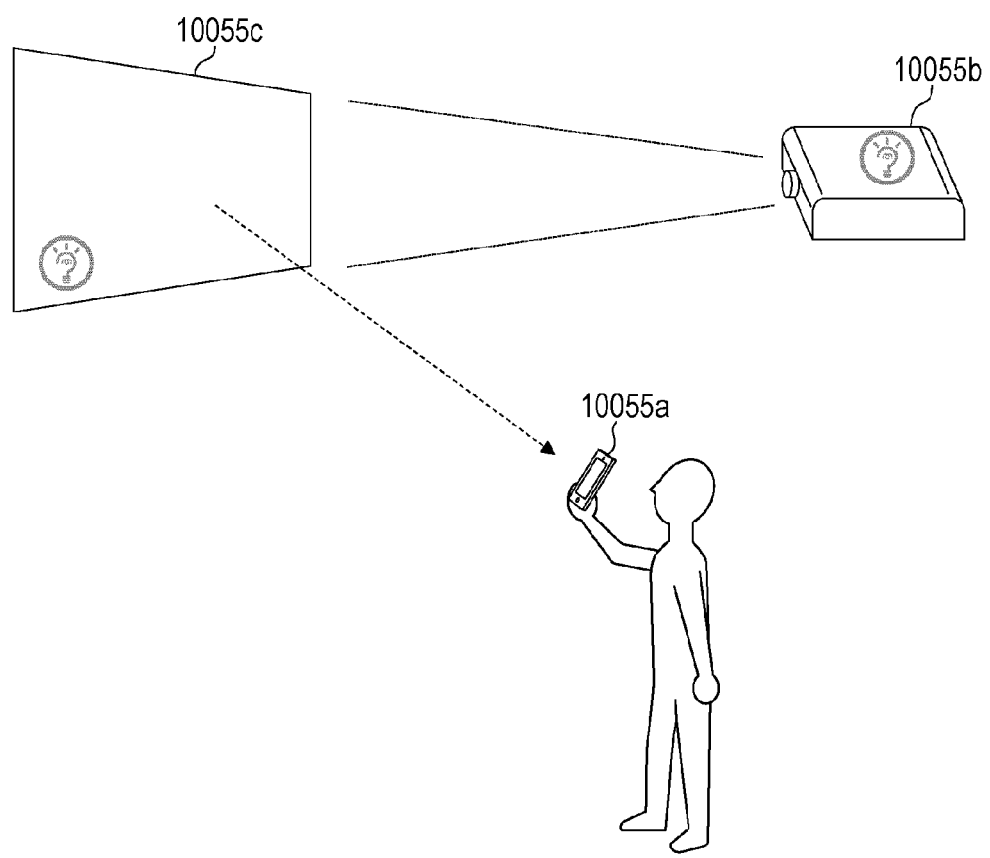
FIG. 32 is an illustration to explain logos in the fourth embodiment.

FIG. 32 illustrates one example of logo representation by a transmitter that is constituted as a projector, for example.

A projector $10055b$ can urge the user to recognize that the projector $10055b$ is a projector adapted for the visible light signal communication, by representing the logo $10050b$ on its surface.

The projector $10055b$ can also urge the user to recognize that a visible light signal is included in the projected light, by superimposing the logo $10050b$ on a projected image.

(Representation of State Under Reception of Visible Light Signal and On/Off Control of Reception)

Figure 33:
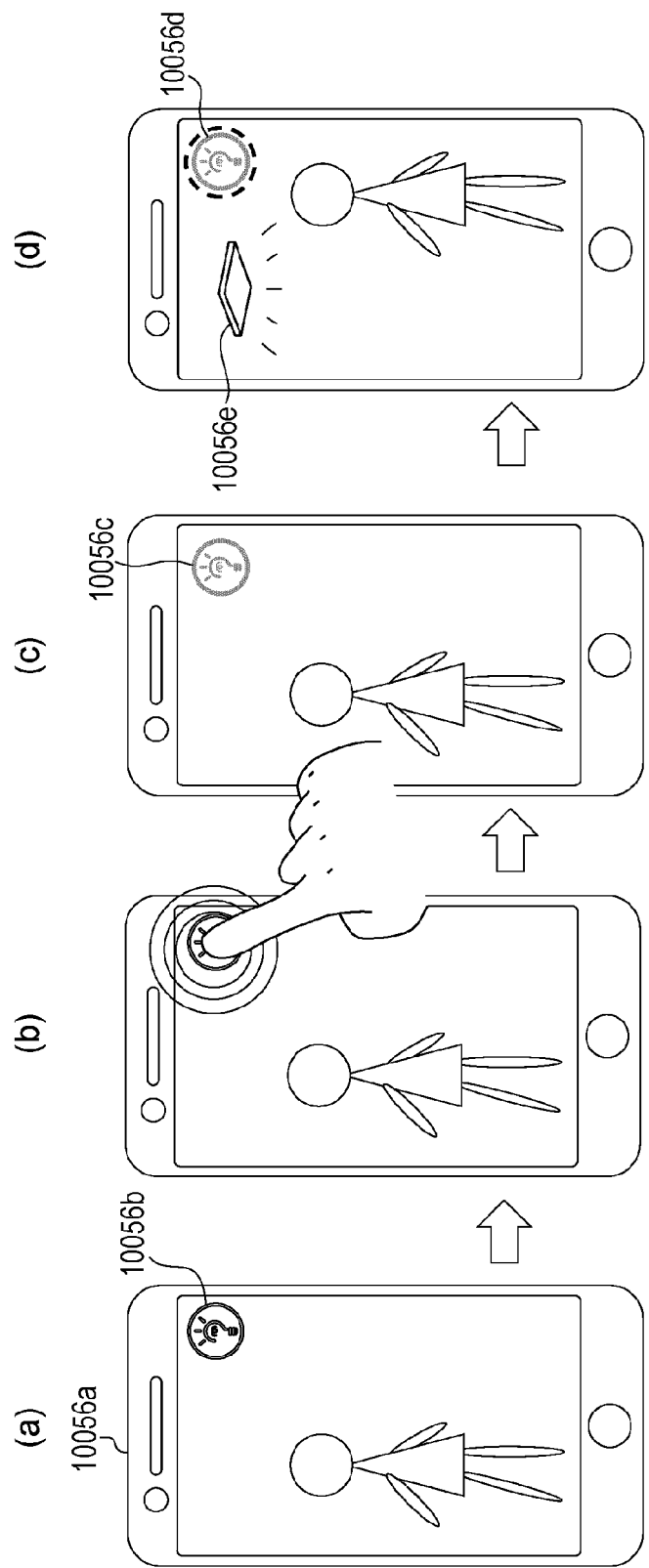
FIG. 33 is an illustration to explain logos in the fourth embodiment.

FIG. 33 illustrates one example of an application for receiving a visible light signal.

By displaying a logo $10056b$, a receiver $10056a$ can indicate that the receiver $10056a$ is not receiving the visible light signal. The logo $10056b$ can urge the user to intuitively recognize that the reception of the visible light signal is inactive, by designing the logo $10056b$, for example, in shape having only edges of the logo $10050b$ or to be displayed in a pale or monochromatic color.

With the user tapping the logo $10056b$ in (b) of FIG. 33, the receiver controls on/off of the reception of the visible light signal.

When the reception of the visible light signal is active, i.e., when the receiver $10056a$ is in a state seeking the visible light signal and being ready for receiving the visible light signal if the visible light signal is present, a logo $10056c$ is displayed. The logo $10056c$ can urge the user to intuitively recognize that the reception of the visible light signal is active, by designing the logo $10056c$ to be displayed, for example, at higher contrast or lightness, or in a more showy color than the logo $10056b$.

When the visible light signal is found, when the reception is under execution, or when the reception is completed, the user can be urged to recognize the situation at that time by employing a logo $10056d$ different from the logo $10056c$. Thus, by designing the logo $10056d$ to be displayed, for example, at higher contrast or lightness, or in a more showy color than the logo $10056c$, the logo $10056d$ can urge the user to intuitively recognize that the visible light signal is found, that the reception is under execution, or that the reception is completed.

(Display of State Under Background Operation)

Figure 34C:
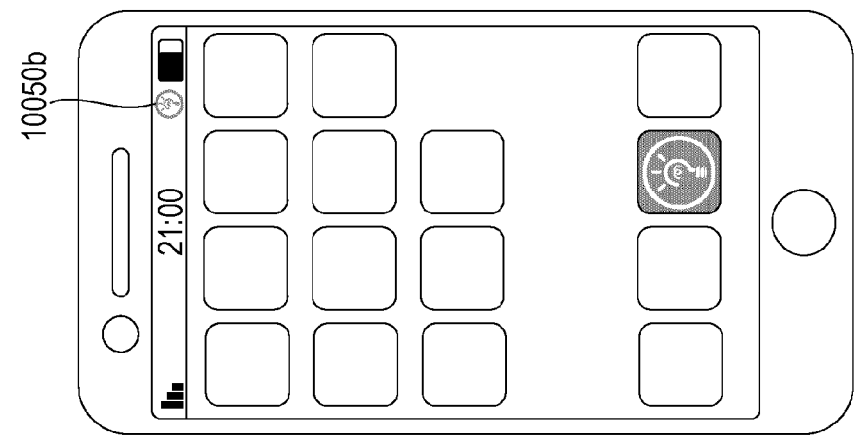
FIGS. 34A, 34B and 34C are illustrations to explain logos in the fourth embodiment.
Figure 34B:
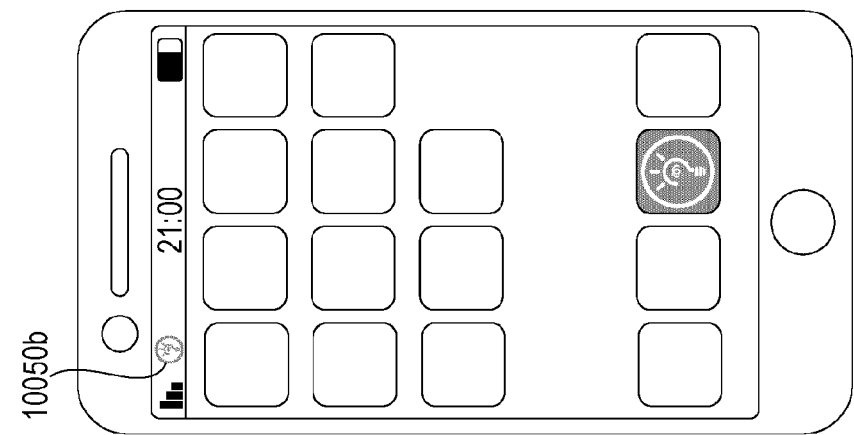
Figure 34A:
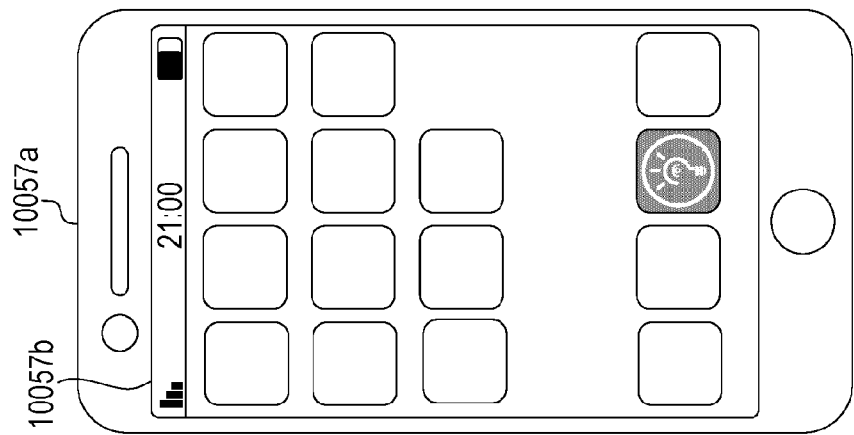

FIGS. 34A, 34B and 34C illustrate examples of display when the reception of the visible light signal is executed in a state (background) that an operation screen of the application for receiving the visible light signal is concealed from the user.

When the reception of the visible light signal is in an active state, a receiver $10057a$ can urge the user to recognize that the reception of the visible light signal is active, by displaying the logo $10050b$ in a notification region $10057b$ as illustrated in FIGS. 34B and 34C.

When the receiver $10057a$ is designed such that the user can select setting not to display the logo $10050b$, the notification region $10057b$ can be used for other purposes.

(Display of State Under Transmission of Visible Light Signal)

Figure 35:
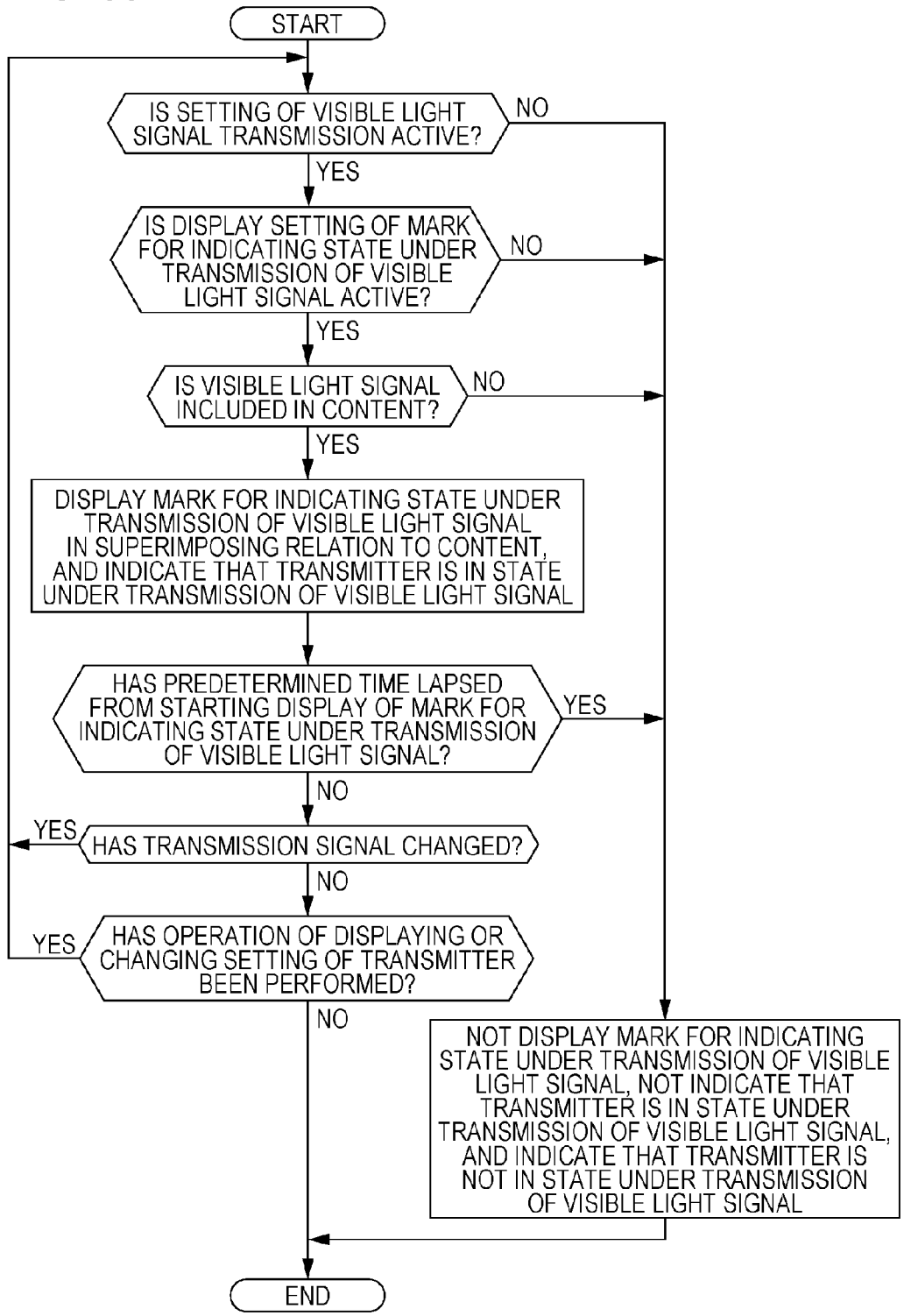
FIG. 35 illustrates one example of a flowchart representing an operation to display a state under transmission of a visible light signal in the fourth embodiment.

FIG. 35 illustrates one example of a flowchart representing an operation to display a state under transmission of a visible light signal in the fourth embodiment.

(a) When setting of transmission of the visible light signal is active, when setting for indicating a state under transmission of the visible light signal is active, and when a signal to be transmitted is present, a transmitter transmits the visible light signal and presents display indicating the state under transmission of the visible light signal. As a result, the user can recognize that the transmitter is in the state under transmission of the visible light signal. In other cases, the display indicating the state under transmission of the visible light signal is not presented, or the display is stopped. The signal to be transmitted is included in the content displayed by the transmitter, e.g., a data region of TV broadcasting, or in a memory area for holding the transmission signal. The display indicating the state under transmission of the visible light signal may be indicated in superimposing relation to the content, or by turning on a predetermined lamp.

(b) If a predetermined time has lapsed from the start of the display indicating the state under transmission of the visible light signal, the transmitter may stop the display. By stopping the display, it is possible to reduce irritations that the user may feel due to the display indicating the state under transmission of the visible light signal. Moreover, power consumption of the transmitter can be reduced.

(c) When the transmission signal is changed, the transmitter executes the above-described operations (a) and (b). As a result, the user can be urged to recognize the change of the transmission signal. For example, different items of information can be transmitted by changing the transmission signal when the displayed content is changed from one to another.

(d) When the user performs an operation of displaying or changing the setting of the transmitter, the transmitter executes the above-described operations (a) and (b). As a result, the user can be urged to recognize whether the transmitter is transmitting the visible light signal.

(Icons)

Figure 36:
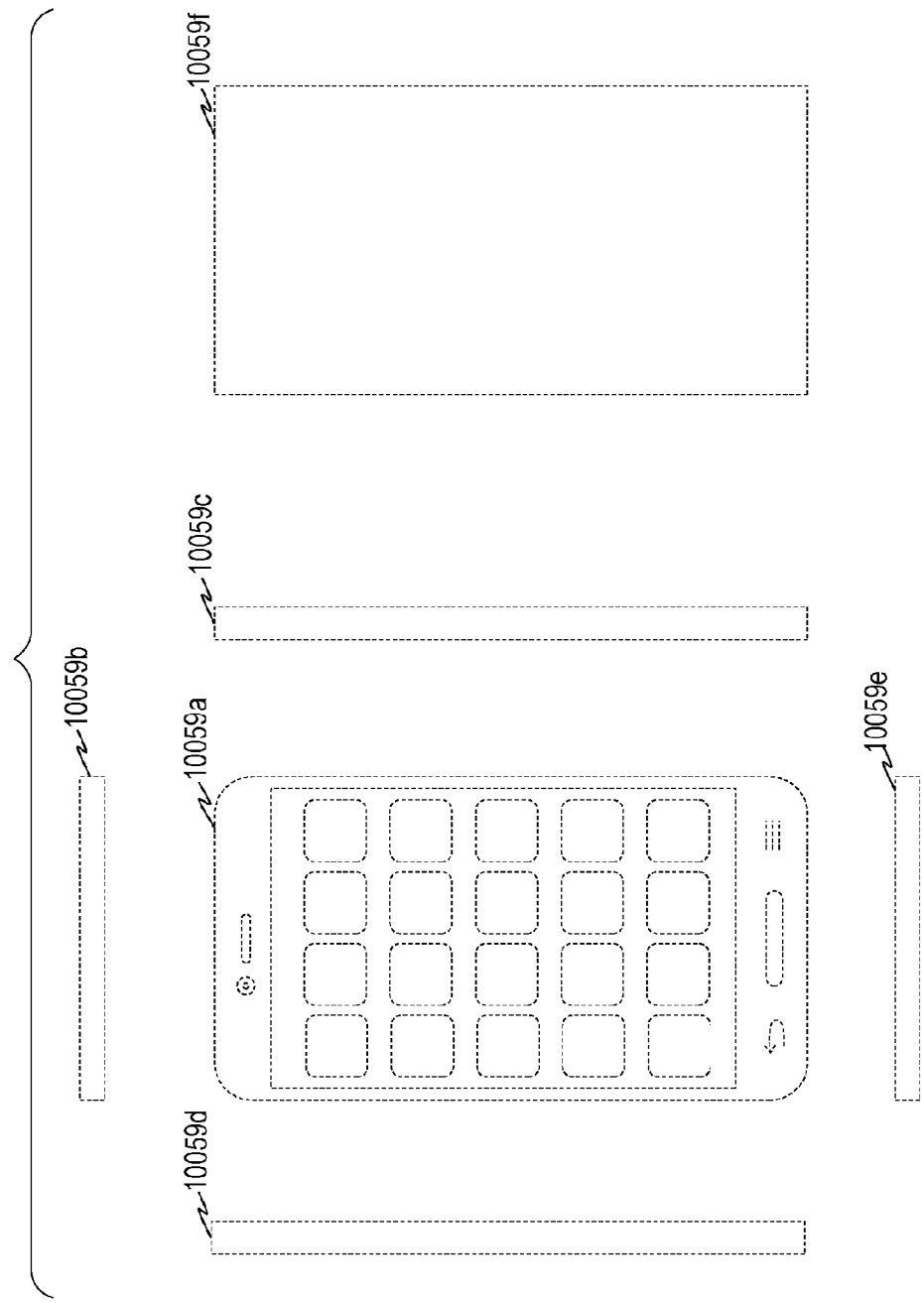
FIG. 36 is an illustration to explain logos in the fourth embodiment.

FIG. 36 is a six-view drawing illustrating one example of a smartphone that employs the logo $10050a$ as an icon. More specifically, $10059a$ denotes a front view, $10059b$ denotes a plan view, $10059c$ denotes a right side view, $10059d$ denotes a left side view, $10059e$ denotes a bottom view, and $10059f$ denotes a rear view.

Figure 37:
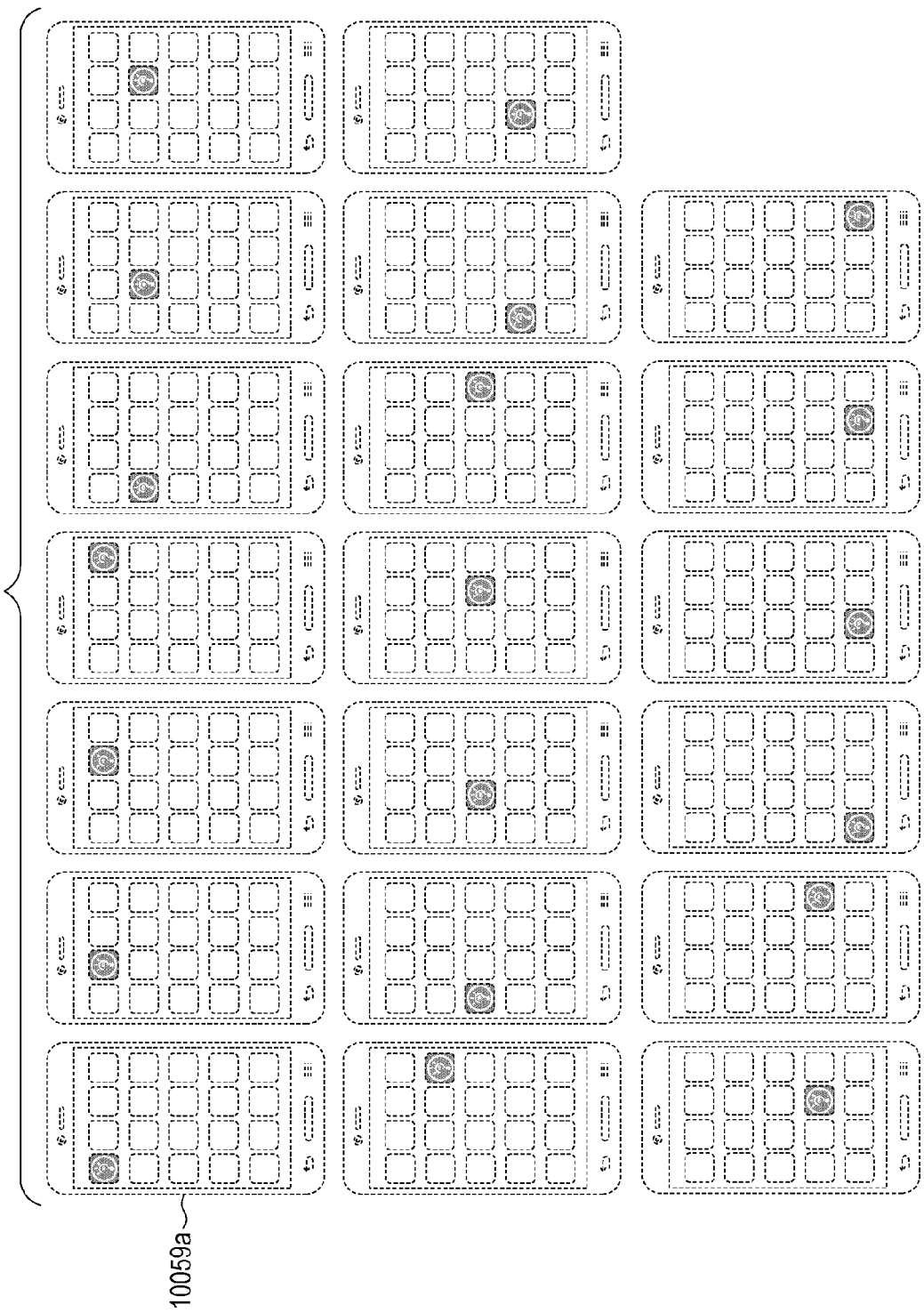
FIG. 37 is an illustration to explain logos in the fourth embodiment.

FIG. 37 illustrates variations of a position at which the logo $10050a$ is arranged on a main screen of the smartphone.

FIGS. 38A, 38B and 38C illustrate variations of a position at which the logo 10050a is arranged on a side screen of the smartphone.

FIG. 39 is a six-view drawing illustrating one example of a smart watch that employs the logo 10050a as an icon. More specifically, 10062a denotes a front view, 10062b denotes a plan view, 10062c denotes a right side view, 10062d denotes a left side view, 10062e denotes a bottom view, and 10062f denotes a rear view.

FIG. 40 illustrates variations of a position at which the logo 10050a is arranged on a main screen of the smart watch.

Figure 41B:
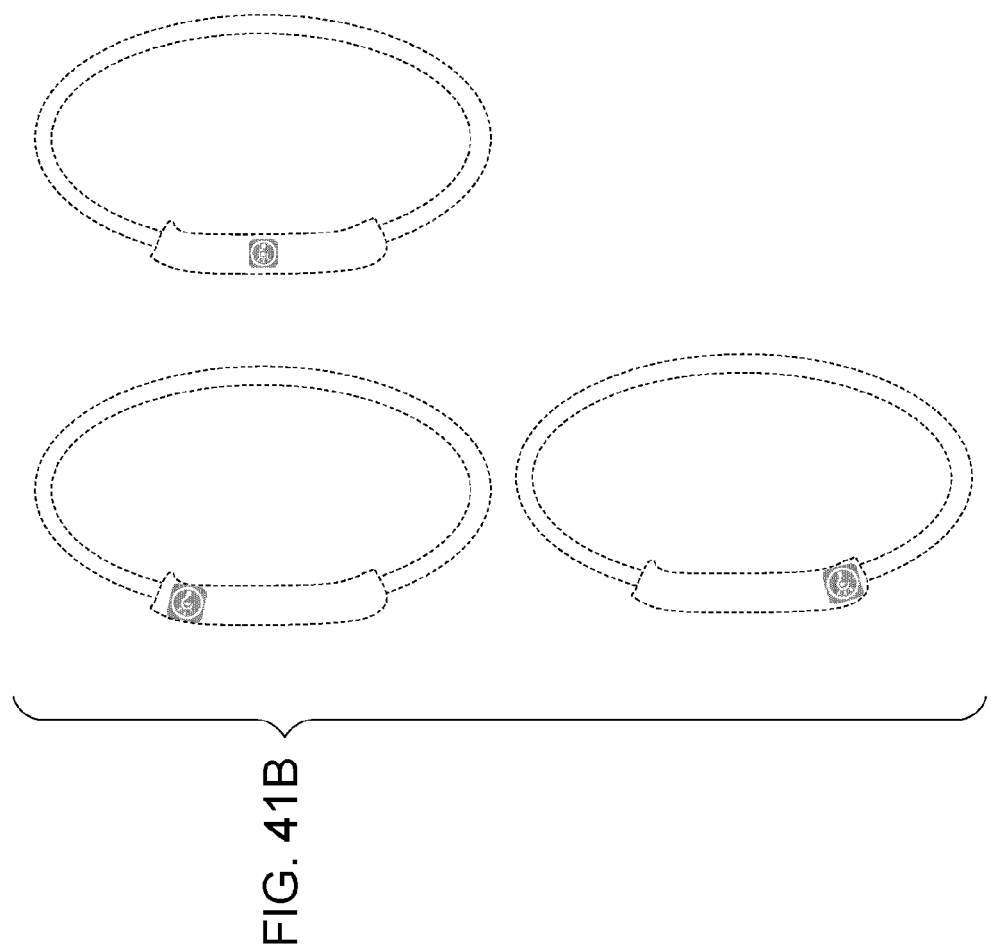
FIGS. 41A and 41B are illustrations to explain logos in the fourth embodiment.
Figure 41A:
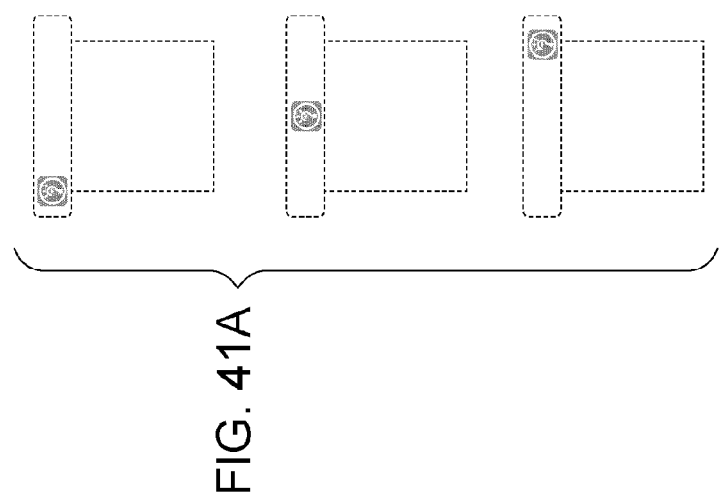

FIGS. 41A and 41B illustrate variations of a position at which the logo 10050a is arranged on a side screen of the smart watch.

FIG. 42 is a six-view drawing illustrating one example of another smart watch that employs the logo 10050b as an icon. More specifically, 10065a denotes a front view, 10065b denotes a plan view, 10065c denotes a right side view, 10065d denotes a left side view, 10065e denotes a bottom view, and 10065f denotes a rear view.

Figure 43:
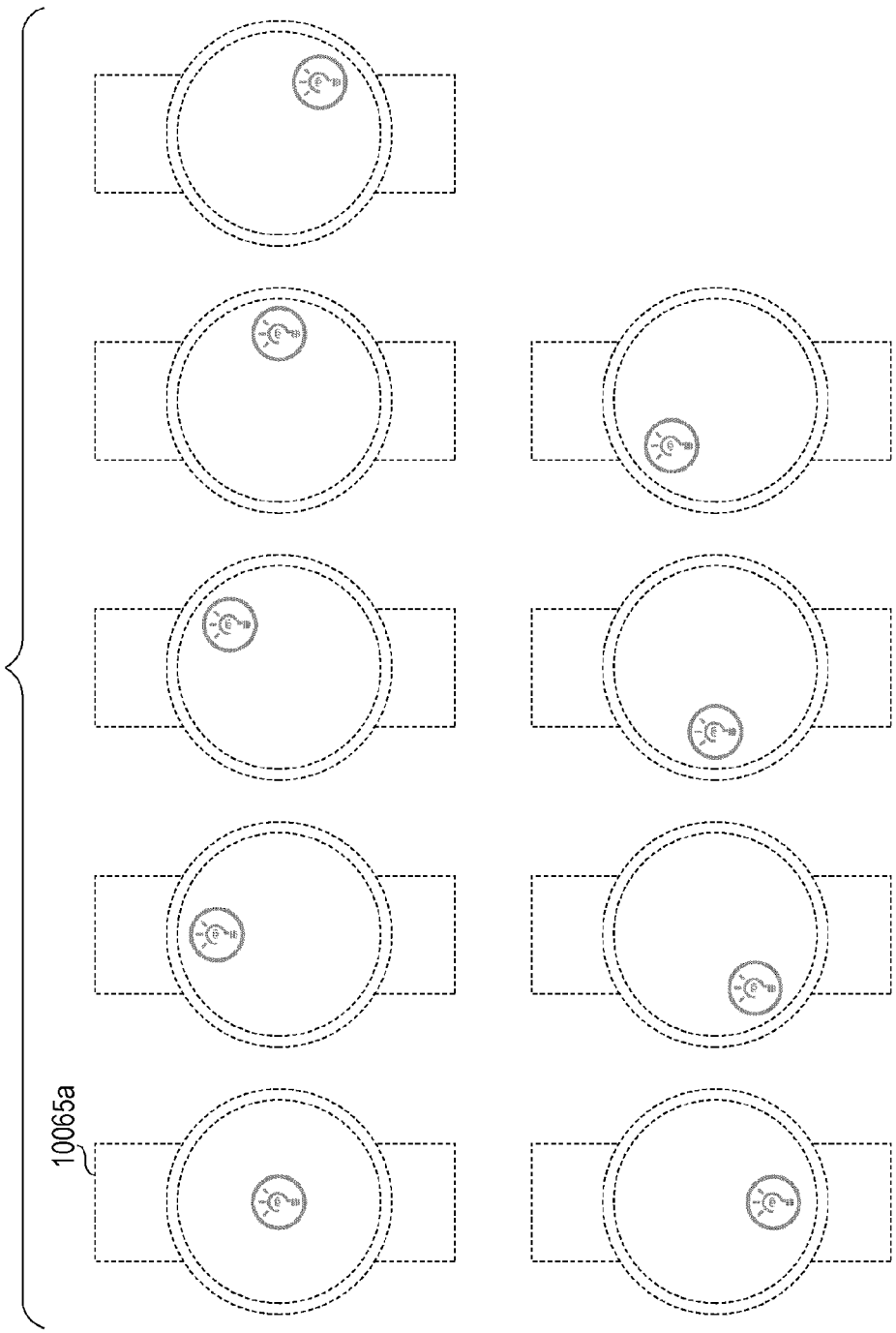
FIG. 43 is an illustration to explain logos in the fourth embodiment.

FIG. 43 illustrates variations of a position at which the logo 10050b is arranged on a main screen of the other smart watch.

FIGS. 44A and 44B illustrate variations of a position at which the logo 10050b is arranged on a side screen of the other smart watch.

The present disclosure can be applied to an information communication apparatus and so on. In particular, the present disclosure can be applied to, for example, an information communication apparatus that is used to realize a method for performing communication between a portable terminal, such as a smartphone, a tablet, a cellular phone, a smart watch, or a head-mounted display, and an electric home appliance, such as an air conditioner, a lighting apparatus, a rice cooker, a TV set, a recorder, or a projector.

What is claimed is:

1. A portable terminal that obtains information, the portable terminal comprising:
    a plurality of solar cells having respective directivities;
    a plurality of lenses, each of the plurality of lenses having at least two surfaces, one of the at least two surfaces being located on a respective one of the plurality of solar cells, and a second surface opposite to the one of the at least two surfaces, the second surface having a slope inclined with respect to the one of the at least two surfaces;
    a processor; and
    a memory having instructions stored thereon, the instructions when executed causing the processor to perform operations including:
    obtaining information by demodulating a signal that is specified by visible light received by at least one of the plurality of solar cells.

2. The portable terminal according to claim 1,
    wherein the operations further include:
    estimating a direction of the visible light using at least two of the plurality of solar cells.

* * * * *